US012772052B2

(12) United States Patent
Cheng et al.

(10) Patent No.: US 12,772,052 B2
(45) Date of Patent: Oct. 20, 2026

(54) RELAY SIDELINK COMMUNICATIONS FOR SECURE LINK ESTABLISHMENT

(71) Applicant: QUALCOMM Incorporated, San Diego, CA (US)

(72) Inventors: Hong Cheng, Basking Ridge, NJ (US); Karthika Paladugu, San Diego, CA (US); Adrian Edward Escott, Reading (GB); Soo Bum Lee, San Diego, CA (US); Gavin Bernard Horn, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 291 days.

(21) Appl. No.: 17/244,434

(22) Filed: Apr. 29, 2021

(65) Prior Publication Data

US 2021/0345104 A1 Nov. 4, 2021

Related U.S. Application Data

(60) Provisional application No. 63/018,984, filed on May 1, 2020.

(51) Int. Cl.

*H04W 12/04* (2021.01)
*H04W 12/037* (2021.01)

(Continued)

(52) U.S. Cl.

CPC ..... *H04W 12/0433* (2021.01); *H04W 12/037* (2021.01); *H04W 12/041* (2021.01); *H04W 12/72* (2021.01)

(58) Field of Classification Search

CPC ........... H04W 12/0433; H04W 12/037; H04W 12/041; H04W 12/72; H04W 12/06; H04W 76/14; H04W 88/04

See application file for complete search history.

(56) References Cited

U.S. PATENT DOCUMENTS

| | | | | |
|---|---|---|---|---|
| 2012/0039472 A1* | 2/2012 | Liu | H04W 12/041 380/270 |
| 2013/0188551 A1* | 7/2013 | Rohit | H04W 76/10 370/315 |

(Continued)

FOREIGN PATENT DOCUMENTS

| | | | | |
|---|---|---|---|---|
| CN | 104105086 B * | 2/2019 | H04W 48/20 |
| EP | 3557898 A1 | 10/2019 | |
| WO | WO-2018126534 A1 | 7/2018 | |

OTHER PUBLICATIONS

Ericsson: "ProSe Architecture Solutions Analysis & Proposed Way Forward Ericsson", 3GPP Draft, TSG SA WG2 #101, S2-140109_NW Ref Arch REQ-PB8, 3rd Generation Partnership Project (3GPP), Mobile Competence Centre, 650, Route Des Lucioles, F-06921 Sophia-Antipolis Cedex, France, vol. SA WG2, No. Taipei, Taiwan, Jan. 20, 2014-Jan. 24, 2014, Jan. 14, 2014 (Jan. 14, 2014), XP050765222, 18 Pages, Retrieved from the Internet: URL:http://www.3gpp.org/ftp/tsg_sa/WG2_Arch/TSGS2_101_Taipei/Docs/ [retrieved on Jan. 14, 2014] pp. 10-14.

(Continued)

*Primary Examiner* — Khalid M Almaghayreh
(74) *Attorney, Agent, or Firm* — HOLLAND & HART LLP

(57) ABSTRACT

Methods, systems, and devices for wireless communications enable establishment of secure communications and security keys for a remote user equipment (UE) and a relay UE to perform relayed sidelink communications in which the remote UE communicates with a network via the relay UE. To establish secure communications for the direct communications between the relay UE and the remote UE, one or more security keys are used for encryption and decryption of communications. To establish the security keys, the relay UE forwards a request for direct communications to a key management function (e.g., a ProSe key management func- (Continued)

tion (PKMF)) in a control plane of a core network (e.g., in a control plane message to the PKMF via an access and mobility function (AMF)). The PKMF derives relay keys and return information related to the relay keys to the relay UE the remote UE.

85 Claims, 25 Drawing Sheets

(51) Int. Cl.

| | |
|---|---|
| ***H04W 12/041*** | (2021.01) |
| ***H04W 12/0433*** | (2021.01) |
| ***H04W 12/72*** | (2021.01) |

(56) References Cited

U.S. PATENT DOCUMENTS

| | | | | |
|---|---|---|---|---|
| 2016/0345169 | A1* | 11/2016 | Wifvesson | H04L 63/06 |
| 2017/0055149 | A1* | 2/2017 | Lehtovirta | H04W 12/0431 |
| 2018/0049259 | A1* | 2/2018 | Aminaka | H04W 76/14 |
| 2018/0049260 | A1* | 2/2018 | Aminaka | H04W 76/14 |
| 2018/0270653 | A1* | 9/2018 | Wifvesson | H04W 48/16 |
| 2019/0159014 | A1* | 5/2019 | Gamishev | H04W 8/04 |
| 2019/0335332 | A1* | 10/2019 | Ying | H04W 40/22 |
| 2020/0008127 | A1* | 1/2020 | Ohtsuji | H04W 4/70 |
| 2021/0204124 | A1* | 7/2021 | Pison | H04W 12/106 |
| 2021/0282195 | A1* | 9/2021 | Paladugu | H04W 72/20 |
| 2021/0337381 | A1* | 10/2021 | Paladugu | H04W 12/71 |
| 2022/0232450 | A1* | 7/2022 | Shariat | H04W 4/80 |

OTHER PUBLICATIONS

International Search Report and Written Opinion—PCT/US2021/030204 —ISA/EPO—Jul. 30, 2021.

"3rd Generation Partnership Project; Technical Specification Group Services and System Aspects; Proximity-Based Services (ProSe); Security Aspects (Release 15)", 3GPP TS 33.303, V15.0.0, Jun. 2018, 90 Pages.

"3rd Generation Partnership Project; Technical Specification Group Services and System Aspects; Security Aspects of 3GPP Support for Advanced Vehicle-to-Everything (V2X) Services (Release 16)" 3GPP TS 33.536, V1.1.0, Apr. 2020, pp. 1-22.

Qualcomm Incorporated., et al., "Proposed Text for Keying Clause of NR PC5 Unicast Security", S3-200506 (Revision of S3-200346), 3GPP TSG-SA3 Meeting #98e, e-meeting, Mar. 2-6, 2020, 3 Pages.

Qualcomm Incorporated., et al., "Proposed Text for Security Establishment Clause of NR PC5 Unicast Security", S3-200507, (Revision of S3-200347), 3GPP TSG-SA3 Meeting #98e, e-meeting, Mar. 2-6, 2020, 5 Pages.

* cited by examiner

RELAY SIDELINK COMMUNICATIONS FOR SECURE LINK ESTABLISHMENT

CROSS REFERENCE

The present application for patent claims the benefit of U.S. Provisional Patent Application No. 63/018,984 by CHENG et al., entitled "RELAY SIDELINK COMMUNICATIONS USING SECURITY KEYS FOR SECURE LINK ESTABLISHMENT," filed May 1, 2020, assigned to the assignee hereof, and expressly incorporated by reference herein.

INTRODUCTION

The following relates to wireless communications and more specifically to link establishment for sidelink communications.

Wireless communications systems are widely deployed to provide various types of communication content such as voice, video, packet data, messaging, broadcast, and so on. These systems may have the capability to support communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communication at a relay UE is described. The method may include receiving, at the relay UE from a remote UE, a direct communication request to communicate with a network through the relay UE, transmitting, responsive to the direct communication request, a control plane message to a key management function associated with the network to request information for direct communications between the remote UE and the relay UE, receiving, based on the transmitted control plane message, a response from the network that includes the information for direct communications, and transmitting, to the remote UE, a direct communication command that includes the information for direct communications.

An apparatus for wireless communication at a relay UE is described. The apparatus may include a processor, and memory coupled to the processor, the processor and memory configured to receive, at the relay UE from a remote UE, a direct communication request to communicate with a network through the relay UE, transmit, responsive to the direct communication request, a control plane message to a key management function associated with the network to request information for direct communications between the remote UE and the relay UE, receive, based on the transmitted control plane message, a response from the network that includes the information for direct communications, and transmit, to the remote UE, a direct communication command that includes the information for direct communications.

Another apparatus for wireless communication at a relay UE is described. The apparatus may include means for receiving, at the relay UE from a remote UE, a direct communication request to communicate with a network through the relay UE, means for transmitting, responsive to the direct communication request, a control plane message to a key management function associated with the network to request information for direct communications between the remote UE and the relay UE, means for receiving, based on the transmitted control plane message, a response from the network that includes the information for direct communications, and means for transmitting, to the remote UE, a direct communication command that includes the information for direct communications.

A non-transitory computer-readable medium storing code for wireless communication at a relay UE is described. The code may include instructions executable by a processor to receive, at the relay UE from a remote UE, a direct communication request to communicate with a network through the relay UE, transmit, responsive to the direct communication request, a control plane message to a key management function associated with the network to request information for direct communications between the remote UE and the relay UE, receive, based on the transmitted control plane message, a response from the network that includes the information for direct communications, and transmit, to the remote UE, a direct communication command that includes the information for direct communications.

In some examples of the method, apparatuses, and non-transitory computer-readable medium described herein, the receiving the direct communication request may include operations, features, means, or instructions for receiving key establishment information from the remote UE that includes a relay user key identification and a relay service code (RSC).

In some examples of the method, apparatuses, and non-transitory computer-readable medium described herein, the relay user key identification may be provided as a Proximity-based Services (ProSe) relay user key (PRUK) identifier (ID) in a first information element, and an RSC in a second information element.

In some examples of the method, apparatuses, and non-transitory computer-readable medium described herein, the PRUK ID may be provisioned at the remote UE by the key management function, or may be an international mobile subscriber identity (IMSI), a general public subscription identifier (GPSI), or a subscription concealed identifier (SUCI), of the remote UE.

In some examples of the method, apparatuses, and non-transitory computer-readable medium described herein, the transmitting the control plane message may include operations, features, means, or instructions for transmitting a network access stratum (NAS) message to an access and mobility management function (AMF) of the network that includes a request corresponding to the information for direct communications.

In some examples of the method, apparatuses, and non-transitory computer-readable medium described herein, the control plane message includes information to allow the AMF to route the request corresponding to the information for direct communications to the key management function.

In some examples of the method, apparatuses, and non-transitory computer-readable medium described herein, the receiving the response from the network may include operations, features, means, or instructions for receiving a direct communication key (KD), a KD freshness parameter, generic bootstrapping architecture (GBA) push information (GPI), and a remote UE identification.

Some examples of the method, apparatuses, and non-transitory computer-readable medium described herein may further include operations, features, means, or instructions for deriving security keys for direct communications with the remote UE based on the KD, the KD freshness parameter, the GPI, and the remote UE identification and communicating with the remote UE using the security keys.

In some examples of the method, apparatuses, and non-transitory computer-readable medium described herein, the relay UE provides a layer three (L3) UE-to-network relay service or a layer two (L2) UE-to-network relay service between the network and the remote UE.

In some examples of the method, apparatuses, and non-transitory computer-readable medium described herein, the information for direct communications between the remote UE and the relay UE includes at least one of relay key information or authentication information.

A method for wireless communication at a network function is described. The method may include receiving, at the network function, a first control plane message from a relay UE via an AMF of a core network control plane, where the first control plane message includes a request for direct communication between the relay UE and a remote UE and transmitting, responsive to the request, a response to the relay UE in a second control plane message via the AMF, where the response includes information related to direct communications between the remote UE and the relay UE.

An apparatus for wireless communication at a network function is described. The apparatus may include a processor, and memory coupled to the processor, the processor and memory configured to receive, at the network function, a first control plane message from a relay UE via an AMF of a core network control plane, where the first control plane message includes a request for direct communication between the relay UE and a remote UE and transmit, responsive to the request, a response to the relay UE in a second control plane message via the AMF, where the response includes information related to direct communications between the remote UE and the relay UE.

Another apparatus for wireless communication at a network function is described. The apparatus may include means for receiving, at the network function, a first control plane message from a relay UE via an AMF of a core network control plane, where the first control plane message includes a request for direct communication between the relay UE and a remote UE and means for transmitting, responsive to the request, a response to the relay UE in a second control plane message via the AMF, where the response includes information related to direct communications between the remote UE and the relay UE.

A non-transitory computer-readable medium storing code for wireless communication at a network function is described. The code may include instructions executable by a processor to receive, at the network function, a first control plane message from a relay UE via an AMF of a core network control plane, where the first control plane message includes a request for direct communication between the relay UE and a remote UE and transmit, responsive to the request, a response to the relay UE in a second control plane message via the AMF, where the response includes information related to direct communications between the remote UE and the relay UE.

In some examples of the method, apparatuses, and non-transitory computer-readable medium described herein, the network function may be a ProSe key management function (PKMF) that may be located in the core network control plane and that communicates with the relay UE via the AMF.

In some examples of the method, apparatuses, and non-transitory computer-readable medium described herein, the network function may be a PKMF that may be located outside of the core network control plane and that communicates with the relay UE via the AMF and a network exposure function (NEF).

In some examples of the method, apparatuses, and non-transitory computer-readable medium described herein, the network function may be an authentication server function (AUSF) that may be located either in the core network control plane or outside of the core network control plane.

In some examples of the method, apparatuses, and non-transitory computer-readable medium described herein, the request includes a relay UE identification that may be used to determine that the relay UE may be authorized to serve the remote UE, and the relay UE identification includes an IMSI, a GPSI, or a SUCI, of the relay UE.

Some examples of the method, apparatuses, and non-transitory computer-readable medium described herein may further include operations, features, means, or instructions for accessing a universal data management (UDM) function, one or more other network functions, or combinations thereof, to determine that the relay UE may be authorized to serve the remote UE.

Some examples of the method, apparatuses, and non-transitory computer-readable medium described herein may further include operations, features, means, or instructions for deriving security key information for direct communications between the relay UE and the remote UE, where the security key information provides a KD, a KD freshness parameter, GPI, and a remote UE identification and formatting the security key information into the response.

Some examples of the method, apparatuses, and non-transitory computer-readable medium described herein may further include operations, features, means, or instructions for accessing one or more entities that may be external to the core network control plane for the security key information.

Some examples of the method, apparatuses, and non-transitory computer-readable medium described herein may further include operations, features, means, or instructions for generating a GPI communication based on an authentication vector (AV), and where the response includes the GPI.

In some examples of the method, apparatuses, and non-transitory computer-readable medium described herein, the response does not include a subscription permanent identifier (SUPI) for the remote UE.

In some examples of the method, apparatuses, and non-transitory computer-readable medium described herein, the request for direct communications between the relay UE and a remote UE information includes at least one of a relay key request or an authentication request.

A method for wireless communication at an AMF of a core network control plane is described. The method may include receiving, at the AMF, a first control plane message from a relay UE, where the first control plane message includes a request for direct communication between the relay UE and a remote UE, providing the first control plane message to a key management function, receiving, from the key management function, a response that includes information related to direct communications between the remote UE and the relay UE, and transmitting the response to the relay UE in a second control plane message.

An apparatus for wireless communication at an AMF of a core network control plane is described. The apparatus may include a processor, and memory coupled to the processor, the processor and memory configured to receive, at the AMF, a first control plane message from a relay UE, where the first control plane message includes a request for direct communication between the relay UE and a remote UE, provide the first control plane message to a key management function, receive, from the key management function, a response that includes information related to direct communications between the remote UE and the relay UE, and transmit the response to the relay UE in a second control plane message.

Another apparatus for wireless communication at an AMF of a core network control plane is described. The apparatus may include means for receiving, at the AMF, a first control plane message from a relay UE, where the first control plane message includes a request for direct communication between the relay UE and a remote UE, means for providing the first control plane message to a key management function, means for receiving, from the key management function, a response that includes information related to direct communications between the remote UE and the relay UE, and means for transmitting the response to the relay UE in a second control plane message.

A non-transitory computer-readable medium storing code for wireless communication at an AMF of a core network control plane is described. The code may include instructions executable by a processor to receive, at the AMF, a first control plane message from a relay UE, where the first control plane message includes a request for direct communication between the relay UE and a remote UE, provide the first control plane message to a key management function, receive, from the key management function, a response that includes information related to direct communications between the remote UE and the relay UE, and transmit the response to the relay UE in a second control plane message.

In some examples of the method, apparatuses, and non-transitory computer-readable medium described herein, the request may be received in a NAS message at the AMF, and the key management function may be a PKMF or an AUSF.

In some examples of the method, apparatuses, and non-transitory computer-readable medium described herein, the PKMF or the AUSF may be located within the core network control plane.

In some examples of the method, apparatuses, and non-transitory computer-readable medium described herein, the PKMF or the AUSF may be located external to the core network control plane, and a NEF of the core network control plane may be coupled with the AMF and provides the first control plane message to the PKMF or the AUSF.

In some examples of the method, apparatuses, and non-transitory computer-readable medium described herein, the response includes security key information that provides a KD, a KD freshness parameter, GPI, and a remote UE identification.

A method for wireless communication at a remote UE is described. The method may include transmitting, to a relay UE, a direct communication request to communicate with a network through the relay UE, receiving, responsive to the direct communication request, a direct security mode command from the relay UE that includes information for direct communications between the remote UE and the relay UE, where the direct security mode command is based on a control plane message by the relay UE, deriving one or more security keys for communications with the relay UE based on the information for direct communications, and transmitting, to the relay UE, a direct security mode command complete indication responsive to enabling security for direct communications with the relay UE.

An apparatus for wireless communication at a remote UE is described. The apparatus may include a processor, and memory coupled to the processor, the processor and memory configured to transmit, to a relay UE, a direct communication request to communicate with a network through the relay UE, receive, responsive to the direct communication request, a direct security mode command from the relay UE that includes information for direct communications between the remote UE and the relay UE, where the direct security mode command is based on a control plane message by the relay UE, derive one or more security keys for communications with the relay UE based on the information for direct communications, and transmit, to the relay UE, a direct security mode command complete indication responsive to enabling security for direct communications with the relay UE.

Another apparatus for wireless communication at a remote UE is described. The apparatus may include means for transmitting, to a relay UE, a direct communication request to communicate with a network through the relay UE, means for receiving, responsive to the direct communication request, a direct security mode command from the relay UE that includes information for direct communications between the remote UE and the relay UE, where the direct security mode command is based on a control plane message by the relay UE, means for deriving one or more security keys for communications with the relay UE based on the information for direct communications, and means for transmitting, to the relay UE, a direct security mode command complete indication responsive to enabling security for direct communications with the relay UE.

A non-transitory computer-readable medium storing code for wireless communication at a remote UE is described. The code may include instructions executable by a processor to transmit, to a relay UE, a direct communication request to communicate with a network through the relay UE, receive, responsive to the direct communication request, a direct security mode command from the relay UE that includes information for direct communications between the remote UE and the relay UE, where the direct security mode command is based on a control plane message by the relay UE, derive one or more security keys for communications with the relay UE based on the information for direct communications, and transmit, to the relay UE, a direct security mode command complete indication responsive to enabling security for direct communications with the relay UE.

Some examples of the method, apparatuses, and non-transitory computer-readable medium described herein may further include operations, features, means, or instructions for formatting a PRUK ID in a first information element and a RSC in a second information element, and where the direct communication request includes the first information element and the second information element.

In some examples of the method, apparatuses, and non-transitory computer-readable medium described herein, the PRUK ID includes a key identification that may be provisioned to the remote UE by a key management function, an IMSI, a GPSI, or a SUCI, of the remote UE.

In some examples of the method, apparatuses, and non-transitory computer-readable medium described herein, the information for direct communications includes one or more of a KD, a KD freshness parameter, GPI, or any combinations thereof.

A method for wireless communication at a relay UE is described. The method may include receiving, at the relay UE from a remote UE, a direct communication request to communicate with a network through the relay UE, transmitting, responsive to the direct communication request, a control plane message to a key management function associated with the network to request relay key information for communications between the remote UE and the relay UE, receiving, responsive to the request for the relay key information, a relay key response from the network that includes the relay key information for direct communications between the remote UE and the relay UE, and transmitting, to the remote UE, a direct communication command that includes the relay key information.

An apparatus for wireless communication at a relay UE is described. The apparatus may include a processor, and memory coupled to the processor, the processor and memory configured to receive, at the relay UE from a remote UE, a direct communication request to communicate with a network through the relay UE, transmit, responsive to the direct communication request, a control plane message to a key management function associated with the network to request relay key information for communications between the remote UE and the relay UE, receive, responsive to the request for the relay key information, a relay key response from the network that includes the relay key information for direct communications between the remote UE and the relay UE, and transmit, to the remote UE, a direct communication command that includes the relay key information.

Another apparatus for wireless communication at a relay UE is described. The apparatus may include means for receiving, at the relay UE from a remote UE, a direct communication request to communicate with a network through the relay UE, means for transmitting, responsive to the direct communication request, a control plane message to a key management function associated with the network to request relay key information for communications between the remote UE and the relay UE, means for receiving, responsive to the request for the relay key information, a relay key response from the network that includes the relay key information for direct communications between the remote UE and the relay UE, and means for transmitting, to the remote UE, a direct communication command that includes the relay key information.

A non-transitory computer-readable medium storing code for wireless communication at a relay UE is described. The code may include instructions executable by a processor to receive, at the relay UE from a remote UE, a direct communication request to communicate with a network through the relay UE, transmit, responsive to the direct communication request, a control plane message to a key management function associated with the network to request relay key information for communications between the remote UE and the relay UE, receive, responsive to the request for the relay key information, a relay key response from the network that includes the relay key information for direct communications between the remote UE and the relay UE, and transmit, to the remote UE, a direct communication command that includes the relay key information.

In some examples of the method, apparatuses, and non-transitory computer-readable medium described herein, the receiving the direct communication request may include operations, features, means, or instructions for receiving key establishment information from the remote UE that includes a relay user key identification and an RSC.

In some examples of the method, apparatuses, and non-transitory computer-readable medium described herein, the transmitting the control plane message may include operations, features, means, or instructions for transmitting a NAS message to an AMF of the network that includes the request for the relay key.

In some examples of the method, apparatuses, and non-transitory computer-readable medium described herein, the control plane message includes information to allow the AMF to route the request for relay key information to the key management function.

In some examples of the method, apparatuses, and non-transitory computer-readable medium described herein, the receiving the relay key response may include operations, features, means, or instructions for receiving a KD, a KD freshness parameter, GPI, and a remote UE identification.

Some examples of the method, apparatuses, and non-transitory computer-readable medium described herein may further include operations, features, means, or instructions for deriving security keys for direct communications with the remote UE based on the KD, the KD freshness parameter, the GPI, and the remote UE identification and communicating with the remote UE using the security keys.

In some examples of the method, apparatuses, and non-transitory computer-readable medium described herein, the transmitting the direct communication command may include operations, features, means, or instructions for transmitting the KD freshness parameter and the GPI to the remote UE for use in communications with the relay UE.

In some examples of the method, apparatuses, and non-transitory computer-readable medium described herein, the relay UE provides an L3 UE-to-network relay service or an L2 UE-to-network relay service between the network and the remote UE.

A method for wireless communication at a key management function is described. The method may include receiving, at the key management function, a first control plane message from a relay UE via an access and mobility function of a core network control plane, where the first control plane message includes a relay key request for direct communications between the relay UE and a remote UE, determining, responsive to the relay key request, a relay key response that includes information related to a relay key for direct communications between the remote UE and the relay UE, and transmitting the relay key response to the relay UE in a second control plane message via the access and mobility function.

An apparatus for wireless communication at a key management function is described. The apparatus may include a processor, and memory coupled to the processor, the processor and memory configured to receive, at the key management function, a first control plane message from a relay UE via an access and mobility function of a core network control plane, where the first control plane message includes a relay key request for direct communications between the relay UE and a remote UE, determine, responsive to the relay key request, a relay key response that includes information related to a relay key for direct communications between the remote UE and the relay UE, and transmit the relay key response to the relay UE in a second control plane message via the access and mobility function.

Another apparatus for wireless communication at a key management function is described. The apparatus may include means for receiving, at the key management function, a first control plane message from a relay UE via an access and mobility function of a core network control plane, where the first control plane message includes a relay key request for direct communications between the relay UE and a remote UE, means for determining, responsive to the relay key request, a relay key response that includes information related to a relay key for direct communications between the remote UE and the relay UE, and means for transmitting the relay key response to the relay UE in a second control plane message via the access and mobility function.

A non-transitory computer-readable medium storing code for wireless communication at a key management function is described. The code may include instructions executable by a processor to receive, at the key management function, a first control plane message from a relay UE via an access and mobility function of a core network control plane, where the first control plane message includes a relay key request for direct communications between the relay UE and a remote UE, determine, responsive to the relay key request, a relay key response that includes information related to a relay key for direct communications between the remote UE and the relay UE, and transmit the relay key response to the relay UE in a second control plane message via the access and mobility function.

In some examples of the method, apparatuses, and non-transitory computer-readable medium described herein, the key management function may be a PKMF that may be located in the core network control plane and that communicates with the relay UE via the access and mobility function.

In some examples of the method, apparatuses, and non-transitory computer-readable medium described herein, the relay user key identification may be provided as a PRUK ID in a first information element, and a RSC in a second information element.

In some examples of the method, apparatuses, and non-transitory computer-readable medium described herein, the PRUK ID may be provisioned at the remote UE by the key management function, or may be an IMSI, a GPSI, or a SUCI, of the remote UE.

In some examples of the method, apparatuses, and non-transitory computer-readable medium described herein, the key management function may be a PKMF that may be located outside of the core network control plane and that communicates with the relay UE via the access and mobility function and a NEF.

In some examples of the method, apparatuses, and non-transitory computer-readable medium described herein, the relay key request includes a relay UE identification that may be used to determine that the relay UE may be authorized to serve the remote UE.

In some examples of the method, apparatuses, and non-transitory computer-readable medium described herein, the relay UE identification includes an IMSI, a GPSI, or a SUCI, of the relay UE.

Some examples of the method, apparatuses, and non-transitory computer-readable medium described herein may further include operations, features, means, or instructions for accessing a UDM function, one or more other network functions, or combinations thereof, to determine that the relay UE may be authorized to serve the remote UE.

Some examples of the method, apparatuses, and non-transitory computer-readable medium described herein may further include operations, features, means, or instructions for deriving security key information for direct communications between the relay UE and the remote UE and formatting the security key information into the relay key response.

In some examples of the method, apparatuses, and non-transitory computer-readable medium described herein, the security key information provides a KD, a KD freshness parameter, GPI, and a remote UE identification.

Some examples of the method, apparatuses, and non-transitory computer-readable medium described herein may further include operations, features, means, or instructions for accessing one or more entities that may be external to the core network control plane for the security key information.

Some examples of the method, apparatuses, and non-transitory computer-readable medium described herein may further include operations, features, means, or instructions for receiving an AV from an AUSF.

Some examples of the method, apparatuses, and non-transitory computer-readable medium described herein may further include operations, features, means, or instructions for generating a GPI communication based on the AV, and where the relay key response includes the GPI.

In some examples of the method, apparatuses, and non-transitory computer-readable medium described herein, the relay key response does not include a SUPI for the remote UE, and an AUSF of the core network verifies the remote UE identify subsequent to the relay key response.

Some examples of the method, apparatuses, and non-transitory computer-readable medium described herein may further include operations, features, means, or instructions for transmitting an indication to an AUSF that the key management function may have received the relay key request for direct communications between the relay UE and the remote UE and receiving a SUPI for the remote UE and an AV from the AUSF responsive to the indication.

A method for wireless communication is described. The method may include receiving, at a first network function of a core network control plane, a first control plane message from a relay UE, where the first control plane message includes a relay key request for direct communications between the relay UE and a remote UE, providing the first control plane message to a key management function, receiving, from the key management function, a relay key response that includes information related to a relay key for direct communications between the remote UE and the relay UE, and transmitting the relay key response to the relay UE in a second control plane message.

An apparatus for wireless communication is described. The apparatus may include a processor, and memory coupled to the processor, the processor and memory configured to receive, at a first network function of a core network control plane, a first control plane message from a relay UE, where the first control plane message includes a relay key request for direct communications between the relay UE and a remote UE, provide the first control plane message to a key management function, receive, from the key management function, a relay key response that includes information related to a relay key for direct communications between the remote UE and the relay UE, and transmit the relay key response to the relay UE in a second control plane message.

Another apparatus for wireless communication is described. The apparatus may include means for receiving, at a first network function of a core network control plane, a first control plane message from a relay UE, where the first control plane message includes a relay key request for direct communications between the relay UE and a remote UE, means for providing the first control plane message to a key management function, means for receiving, from the key management function, a relay key response that includes information related to a relay key for direct communications between the remote UE and the relay UE, and means for transmitting the relay key response to the relay UE in a second control plane message.

A non-transitory computer-readable medium storing code for wireless communication is described. The code may include instructions executable by a processor to receive, at a first network function of a core network control plane, a first control plane message from a relay UE, where the first control plane message includes a relay key request for direct communications between the relay UE and a remote UE, provide the first control plane message to a key management function, receive, from the key management function, a relay key response that includes information related to a relay key for direct communications between the remote UE and the relay UE, and transmit the relay key response to the relay UE in a second control plane message.

In some examples of the method, apparatuses, and non-transitory computer-readable medium described herein, the first network function may be an AMF, and the key management function may be a PKMF.

In some examples of the method, apparatuses, and non-transitory computer-readable medium described herein, the PKMF may be located within the core network control plane.

In some examples of the method, apparatuses, and non-transitory computer-readable medium described herein, the PKMF may be located external to the core network control plane, and a NEF of the core network control plane may be couples with the AMF and provides the first control plane message to the PKMF.

In some examples of the method, apparatuses, and non-transitory computer-readable medium described herein, the relay key request may be received in an NAS message at the AMF.

In some examples of the method, apparatuses, and non-transitory computer-readable medium described herein, the relay key response includes security key information that provides a KD, a KD freshness parameter, GPI, and a remote UE identification.

A method for wireless communication at a remote UE is described. The method may include transmitting, to a relay UE, a direct communication request to communicate with a network through the relay UE, the direct communication request including a PRUK ID and a RSC, receiving, responsive to the direct communication request, a direct security mode command from the relay UE that includes relay key information for direct communications between the remote UE and the relay UE, deriving one or more security keys for communications with the relay UE based on the relay key information, and transmitting, to the relay UE, a direct security mode command complete indication responsive to enabling security for direct communications with the relay UE.

An apparatus for wireless communication at a remote UE is described. The apparatus may include a processor, and memory coupled to the processor, the processor and memory configured to transmit, to a relay UE, a direct communication request to communicate with a network through the relay UE, the direct communication request including a PRUK ID and a RSC, receive, responsive to the direct communication request, a direct security mode command from the relay UE that includes relay key information for direct communications between the remote UE and the relay UE, derive one or more security keys for communications with the relay UE based on the relay key information, and transmit, to the relay UE, a direct security mode command complete indication responsive to enabling security for direct communications with the relay UE.

Another apparatus for wireless communication at a remote UE is described. The apparatus may include means for transmitting, to a relay UE, a direct communication request to communicate with a network through the relay UE, the direct communication request including a PRUK ID and a RSC, means for receiving, responsive to the direct communication request, a direct security mode command from the relay UE that includes relay key information for direct communications between the remote UE and the relay UE, means for deriving one or more security keys for communications with the relay UE based on the relay key information, and means for transmitting, to the relay UE, a direct security mode command complete indication responsive to enabling security for direct communications with the relay UE.

A non-transitory computer-readable medium storing code for wireless communication at a remote UE is described. The code may include instructions executable by a processor to transmit, to a relay UE, a direct communication request to communicate with a network through the relay UE, the direct communication request including a PRUK ID and a RSC, receive, responsive to the direct communication request, a direct security mode command from the relay UE that includes relay key information for direct communications between the remote UE and the relay UE, derive one or more security keys for communications with the relay UE based on the relay key information, and transmit, to the relay UE, a direct security mode command complete indication responsive to enabling security for direct communications with the relay UE.

Some examples of the method, apparatuses, and non-transitory computer-readable medium described herein may further include operations, features, means, or instructions for formatting the PRUK ID in a first information element, and the RSC in a second information element, and where the direct communication request includes the first information element and the second information element.

In some examples of the method, apparatuses, and non-transitory computer-readable medium described herein, the PRUK ID includes a key identification that may be provisioned to the remote UE by a key management function, an IMSI, a GPSI, or a SUCI, of the remote UE.

In some examples of the method, apparatuses, and non-transitory computer-readable medium described herein, the information related to the relay key includes one or more of a KD, a KD freshness parameter, GPI, or any combinations thereof.

DETAILED DESCRIPTION

Figure 1:
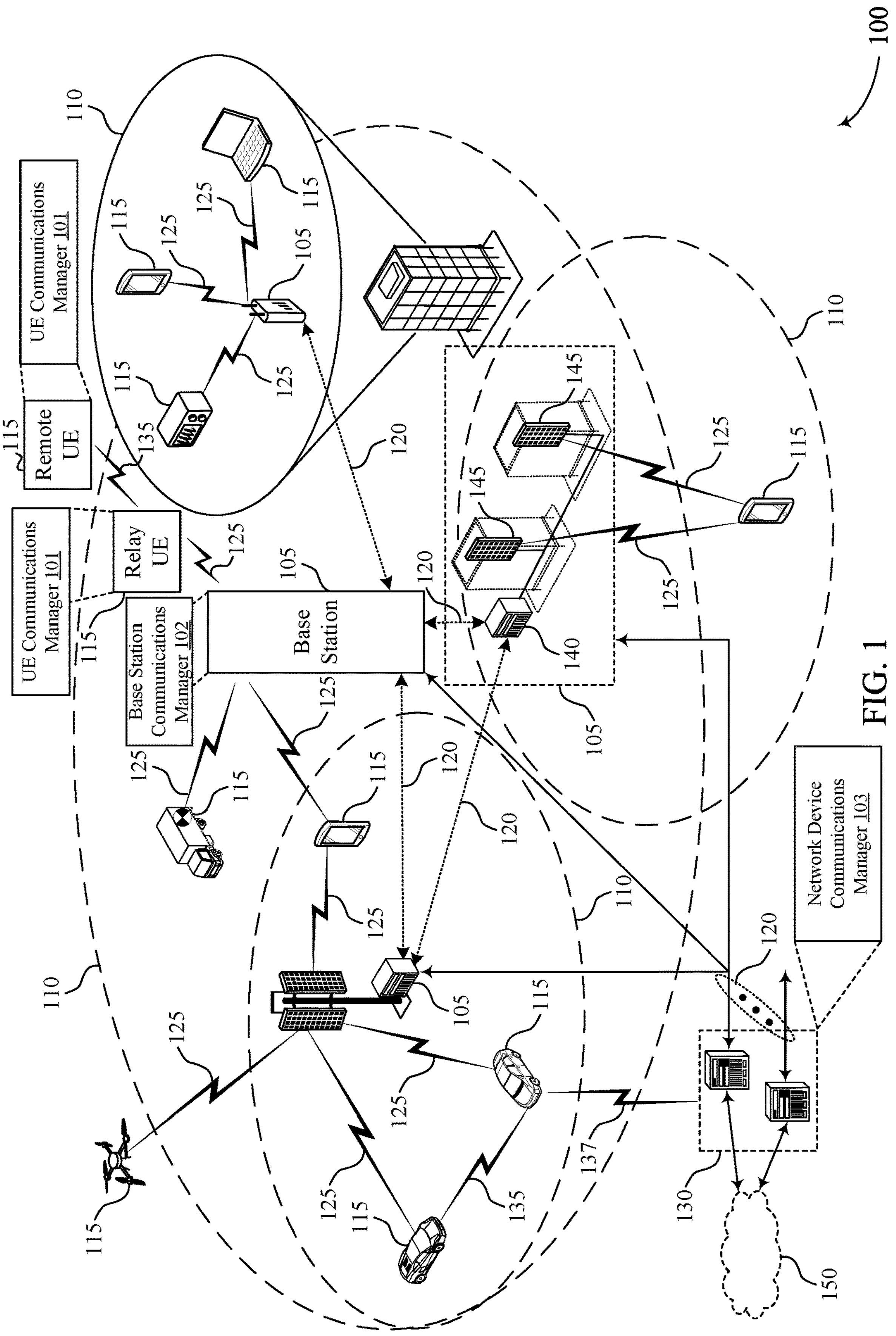
FIG. 1 illustrates an example of a system for wireless communications that supports relay sidelink communications for secure link establishment in accordance with aspects of the present disclosure.

Some wireless communication systems support establishment of direct communications links between devices of like device types, such as direct UE to UE communications. Such communications links may provide for communications without transmitting through a base station. A direct communication link may be an example of a sidelink, a PC5 link, device-to-device (D2D) communication, vehicle-to-everything (V2X) communication, ProSe communication, or other types of direct communication in a wireless communications system.

In some cases, one sidelink device, such as a remote UE may establish a communication link with a base station via a relay UE. For instance, the relay UE may establish a sidelink communication link with the remote UE and may establish a relay communication link with the base station. Establishing the communication link may enable the remote UE to access services from the network via the relay UE and the base station.

Techniques that may enable establishment of security keys for a remote UE with the relay UE to perform such relayed communications are discussed herein. In some cases, a relay UE may receive a request, from a remote UE, for direct communications with the relay UE to provide communications towards a base station and wireless network. In some cases, such a request may include key establishment information such as a relay user key identification (e.g., a PRUK ID) and a RSC. In some cases, in order to establish secure communications for the communications between the relay UE and the remote UE, one or more security keys, also referred to as relay keys, may be used for encryption and decryption of communications. To establish the relay keys, the relay UE may forward the request for direct communications to a key management function (e.g., a PKMF that is located in a control plane of a core network associated with the base station, or external to the core network and accessed via an NEF. In some cases, the relay UE may forward a control plane message to the PKMF via an AMF of the core network. The PKMF may derive relay keys and return information related to the relay keys to the relay UE (e.g., via the AMF), and the relay UE may provide the relay key information to the remote UE. The relay UE and remote UE may thus derive associated security keys for direct communications between the relay UE and the remote UE.

As used herein, the descriptor “remote UE” relates to a UE that communicates with a base station via another UE, and the descriptor “relay UE” relates to a UE that relays communications between a base station (and core network) and a remote UE. The remote UE may thus communicate with the relay UE via a sidelink connection (e.g., a PC5 interface). The relay UE may relay transmissions from the remote UE to the base station via an access link connection, which may be referred to as a Uu interface. The connection between the remote UE and a 5G core network (5GC) (e.g., including the sidelink connection and the access link connection) may be referred to as a relayed connection or indirect network access (e.g., an end-to-end connection). In some examples, the relay connection may include a relay protocol data unit (PDU) session between the relay UE and the 5GC (e.g., via the Uu interface or like interfaces/links for core network connections).

Various aspects of the disclosure thus provide for establishment or relay keys for communications between a remote UE and a relay UE, through a control plane request from the relay UE to a key management function. Such techniques may provide efficient establishment of security associations between remote UEs and relay UEs in a dynamic security establishment procedure to allow for secure communications at the remote UE. Further, control plane signaling may allow for efficient communication of key establishment requests in a 5GC that may not provide for user plane connection for such requests. Such techniques may also enable reliable and secure communication of key information.

Aspects of the disclosure are initially described in the context of exemplary wireless communications systems. Additionally, aspects of the disclosure are illustrated in process flows and relay configurations. Aspects of the disclosure are further illustrated by and described with reference to apparatus diagrams, system diagrams, and flowcharts that relate to relay sidelink communications for secure link establishment (e.g., relay sidelink communications using direct communication requests and/or security keys).

FIG. 1 illustrates an example of a wireless communications system 100 that supports relay sidelink communications for secure link establishment in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both).

Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5GC, which may include at least one control plane entity that manages access and mobility (e.g., a mobility management entity (MME), an AMF) and at least one user plane entity that routes packets or interconnects to external networks (e.g., a serving gateway (S-GW), a Packet Data Network (PDN) gateway (P-GW), or a UPF). The control plane entity may manage NAS functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 MHz to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Link Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARD) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In various examples, a communication manager may be included in a device to support techniques for relay sidelink communications (e.g., relay sidelink communications using direct communication requests and/or security keys). For example, a UE 115 may include a UE communications manager 101, a base station may include a base station communications manager 102, and a network device (e.g., as part of the core network) may include a network device communications manager 103.

For example, a relay UE 115 (e.g., a first UE 115) may include the UE communications manager 101, which can be used to establish a connection with a remote UE 115 (e.g., a second UE 115). When establishing the connection, the remote UE 115 may transmit a relaying request to the relay UE 115 that includes a RSC indicating a type of relaying needed for the remote UE (e.g., to set up an L3 relay connection via the relay UE 115 to a base station 105) and a relay user key identification. Subsequently, the UE communications manager 101 may transmit the request to the base station 105 and may receive a configuration message from the base station indicating relay key information for a PC5 interface between the relay UE 115 and the remote UE 115. Accordingly, the UE communications manager 101 of the relay UE 115 may then transmit a direct communication command to the remote UE 115 with information to derive the relay keys at a UE communications manager 101 of the remote UE 115.

Additionally, the base station 105 may use the base station communications manager 102 to identify a direct communications request from a remote UE 115, and route the request in control plane signaling to a network device (e.g., an AMF of a 5GC) and may receive relay key information for the request from the network device, which may then be provided to the relay UE 115 (e.g., via a Uu interface). After informing the relay UE 115 of the relay key information, the base station communications manager 102 may communicate with the remote UE 115 via the relay UE 115.

A network device may also be included in wireless communications system 100 to support the techniques as described herein. For example, the network device may include a core network device (e.g., 5GC device) that includes an AMF and a PKMF. Additionally, the network device may include the network device communications manager 103 that receives the relay key request from the relay UE 115, via the base station 105 (e.g., at the AMF) and determines relay key information based on the relay key request. Subsequently, the network device communications manager 103 may transmit an indication of the relay key information to the base station 105.

Figure 2:
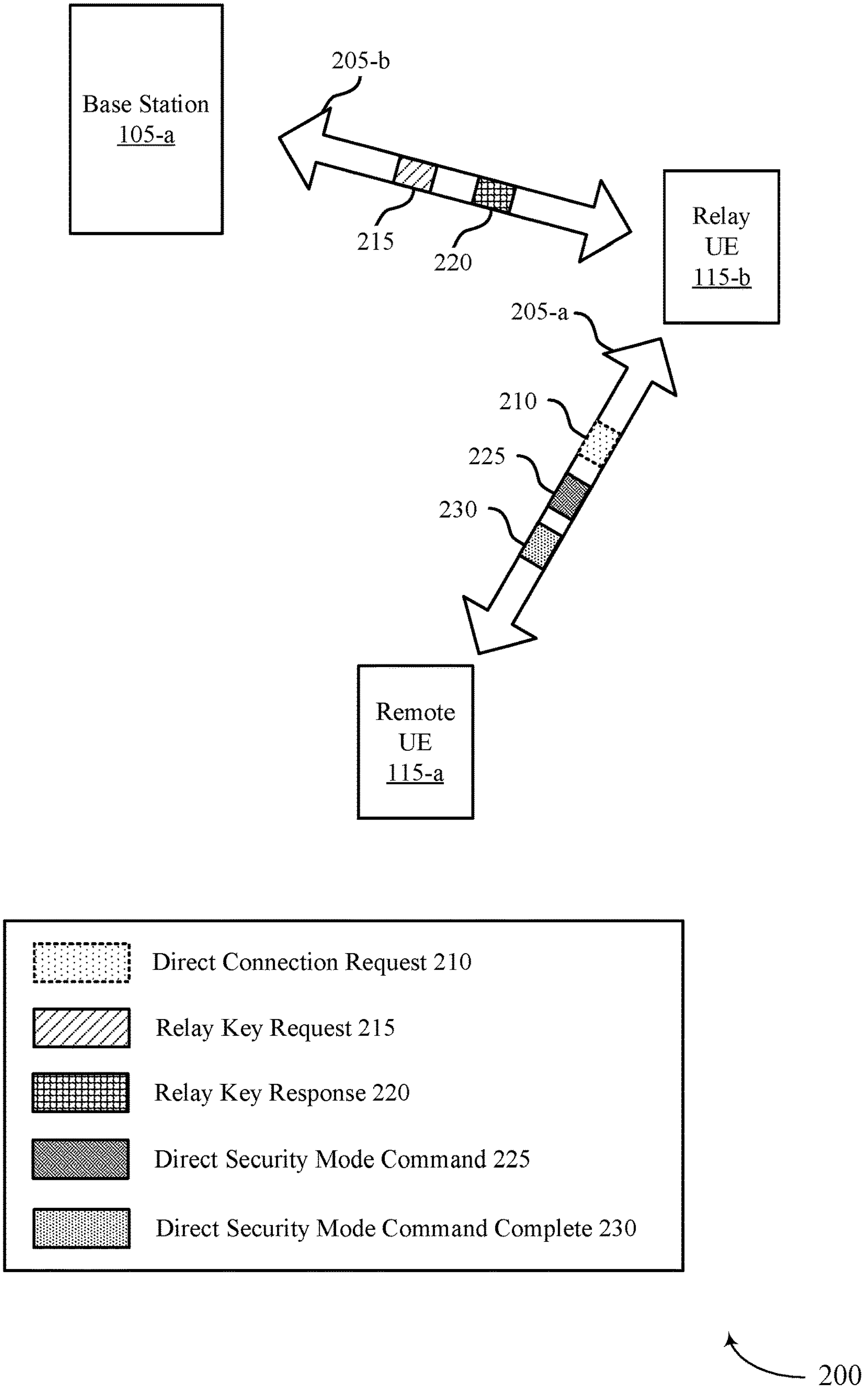
FIG. 2 illustrates an example of a portion of a wireless communications system that supports relay sidelink communications for secure link establishment in accordance with aspects of the present disclosure.

FIG. 2 illustrates an example of a wireless communications system 200 that supports relay sidelink communications for secure link establishment in accordance with aspects of the present disclosure. In some examples, wireless communications system 200 may implement aspects of wireless communications system 100. For example, wireless communications system 200 may include a base station 105-*a*, a remote UE 115-*a*, and a relay UE 115-*b*, which may be examples of corresponding base stations 105 and UEs 115, respectively, as described above with reference to FIG. 1.

Remote UE 115-*a* and relay UE 115-*b* may establish a connection 205-*a* for sidelink communications (e.g., a UE-to-network relay connection, a ProSe UE-to-network relay connection, etc.). In some examples, the remote UE 115-*a* may discover the relay UE 115-*b* using a sidelink discovery procedure, which may be based on a use of RSCs, and may establish the connection 205-*a* using the sidelink unicast link setup procedures. When establishing the connection, for example, the remote UE 115-*a* may first transmit a direct connection request 210 indicating a RSC identifying connectivity services that the relay UE 115-*b* provides. In some cases, the UEs 115 in wireless communications system 200 (e.g., including the remote UE 115-*a* and the relay UE 115-*b*, as well as additional UEs 115 not depicted in FIG. 2) may be provisioned with authorized RSCs when registering with the network (e.g., as part of a ProSe policy during 5G authorization and provisioning by a policy control function (PCF)). In some cases, the direct connection request 210 may include a relay user key (e.g., a PRUK) for use in establishing relay keys for a secure communication link. In some cases, the PRUK may by provisioned at the remote UE 115-*a* by a key management function.

Based on the RSC of the remote UE 115-*a* and the relay user key, the relay UE 115-*b* may format a control plane message that includes a relay key request 215 that is provided to the core network via connection 205-*b* with the base station 105-*a* (e.g., via a Uu link). The relay UE 115-*b* may receive a relay key response 220 from the core network via the base station 105-*a*. In some cases, as discussed herein, the relay key response 220 may be provided from a PKMF and an AMF of a 5GC via the base station 105-*a*. In response to receiving the relay key response 220, the relay UE 115-*b* may transmit a direct security mode command 225 to the remote UE 115-*a*, which may be used to derive relay keys at the remote UE 115-*a*, followed by a direct security mode command complete 230 transmission from the remote UE 115-*a* to the relay UE 115-*b*., and establish the direct connection. The connection 205-*a* may include a PC5 interface (e.g., a Uu interface, such as a virtual Uu interface) for communications via the relay connection, and the connection 205-*b* may include a Uu interface for communication via the relay connection. In some cases, the direct connection request 210 may include a request to establish an L3 relay connection between the remote UE 115-*a* and the base station 105-*a* via the relay UE 115-*b*. The L3 relay connection may include the remote UE 115-*a* being unknown to the base station 105-*a*, and the base station 105-*a* may communicate with the relay UE 115-*b* knowing that the communications are being relayed to some additional wireless device but not knowing any specific information about the remote UE 115-*a* (e.g., apart from the relay services requested by the relay UE 115-*b* and corresponding RSC). In some examples, the relay UE 115-*b* may transmit the relay key request 215 with a PC5 signaling message (PC5-S) direct communication request or a PC5-S security mode command or a PC5-S link modification request message.

Such techniques may allow for establishment of security protection over the connection 205-*a* (e.g., a PC5 unicast link) between the remote UE 115-*a* and relay UE 115-*b*. In some deployments, such as in some factory automation or other commercial use cases, the remote UE 115-*a* may not have a prior security association with the relay UE 115-*b*, and thus dynamic security establishment techniques such as discussed herein may allow for efficient establishment of the connection 205-*a* with appropriate security keys for encrypting and decrypting communications. Further, in 5G deployments, ProSe functions may not be provided in the user plane, and thus control plane based security establishment may allow for establishment of the relay keys with a PKMF that may be located in the 5GC or outside of the 5GC. Examples of 5GC functions are illustrated in FIG. 3 for one exemplary deployment.

Figure 3:
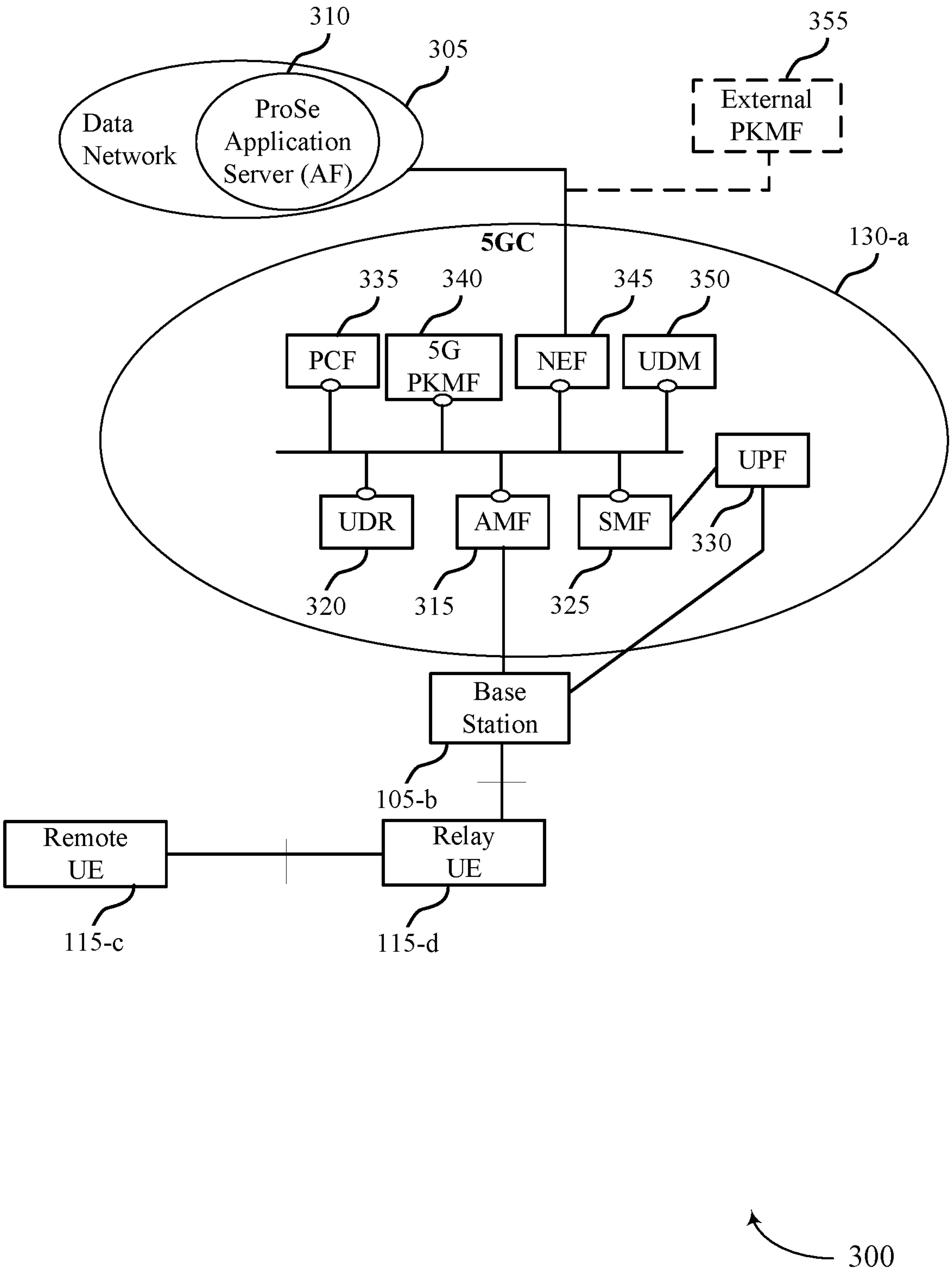
FIG. 3 illustrates an example of core network functions in a wireless communications system that supports relay sidelink communications for secure link establishment in accordance with aspects of the present disclosure.

FIG. 3 illustrates an example of a core network functions in a wireless communications system 300 that supports relay sidelink communications for secure link establishment in accordance with aspects of the present disclosure. In some examples, core network functions in a wireless communications system 300 may implement aspects of wireless communications system 100 or 200. In this example, a remote UE 115-*c* (e.g., a UE 115 of FIG. 1 or 2) may establish a link (e.g., a PC5 link or the like) with a relay UE 115-*d* (e.g., a UE 115 of FIG. 1 or 2), and the relay UE 115-*d* may establish a link (e.g., a Uu link or the like) with base station 105-*b* (e.g., a base station 105 of FIG. 1 or 2).

In this example, the base station 105-*b* communicates with a core network 130-*a* (e.g., a core network 130 of FIG. 1). The core network 130-*a* may provide user authentication, access authorization, tracking, Internet Protocol (IP) connectivity, and other access, routing, or mobility functions.

The core network 130-*a* in this example, is a 5GC, which may include at least one control plane entity that manages access and mobility, such as AMF 315, and at least one user plane entity that routes packets or interconnects to external networks such as user plane function (UPF) 330. The user plane entity may be connected to the network operators IP services, for example. For sidelink communications, the core network 130-*a* may include an NEF 345 that may provide access to a data network 305 which may have a ProSe application server function (AF) 310. The core network 130-*a* in this example may also include a Unified Data Repository (UDR) 320, a PCF 335, a session management function (SMF) 325, a UDM 350 function, and a 5G PKMF 340.

As discussed herein, the relay UE 115-*d* may transmit a relay key request as a NAS message towards AMF 315, and the AMF 315 may select a proper PKMF 340 and forward the message (e.g., based on the RSC provided by the relay UE 115-*d*). In some cases, the AMF 315 may forward the relay key request to an external PKMF 355 via the NEF 345 (e.g., in cases where the remote UE 115-*c* is from a different public land mobile network (PLMN)). In the example of FIG. 3, the 5G PKMF 340 is located in the 5GC control plane, and can provision the keys and key IDs to the remote UE 115-*c* during the 5GC registration procedure (e.g., by using a PCF UE provisioning procedure). In some cases, there may be multiple 5G PKMFs 340 in a PLMN, and the AMF 315 can route the signaling to the appropriate PKMF based on the RSC provided by the relay UE 115-*d* in the NAS signaling. Alternatively, the relay UE-115-*d* may provide in the NAS message some specific identifier of the PKMF to use, and AMF will route it accordingly.

Figure 4:
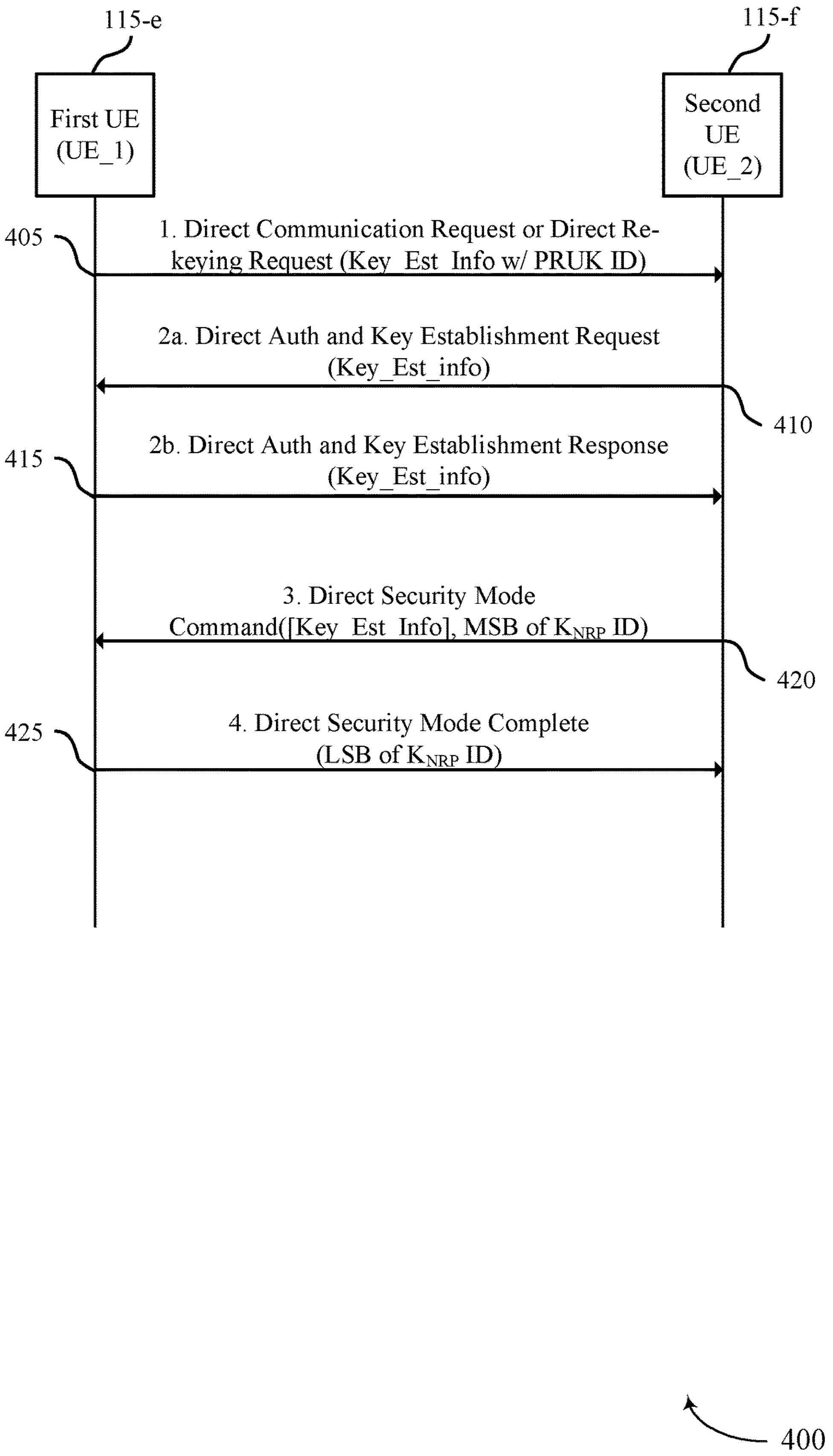
FIGS. 4 and 5 illustrate examples of process flows that support relay sidelink communications for secure link establishment in accordance with aspects of the present disclosure.

FIG. 4 illustrates an example of a process flow 400 that supports relay sidelink communications for secure link establishment in accordance with aspects of the present disclosure. In some examples, process flow 400 may implement aspects of wireless communications system 100, 200, or 300. For example, process flow 400 may include a first UE 115-*e* (e.g., a remote UE) and a second UE 115-*f* (e.g., a relay UE), which may be examples of corresponding UEs 115 as described above with reference to FIGS. 1-3.

In the following description of the process flow 400, the operations between the first UE 115-*e* and the second UE 115-*f* may be performed in a different order than the example order shown, or the operations performed by the first UE 115-*e* and the second UE 115-*f* may be performed in different orders or at different times. Some operations may also be omitted from the process flow 400, and other operations may be added to the process flow 400. The operations performed by first UE 115-*e* and the second UE 115-*f* may support establishment of relay keys and, in some examples, may promote improvements to sidelink communication establishment and security for the UEs 115.

In some cases, the first UE 115-*e* and the second UE 115-*f* may perform a relay discovery procedure. For example, a UE-to-Network Relay discovery approach may be based on the use of RSCs. In some cases, the RSC may include an identification for a connectivity service the second UE 115-*f* provides (e.g., a ProSe UE-to-Network relay). The UEs 115 may be provisioned with the authorized RSCs as part of a policy (e.g., ProSe policy) indicated to the UEs 115 during an authorization and provisioning procedure by the PCF.

At 405, the first UE 115-*e* may transmit a direct communication request to the second UE 115-*f* (or a direct re-keying request). In some cases, the direct communication request may include key establishment information, which may include a PRUK ID and a RSC. For example, the direct communication request may be an L3 relaying request with an RSC and the PRUK ID, etc. In some cases, the key may be a root key, such as but not limited to a $K_{NRP}$, which may correspond to a 256-bit root key that is shared between the two entities that may communicate using an NR PC5 unicast link. In some cases, the direct communication request may include the first UE 115-*e* a nonce (for generation of a session key such as a $K_{NRP}$-secs from the $K_{NRP}$), an indication of security capabilities of the first UE 115-3 (e.g., the list of algorithms that the first UE 115-*e* can accept for the connection), the first UE's 115-*e* signaling security policy and the most significant 8-bits of its $K_{NRP}$-secs ID (e.g., that may be selected that the UE will be able to locally identify a security context that is created by this procedure), a $K_{NRP}$ ID if the first UE 115-*e* has an existing $K_{NRP}$ for the second UE 115-*f* that it is trying to communicate with. The absence of the $K_{NRP}$ ID parameter indicates that the first UE 115-*e* does not have a $K_{NRP}$ for the second UE 115-*f*.

At 410, if the first UE 115-*e* does not have the $K_{NRP}$ ID parameter, the first UE 115-*e* may transmit a direct authorization and key establishment request, which may include information for key establishment. At 415, the first UE 115-*e* may transmit a direct authorization and key establishment response, which may include information for key establishment. Exchanging information for key establishment between the UEs 115 may allow each UE 115 to derive relay keys when communications are commenced.

At 420, the second UE 115-*f* may transmit a direct security mode command to the first UE 115-*e*. The direct security mode command may include the key establishment information (e.g., Key_Est_Info), and an identifier (e.g., the 7 MSBs) of the $K_{NRP}$ ID parameter. In some cases, the second UE 115-*f* may include a second nonce to allow a session key to be calculated, and may include an indication (e.g., in a Chosen_algs parameter) of which security algorithms the UEs 115 will use to protect the data in the message. The second UE 115-*f* may calculate $K_{NRP\text{-}Sess}$ from $K_{NRP}$ and both the first nonce and second nonce (e.g., Nonce_1, Nonce_2) and then derive the confidentiality and integrity keys based on the chosen algorithms. The second UE 115-*f* is then ready to receive both signaling and user plane traffic protected with the new security context.

At 425, the first UE 115-*e* may transmit a direct security mode complete message. The direct security mode command may include the key establishment information, and an identifier (e.g., the 7 LSBs) of the $K_{NRP}$ ID parameter. In some cases, on receiving the direct security mode command, the first UE 115-*e* may verify the command (e.g., by confirming that received LSBs of a $K_{NPR\text{-}sess}$ ID are unique). Upon verification of the command, the first UE 115-*e* may calculate $K_{NRP}$-sess and the confidentiality and integrity keys in a similar manner as they are calculated at the second UE 115-*f*. The first UE 115-*e* is then ready to send and receive signaling and user plane traffic with the new security context.

Figure 5:
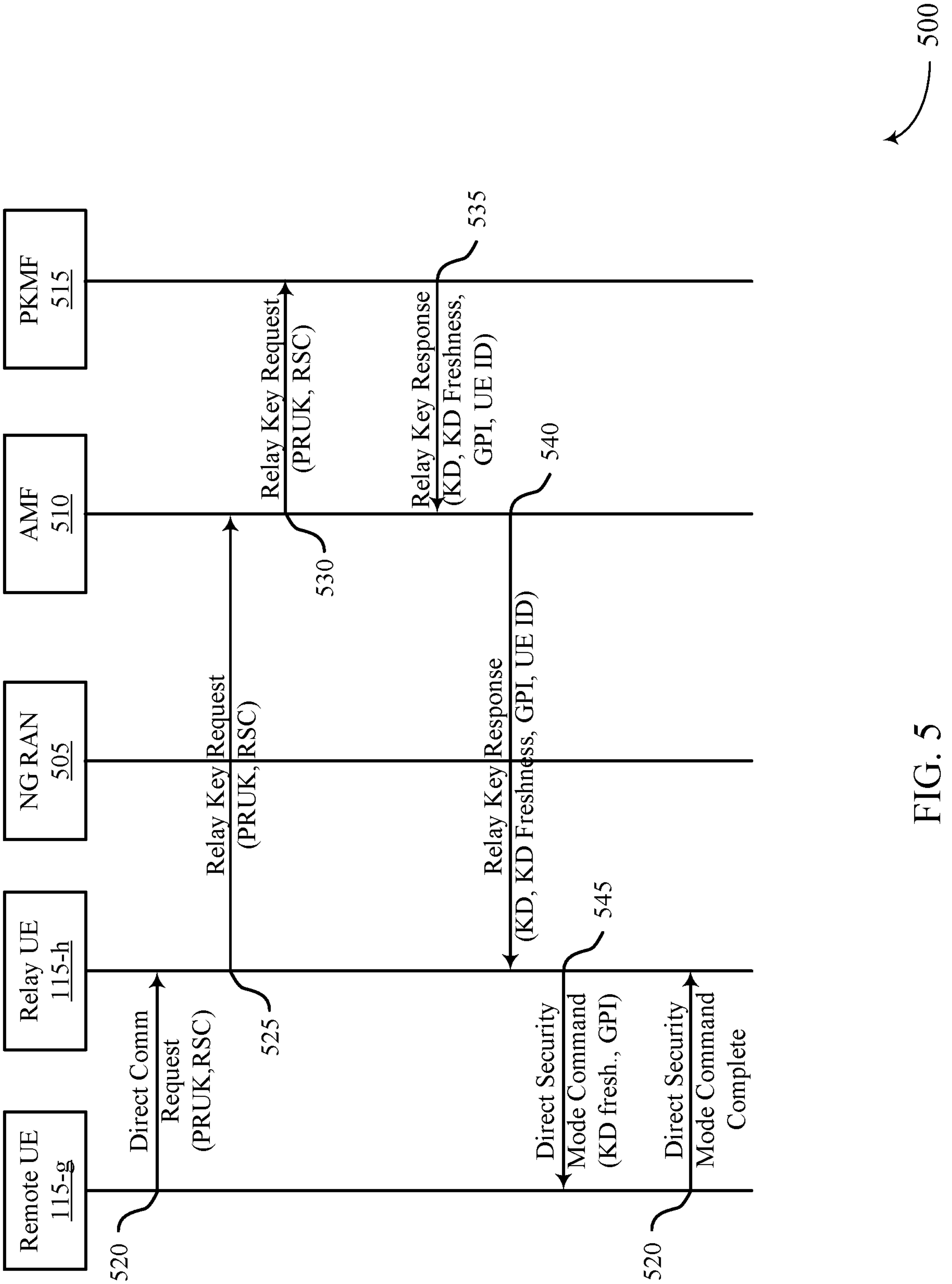

FIG. 5 illustrates an example of a process flow 500 that supports relay sidelink communications for secure link establishment in accordance with aspects of the present disclosure. In some examples, process flow 500 may implement aspects of wireless communications system 100, 200, or 300. For example, process flow 500 may include an NG-RAN device 505 (e.g., a base station), a remote UE 115-*g*, a relay UE 115-*h*, an AMF 510, and a PKMF 515, which may be examples of corresponding devices as described above with reference to FIGS. 1-4.

In the following description of the process flow 500, the operations between devices may be performed in a different order than the example order shown, certain operations may be combined, or performed at different times. Some operations may also be omitted from the process flow 500, and other operations may be added to the process flow 500. The operations performed by remote UE 115-*g* and the relay UE 115-*h* may support establishment of relay keys and, in some examples, may promote improvements to sidelink communication establishment and security for the UEs 115.

At 520, the remote UE 115-*g* may transmit a direct communication request to the relay UE 115-*h*. In some cases, the remote UE 115-*g* may determine to transmit the request after relay discovery and selection, such as discussed with reference to FIG. 4. The direct communication request may include information elements that provide the PRUK ID and a RSC, in some cases. The PRUK ID may be a key ID PKMF provisioned to the remote UE 115-*g*, may be an identification stored in a universal subscriber identify module (USIM) or in mobile equipment (ME), may be an IMSI, may be a GPSI, or a SUCI. In some cases, the PRUK may be provisioned at the remote UE 115-*g* by a key management function. In some cases, the PRUK ID may be a key ID provisioned at the remote UE 115-*g* by the key management function.

At 525, the relay UE 115-*h* may transmit a relay key request to the AMF 510 (e.g., via the NG-RAN 505). In some case, the relay key request may be provided in a NAS message towards the AMF 510 having a type of Relay Key Request with the RSC visible to the AMF 510. The AMF 510 may verify first if the relay UE 115-*h* is authorized to operate as a relay. Once the relay UE 115-*h* authorization is confirmed, the AMF may use the indicated RSC to select a proper PKMF 515 to which to forward the message (e.g., a PKMF that has the remote UE's 115-*g* information). In some cases, the remote UE 115-*g* may be from a different PLMN, and the AMF 510 may use an inter-PLMN interface to route the message to the PKMF 515 in another PLMN indicated in the RSC. In other cases, the AMF 510 may forward the message to the PKMF 515 of the its own PLMN, and the PKMF 515 may access another PLMN's PKMF indicated by the RSC.

At 530, the AMF 510 may transmit the relay key request to the PKMF 515. In some cases, the AMF 510 may include an identification of the relay UE 115-*h* (e.g., IMSI, GPSI, or SUCI depending on whether PKMF 515 is in the same PLMN as the AMF 510). The PKMF 515 will use this information to determine if the relay UE 115-*h* is authorized to serve the remote UE 115-*g*. In some cases, the PKMF 515 may access a UDM or other network function (NF) to retrieve necessary information about the relay UE 115-*h* and remote UE 115-*g*.

At 535, the PKMF 535 may transmit a relay key response to the AMF 510. The PKMF 515 may derive the relay keys (e.g., key(s) KD, and associated KD freshness parameter that may indicate an associated valid time period) using established key identification/derivation techniques (e.g., as described in 3GPP TS 33.303) and provide the related information in the relay key response to the relay UE 115-*g* via the AMF 510. In some cases, the PKMF 515 may access one or more external entities for the key derivation. In some cases, the PKMF 515 may be an external entity to a PLMN of the AMF 510, and the AMF 510 may communicate with the PKMF 515 it via a NEF. In some cases, the PKMF 515 may obtain an AV from an AUSF, such as based on the IMSI/SUCI, and may generate GBA push information GPI.

In some cases, the PKMF 515 may interact with one or more other functions of the core network to generate the security keys. For example, in some cases the PKMF 515 may interact with the AUSF for obtaining the AV, and an authentication and key agreement (AKA) protocol may require the AUSF to check remote UE's 115-*g* response before providing the SUPI(/IMSI) to the AMF 510. In some cases, in order to provide such a verification, AKA protocol messages may be exchanged prior to the PKMF 515 providing the relay key response, to allow the AUSF to obtaining the response from the remote UE 115-*g* before sending the SUPI. In other cases, the PKMF 515 may indicate to the AUSF that this is an special case of relay communications, which may allow the AUSF to directly provide the SUPI and AV. In other cases, a specific response for the AKA process from the remote UE 115-*g* may be based on the GPI or PRUK to allow the SUPI to be fetched to AMF.

At 540, the AMF 510 may forward the relay key response (e.g., via the NG-RAN 505 or base station) to the relay UE 115-*h*. At 545, the relay UE 115-*h* may transmit a direct security mode command to the remote UE 115-*g*. In some cases, the relay UE 115-*h* may use the information from the relay key response to derive the relay keys (e.g., using established security key techniques, such as described in 3GPP TS 33.303), and forward related information to the remote UE 115-*g* in the direct security mode command. In some cases, the relay UE 115-*h* may also indicate the KD Freshness parameter and the GPI received from the PKMF 515.

At 550, the remote UE 115-*g* may transmit a direct security mode command complete message to the relay UE 115-*h*. The remote UE 115-*g* may turn on security for the PC5 link based on the received information.

Figure 6A:
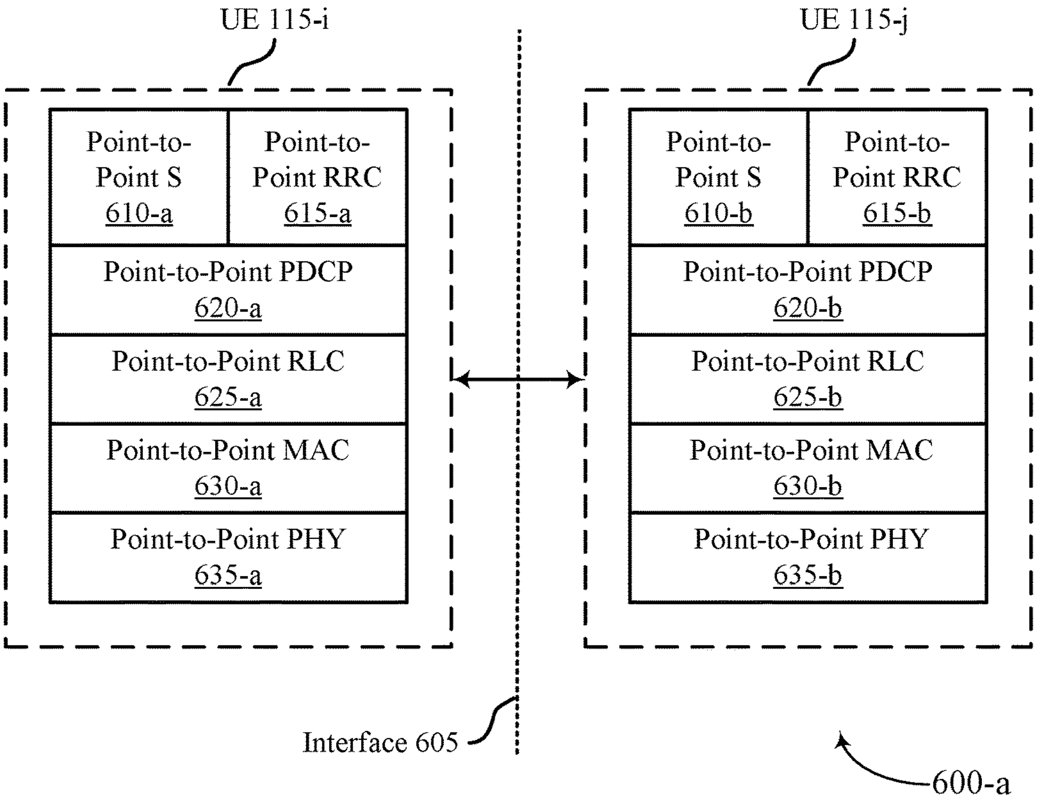
FIGS. 6A, 6B, and 7 illustrate examples of relay configurations that support relay sidelink communications for secure link establishment in accordance with aspects of the present disclosure.
Figure 6B:
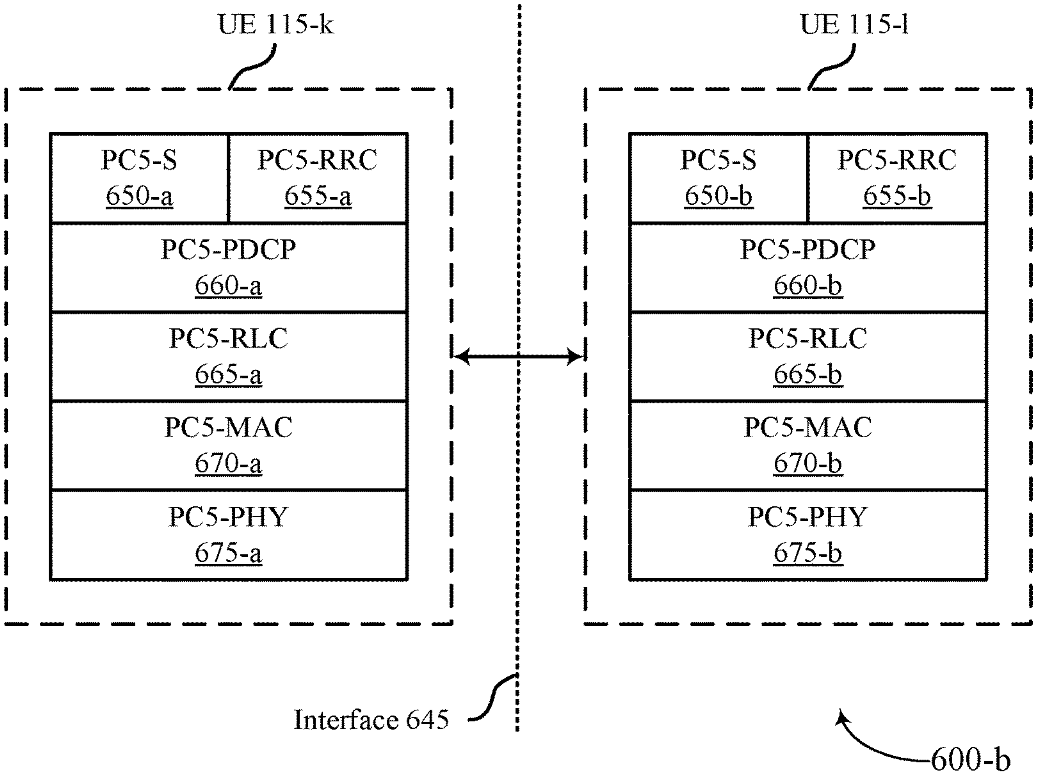

FIGS. 6A and 6B illustrate examples of relay configurations 600 (e.g., relay configuration 600-*a* and relay configuration 600-*b*) that support relay sidelink communications for secure link establishment in accordance with aspects of the present disclosure. In some examples, relay configuration 600-*a* and relay configuration 600-*b* may implement aspects of wireless communications system 100, 200, or 300.

In the example of FIG. 6A, relay configuration 600-*a* may include a UE 115-*i* and a UE 115-*j*, which may be examples of UEs 115 as described herein with reference to FIGS. 1-5. Additionally, as described herein, the UE 115-*i* may be referenced as a remote UE, and the UE 115-*j* may be referenced as a relay UE 115. Accordingly, the UE 115-*i* and the UE 115-*j* may communicate with each other over a link that includes an interface 605-*a*. In some cases, the link may be a unicast link. In some cases, the link may be a physical layer link. In some cases, link may be a type of sidelink for enabling direct communication between two devices. In some cases, the UE 115-*i* and the UE 115-*j* may communicate based on a relay connection (e.g. an L3 relay connection). In some cases, the relay connection may use security keys established through signaling as described above with reference to FIGS. 1-5.

Relay configuration 600-*a* may include a protocol stack (e.g., a control plane protocol stack) in each of the UEs 115 for the relay configuration. As part of the unicast link between the UEs 115 and to enable the sidelink communications, each UE 115 may use control protocols based on the interface 605. The link may be set up prior to relaying communications from the UE 115-*i* to a base station via the UE 115-*j*. Based on the relay connection, the UE 115-*i* (e.g., remote UE) may not include an access stratum connection with the network (e.g., RAN) over the relay connection through the UE 115-*j* (e.g., relay UE). In some cases, the UE 115-*i* may include a non-access stratum connection with a core network (e.g., 5GC or the like) using a non-standardized interworking function.

In some cases, each protocol stack in each UE 115 may include point-to-point functionality for sidelink communications in a point-to-point 610 function (e.g., 610-*a* and 610-*b*). The point-to-point sidelink 610 function may provide functionality for a UE (e.g., UE 115-*i*) to directly communicate with another UE (e.g., UE 115-*j*) over a direct channel. Each protocol stack in each UE 115 may also include a point-to-point function for RRC layer messaging in a point-to-point RRC 615 function (e.g., 615-*a* and 615-*b*), a point-to-point function for PDCP layer messaging in a point-to-point PDCP 620 function (e.g., 620-*a* and 620-*b*), a point-to-point function for RLC layer messaging in a point-to-point RLC 625 function (e.g., 625-*a* and 625-*b*), a point-to-point function for MAC layer messaging in a point-to-point MAC 630 function (e.g., 630-*a* and 630-*b*), and a point-to-point function for physical layer (PHY) messaging in a point-to-point PHY 635 function (e.g., 635-*a* and 635-*b*). For the link between the UE 115-*i* and UE 115-*j*, a direct mapping may be used for communicating messages on the respective layers between these two UEs 115. For example, messaging on the PDCP layer may be communicated between the point-to-point PDCP 620-*a* of the UE 115-*i* and the point-to-point PDCP 620-*b* of the UE 115-*j*, messaging on the MAC layer may be communicated between the point-to-point MAC 630-*a* of the UE 115-*i* and the point-to-point MAC 630-*b* of the UE 115-*j*, etc.

In the example of FIG. 6B, relay configuration 600-*b* may include a UE 115-*k* and a UE 115-1, which may be examples of UEs 115 as described herein with reference to FIGS. 1-5. Additionally, as described herein, the UE 115-*k* may be referenced as a remote UE, and the UE 115-1 may be referenced as a relay UE 115. Accordingly, the UE 115-*k* and the UE 115-1 may communicate with each other over a unicast link that includes an interface 645, such as a PC5 interface. In some cases, the UE 115-*k* and the UE 115-1 may communicate based on an L3 relay connection using security keys established through control plane signaling as described above with reference to FIGS. 1-5.

Relay configuration 600-*b* may include a control plane protocol stack in each of the UEs 115 for the L3 relay configuration. As part of the unicast link between the UEs 115 and to enable the sidelink communications, each UE 115 may use PC5 control protocols based on the interface 645. The PC5 unicast link may be set up prior to relaying communications from the UE 115-*k* to a base station via the UE 115-1. Based on the L3 relay connection, the UE 115-*k* (e.g., remote UE) may not include an access stratum connection with the network (e.g., RAN) over the relay connection through the UE 115-1 (e.g., relay UE). In some cases, the UE 115-*k* may include a non-access stratum connection with a core network (e.g., 5GC or the like) using a non-standardized interworking function.

In some cases, each control plane protocol stack in each UE 115 may include a PC5 function for sidelink communications in a PC5-S 650 function (e.g., 650-*a* and 650-*b*), a PC5 function for RRC layer messaging in a PC5-RRC 655 function (e.g., 655-*a* and 655-*b*), a PC5 function for PDCP layer messaging in a PC5-PDCP 660 function (e.g., 660-*a* and 660-*b*), a PC5 function for RLC layer messaging in a PC5-RLC 665 function (e.g., 665-*a* and 665-*b*), a PC5 function for MAC layer messaging in a PC5-MAC 670 function (e.g., 670-*a* and 670-*b*), and a PC5 function for PHY messaging in a PC5-PHY 675 function (e.g., 675-*a* and 675-*b*). For the unicast link between the UEs 115, a direct mapping may be used for communicating messages on the respective layers between the two UEs 115. For example, messaging on the PDCP layer may be communicated between the PC5-PDCP 660-*a* of the UE 115-*k* and a PC5-PDCP 660-*b* of the UE 115-1, messaging on the MAC layer may be communicated between the PC5-MAC 670-*a* of the UE 115-*k* and the PC5-MAC 670-*b* of the UE 115-1, etc.

Figure 7:
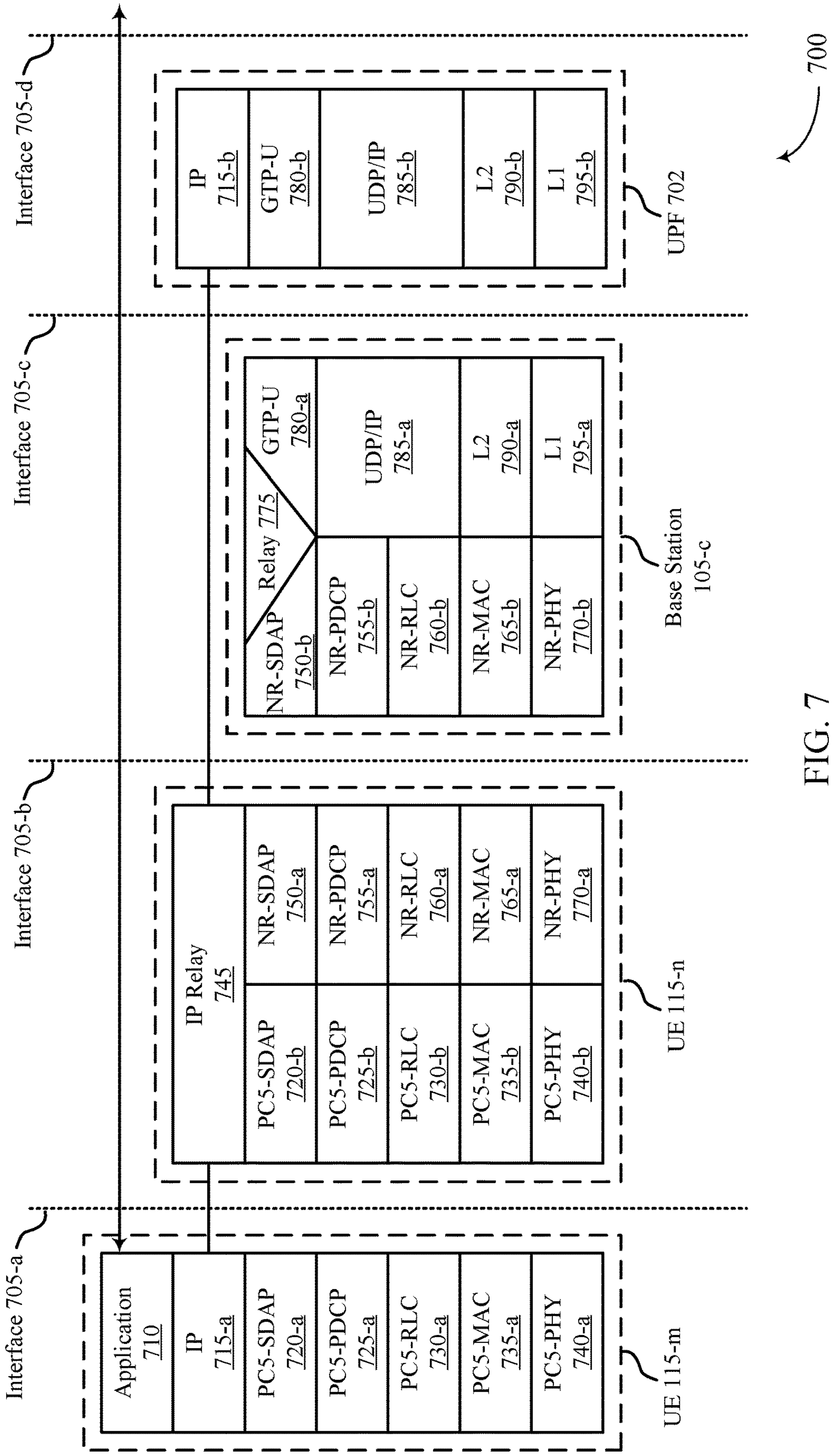

FIG. 7 illustrates another example of a relay configuration 700 that supports relay sidelink communications for secure link establishment in accordance with aspects of the present disclosure. In some examples, relay configuration 700 may implement aspects of wireless communications system 100, 200, or 300. In this example, relay configuration 700 may include a UE 115-*m*, a UE 115-*n*, and a base station 105-*c*, which may be examples of UEs 115 and base stations 105, respectively, as described herein with reference to FIGS. 1-5. Additionally, relay configuration 700 may include a UPF 702 (e.g., as part of a network device or 5GC).

As described herein, the UE 115-*m* may be referenced as a remote UE, and the UE 115-*n* may be referenced as a relay UE 115. Accordingly, the UE 115-*m* and the UE 115-*n* may communicate with each other over a unicast link that includes an interface 705-*a*, such as but not limited to a PC5 interface. In some cases, the UE 115-*m* and the UE 115-*n* may communicate based on an L3 relay connection as described above with reference to FIGS. 1-5, where the UE 115-*m* relays communications between the UE 115-*n* and the base station 105-*c* using communications secured by relay keys that are established based on control plane signaling. The UE 115-*n* may communicate with the base station 105-*c* over an interface 705-*b*, such as but not limited to a Uu interface. Additionally, the base station 105-*c* may communicate with the UPF 702 over an interface 705-*c*, such as but not limited to an N3 interface, and the UPF 702 may communicate with other network functions and devices over an interface 705-*d*, such as but not limited to an N6 interface.

Relay configuration 700 may include user plane protocol stacks in each of the wireless devices (e.g., the UEs 115, the base station 105-*c*, and the UPF 702) for the L3 relay configuration. In some cases, the UE 115-*m* may include an application layer 710 that communicates with the network. Additionally, the UE 115-*m* may include an IP layer 715-*a* that communicates with an IP layer 715-*b* of the UPF 702 via an IP relay 745 of the UE 115-*n*.

As described herein, the UE 115-*m* and the UE 115-*n* may communicate over the unicast link on a PC5 interface (e.g., the interface 705-*a*), such that respective layers of each UE 115 are directly mapped to the other UE 115. For example, each user plane protocol stack in each UE 115 may include a PC5 function for a service data adaptation protocol (SDAP) in a PC5-SDAP 720 function (e.g., for mapping a QoS flow within a PDU session to a corresponding DRB), a PC5 function for PDCP layer messaging in a PC5-PDCP 725 function, a PC5 function for RLC layer messaging in a PC5-RLC 730 function, a PC5 function for MAC layer messaging in a PC5-MAC 735 function, and a PC5 function for PHY messaging in a PC5-PHY 740 function, where the messaging on the respective layers/protocols are directly communicated on the corresponding layers/protocols of each UE 115.

Additionally, the UE 115-*n* (e.g., relay UE) may then map any communications from or to the PC5 user plane protocol stack to an NR user plane protocol stack for the Uu interface (e.g., the interface 705-*b*) with the base station 105-*c*. For example, communications from the base station 105-*c* intended for the UE 115-*m* over the relay connection may be mapped from the NR user plane protocol stack to the PC5 user plane protocol stack, and communications from the UE 115-*m* intended for the base station 105-*c* over the relay connection may be mapped from the PC5 user plane protocol stack to the NR user plane protocol stack. Accordingly, the NR user plane protocol stack of the UE 115-*n* may include corresponding protocols/layers that map to the PC5 user plane protocol stack. For example, the NR user plane protocol stack may include an NR-SDAP 750 function, an NR-PDCP 755 function, an NR-RLC 760 function, an NR-MAC 765 function, and an NR-PHY 770 function that correspond to the respective PC5 functions.

In some cases, the base station 105-*c* may also include an NR user plane protocol stack to communicate with the UE 115-*n* with corresponding NR functions (e.g., across the interface 705-*b*, such as the Uu interface). Accordingly, the UE 115-*n* and the base station 105-*c* may communicate by mapping messages on each layer/protocol to the corresponding layer/protocol of the other wireless device. Additionally, the base station 105-*c* may include a relay 775 component that maps messages received from the UE 115-*n* across the interface to 705-*b* to different protocols/layers for communicating with the UPF 702. For example, the base station 105-*c* may map messaging for the NR-SDAP 750 function to a general packet radio service (GPRS) tunneling protocol (GTP) for user data (GTP-U) 780, for the NR-PDCP 755 and NR-RLC 760 functions to a user datagram protocol (UDP)/IP 785, for the NR-MAC 765 function to an L2 protocol 790, and for the NR-PHY 770 function to a Layer 1 (L1) protocol 795. Subsequently, the base station 105-*c* may then communicate with the UPF 702 by transmitting/receiving messages on each of the functions/protocols to respective functions/protocols of the UPF 702.

Figure 8:
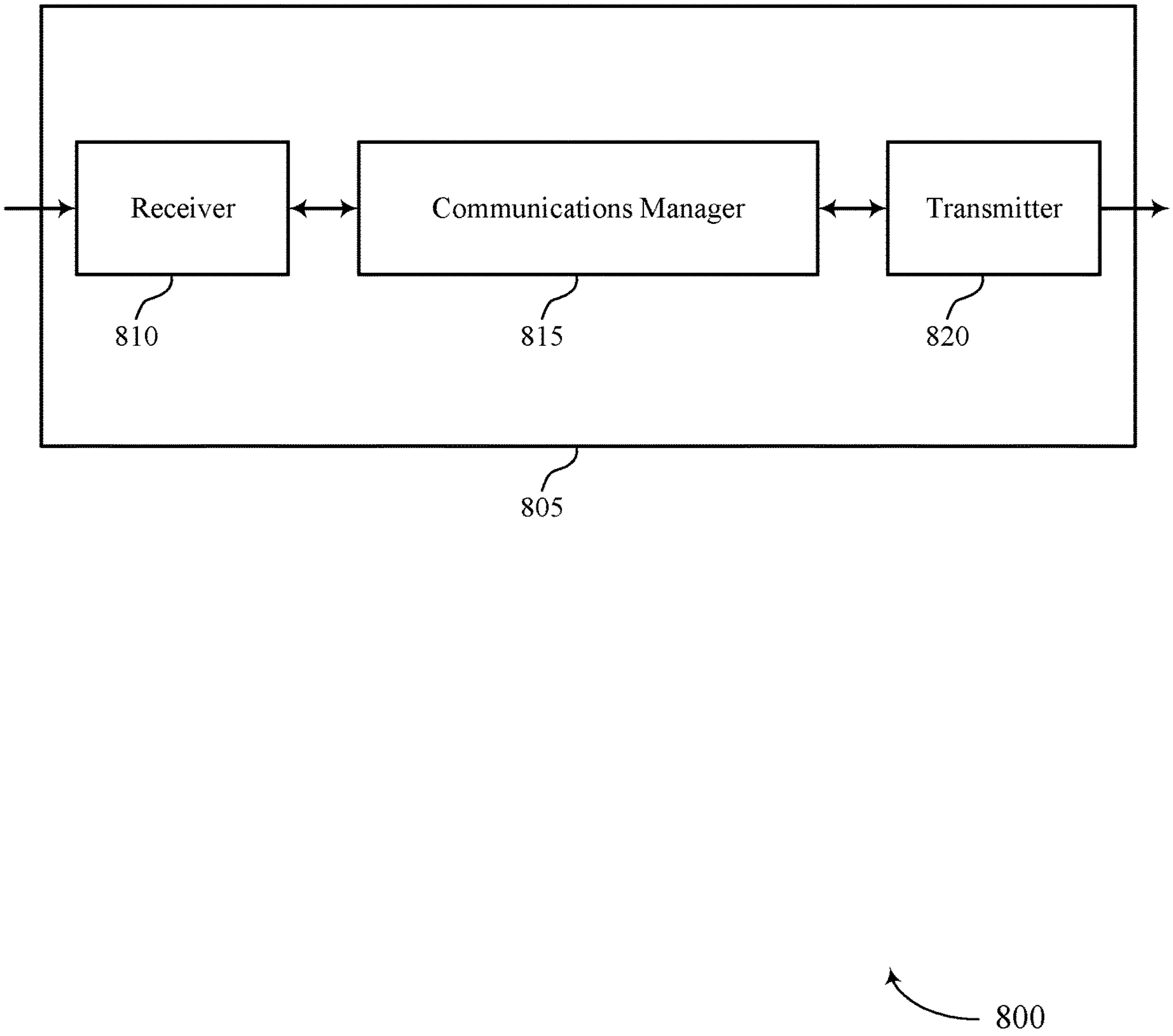
FIGS. 8 and 9 show block diagrams of devices that support relay sidelink communications for secure link establishment in accordance with aspects of the present disclosure.

FIG. 8 shows a block diagram 800 of a device 805 that supports relay sidelink communications for secure link establishment in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to relay sidelink communications for secure link establishment, etc.). Information may be passed on to other components of the device 805. The receiver 810 may be an example of aspects of the transceiver 1120 described with reference to FIG. 11. The receiver 810 may utilize a single antenna or a set of antennas.

The receiver 810 may be an example of means for performing various aspects of relay sidelink communications as described herein. The receiver 410, or its sub-components, may be implemented in hardware (e.g., in receiver or transceiver circuitry). The circuitry may comprise a processor, a digital signal processor (DSP), an application-specific integrated circuit (ASIC), a field programmable gate array (FPGA), or other programmable logic device, discrete gate or transistor logic, discrete hardware components, or any combination thereof designed to perform the functions described in the present disclosure.

In some examples or implementations, receiver 810, or its sub-components, may be implemented in code (e.g., as receiver or transceiver management software or firmware) executed by a processor, or any combination thereof. If implemented in code executed by a processor, the functions of the receiver 810, or its sub-components may be executed by a general-purpose processor, a DSP, an ASIC, an FPGA, or other programmable logic device.

In some cases, the communications manager 815 may receive, at the relay UE from a remote UE, a direct communication request to communicate with a network through the relay UE, transmit, to the remote UE, a direct communication command that includes the relay key information, transmit, responsive to the direct communication request, a control plane message to a key management function associated with the network to request relay key information for communications between the remote UE and the relay UE, and receive, responsive to the request for the relay key information, a relay key response from the network that includes the relay key information for direct communications between the remote UE and the relay UE.

In some cases, the communications manager 815 may also transmit, to a relay UE, a direct communication request to communicate with a network through the relay UE, the direct communication request including a PRUK ID and a RSC, transmit, to the relay UE, a direct security mode command complete indication responsive to enabling security for direct communications with the relay UE, receive, responsive to the direct communication request, a direct security mode command from the relay UE that includes relay key information for direct communications between the remote UE and the relay UE, and derive one or more security keys for communications with the relay UE based on the relay key information. The communications manager 815 may be an example of aspects of the communications manager 1110 described herein.

The communications manager 815 may be an example of means for performing various aspects of power saving of smart repeaters as described herein. The communications manager 815, or its sub-components, may be implemented in hardware (e.g., in communications management circuitry). The circuitry may comprise a processor, a DSP, an ASIC, an FPGA, or other programmable logic device, discrete gate or transistor logic, discrete hardware components, or any combination thereof designed to perform the functions described in the present disclosure.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 815 to provide or support a means for performing various operations (e.g., receiving, determining, deriving, formatting, transmitting, etc.) using or otherwise in cooperation with the receiver 810, transmitter 820, or both.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

The transmitter 820 may be an example of means for performing various aspects of relay sidelink communications as described herein. The transmitter 820, or its sub-components, may be implemented in hardware (e.g., in transmitter or transceiver circuitry). The circuitry may comprise a DSP, an ASIC, an FPGA, or other programmable logic device, discrete gate or transistor logic, discrete hardware components, or any combination thereof designed to perform the functions described in the present disclosure.

In some examples or implementations, transmitter 820, or its sub-components, may be implemented in code (e.g., as transmitter or transceiver management software or firmware) executed by a processor, or any combination thereof. If implemented in code executed by a processor, the functions of the transmitter 820, or its sub-components may be executed by a general-purpose processor, a DSP, an ASIC, an FPGA, or other programmable logic device.

Figure 9:
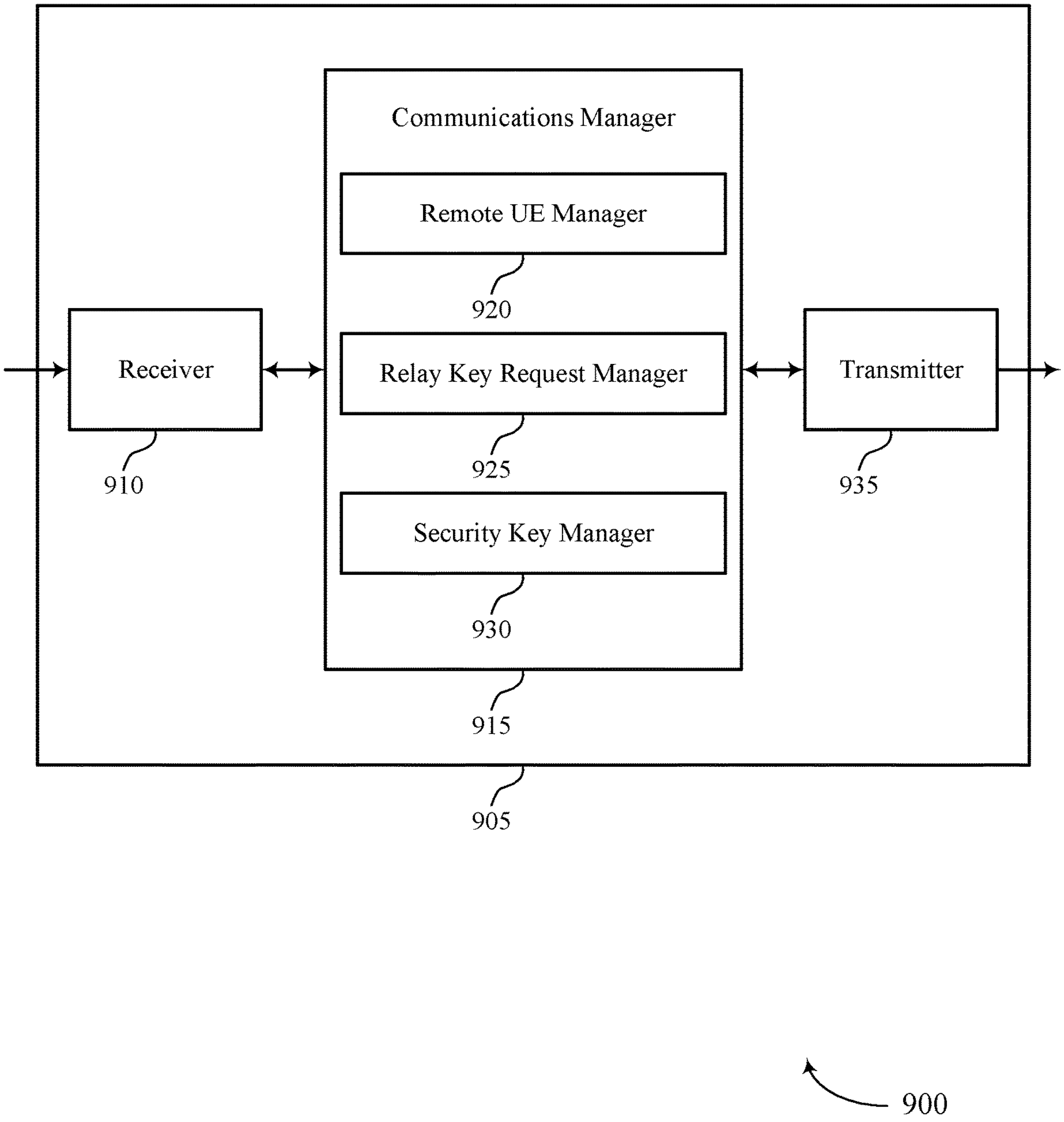

FIG. 9 shows a block diagram 900 of a device 905 that supports relay sidelink communications for secure link establishment in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to relay sidelink communications for secure link establishment, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a remote UE manager 920, a relay key request manager 925, and a security key manager 930. The communications manager 915 may be an example of aspects of the communications manager 1110 described herein.

In some cases, the remote UE manager 920 may receive, at the relay UE from a remote UE, a direct communication request to communicate with a network through the relay UE and transmit, to the remote UE, a direct communication command that includes the relay key information. The relay key request manager 925 may transmit, responsive to the direct communication request, a control plane message to a key management function associated with the network to request relay key information for communications between the remote UE and the relay UE. The security key manager 930 may receive, responsive to the request for the relay key information, a relay key response from the network that includes the relay key information for direct communications between the remote UE and the relay UE.

In some cases, the relay key request manager 925 may transmit, to a relay UE, a direct communication request to communicate with a network through the relay UE, the direct communication request including a PRUK ID and a RSC and transmit, to the relay UE, a direct security mode command complete indication responsive to enabling security for direct communications with the relay UE. The security key manager 930 may receive, responsive to the direct communication request, a direct security mode command from the relay UE that includes relay key information for direct communications between the remote UE and the relay UE and derive one or more security keys for communications with the relay UE based on the relay key information.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
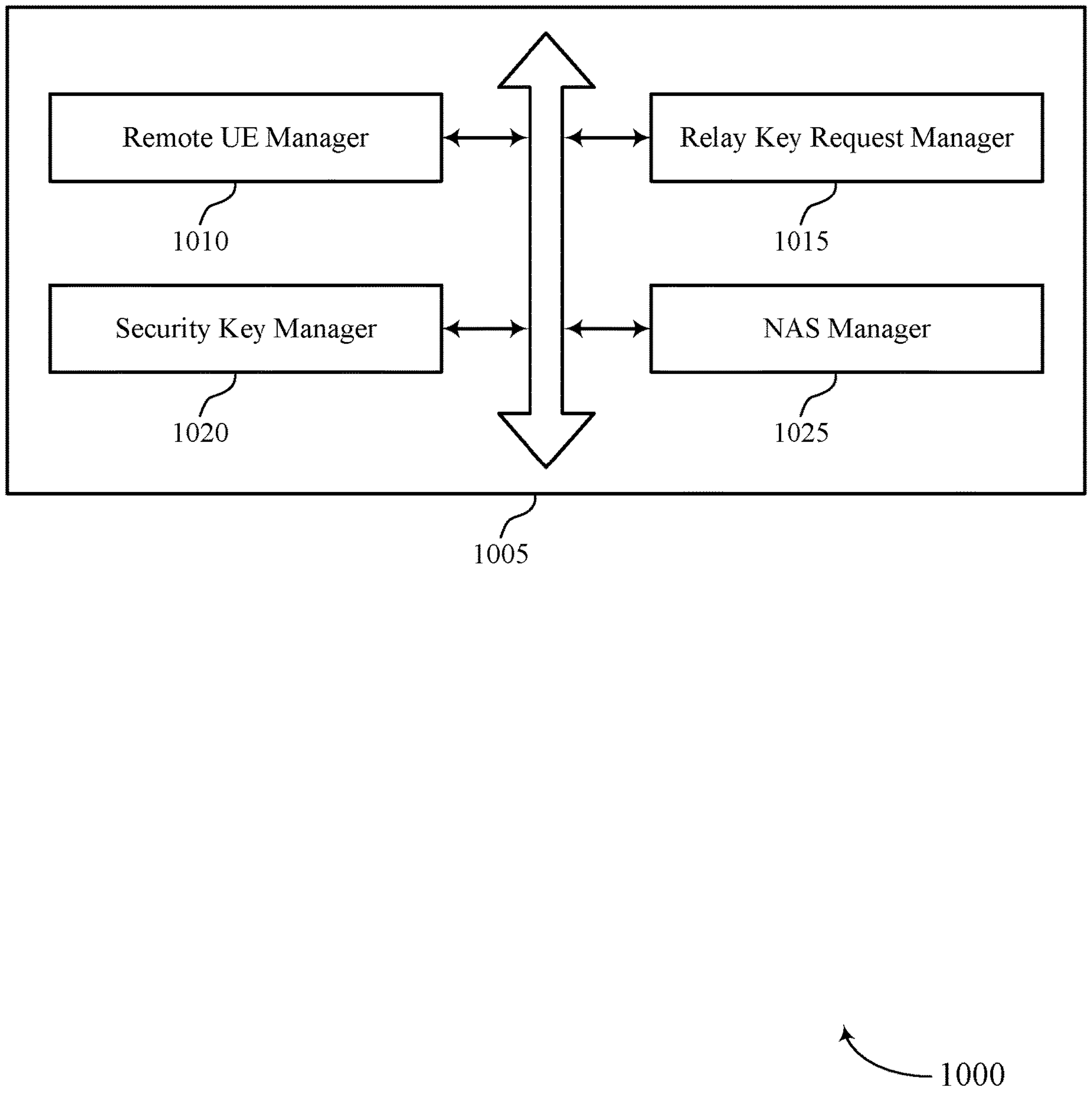
FIG. 10 shows a block diagram of a communications manager that supports relay sidelink communications for secure link establishment in accordance with aspects of the present disclosure.

FIG. 10 shows a block diagram 1000 of a communications manager 1005 that supports relay sidelink communications for secure link establishment in accordance with aspects of the present disclosure. The communications manager 1005 may be an example of aspects of a communications manager 815, a communications manager 915, or a communications manager 1110 described herein. The communications manager 1005 may include a remote UE manager 1010, a relay key request manager 1015, a security key manager 1020, and a NAS manager 1025. Each of these modules may communicate, directly or indirectly, with one another (e.g., via one or more buses).

The remote UE manager 1010 may receive, at the relay UE from a remote UE, a direct communication request to communicate with a network through the relay UE. In some examples, the remote UE manager 1010 may transmit, to the remote UE, a direct communication command that includes the relay key information. In some cases, the relay UE provides an L3 UE-to-network relay service or an L2 UE-to-network relay service between the network and the remote UE.

The relay key request manager 1015 may transmit, responsive to the direct communication request, a control plane message to a key management function associated with the network to request relay key information for communications between the remote UE and the relay UE.

In some examples, the relay key request manager 1015 may transmit, to a relay UE, a direct communication request to communicate with a network through the relay UE, the direct communication request including a PRUK ID and a RSC. In some examples, the relay key request manager 1015 may transmit, to the relay UE, a direct security mode command complete indication responsive to enabling security for direct communications with the relay UE. In some examples, the relay key request manager 1015 may format the PRUK ID in a first information element, and the RSC in a second information element, and where the direct communication request includes the first information element and the second information element. In some cases, the PRUK ID includes a key identification that is provisioned to the remote UE by a key management function, an IMSI, a GPSI, or a SUC1, of the remote UE.

The security key manager 1020 may receive, responsive to the request for the relay key information, a relay key response from the network that includes the relay key information for direct communications between the remote UE and the relay UE.

In some examples, the security key manager 1020 may receive, responsive to the direct communication request, a direct security mode command from the relay UE that includes relay key information for direct communications between the remote UE and the relay UE.

In some examples, the security key manager 1020 may derive one or more security keys for communications with the relay UE based on the relay key information.

In some examples, the security key manager 1020 may receive key establishment information from the remote UE that includes a relay user key identification and an RSC. In some examples, the security key manager 1020 may receive a KD, a KD freshness parameter, GBA push information GPI, and a remote UE identification. In some examples, the security key manager 1020 may derive security keys for direct communications with the remote UE based on the KD, the KD freshness parameter, the GPI, and the remote UE identification.

In some examples, the security key manager 1020 may communicate with the remote UE using the security keys. In some examples, the security key manager 1020 may transmit the KD freshness parameter and the GPI to the remote UE for use in communications with the relay UE.

In some cases, the relay user key identification is provided as a PRUK ID in a first information element, and a RSC in a second information element. In some cases, the PRUK ID is provisioned at the remote UE by the key management function, or is an IMSI, a GPSI, or a SUCI, of the remote UE. In some cases, the PRUK is provisioned at the remote UE by the key management function. In some cases, the information related to the relay key includes one or more of a KD, a KD freshness parameter, GBA push information GPI, or any combinations thereof.

The NAS manager 1025 may transmit a NAS message to an AMF of the network that includes the request for the relay key. In some cases, the control plane message includes information to allow the AMF to route the request for relay key information to the key management function.

Figure 11:
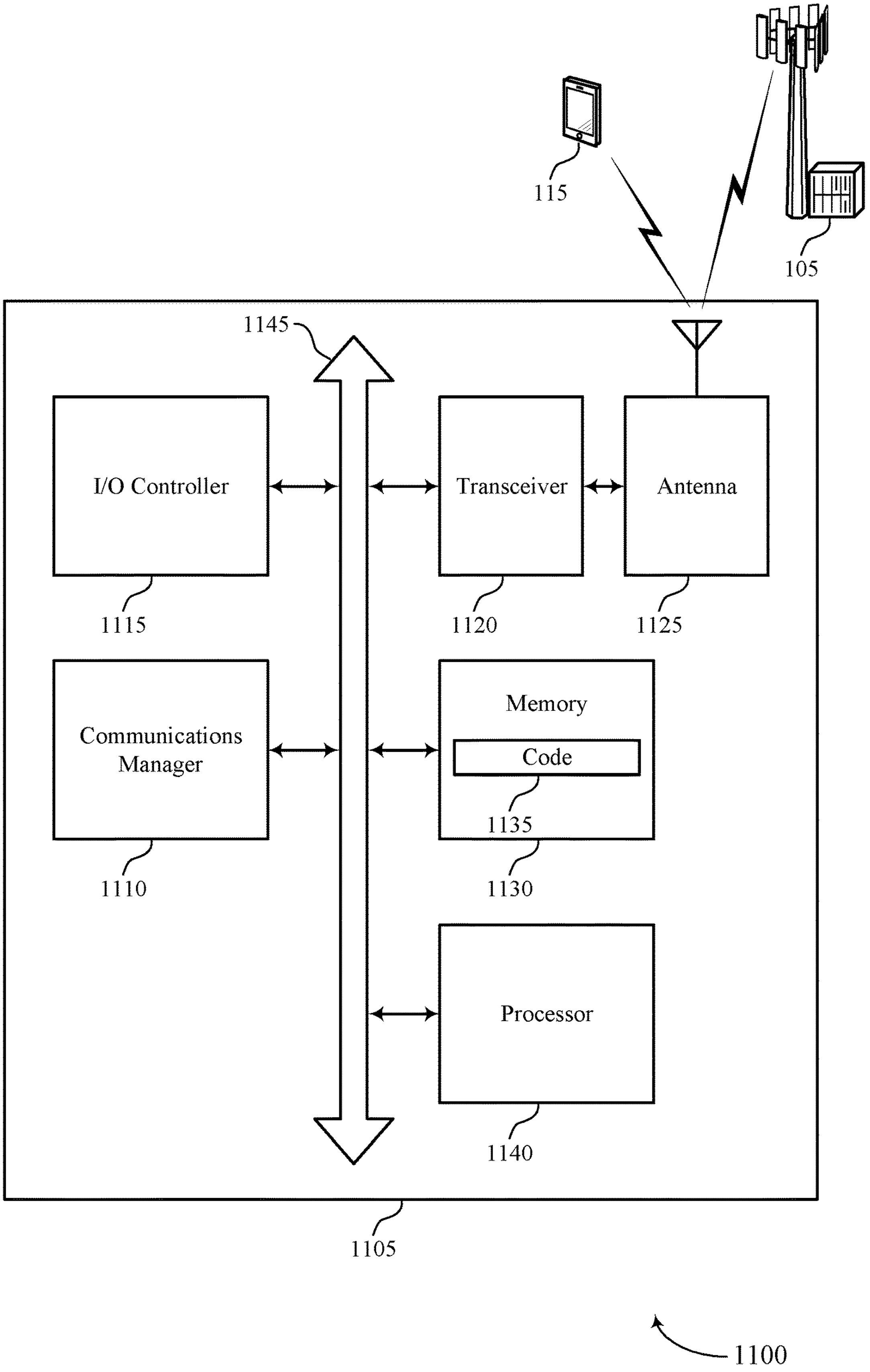
FIG. 11 shows a diagram of a system including a device that supports relay sidelink communications for secure link establishment in accordance with aspects of the present disclosure.

FIG. 11 shows a diagram of a system 1100 including a device 1105 that supports relay sidelink communications for secure link establishment in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

In some cases, the communications manager 1110 may receive, at the relay UE from a remote UE, a direct communication request to communicate with a network through the relay UE, transmit, to the remote UE, a direct communication command that includes the relay key information, transmit, responsive to the direct communication request, a control plane message to a key management function associated with the network to request relay key information for communications between the remote UE and the relay UE, and receive, responsive to the request for the relay key information, a relay key response from the network that includes the relay key information for direct communications between the remote UE and the relay UE.

In some cases, the communications manager 1110 may also transmit, to a relay UE, a direct communication request to communicate with a network through the relay UE, the direct communication request including a PRUK ID and a RSC, transmit, to the relay UE, a direct security mode command complete indication responsive to enabling security for direct communications with the relay UE, receive, responsive to the direct communication request, a direct security mode command from the relay UE that includes relay key information for direct communications between the remote UE and the relay UE, and derive one or more security keys for communications with the relay UE based on the relay key information.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting relay sidelink communications using direct communication requests and/or security keys for secure link establishment).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
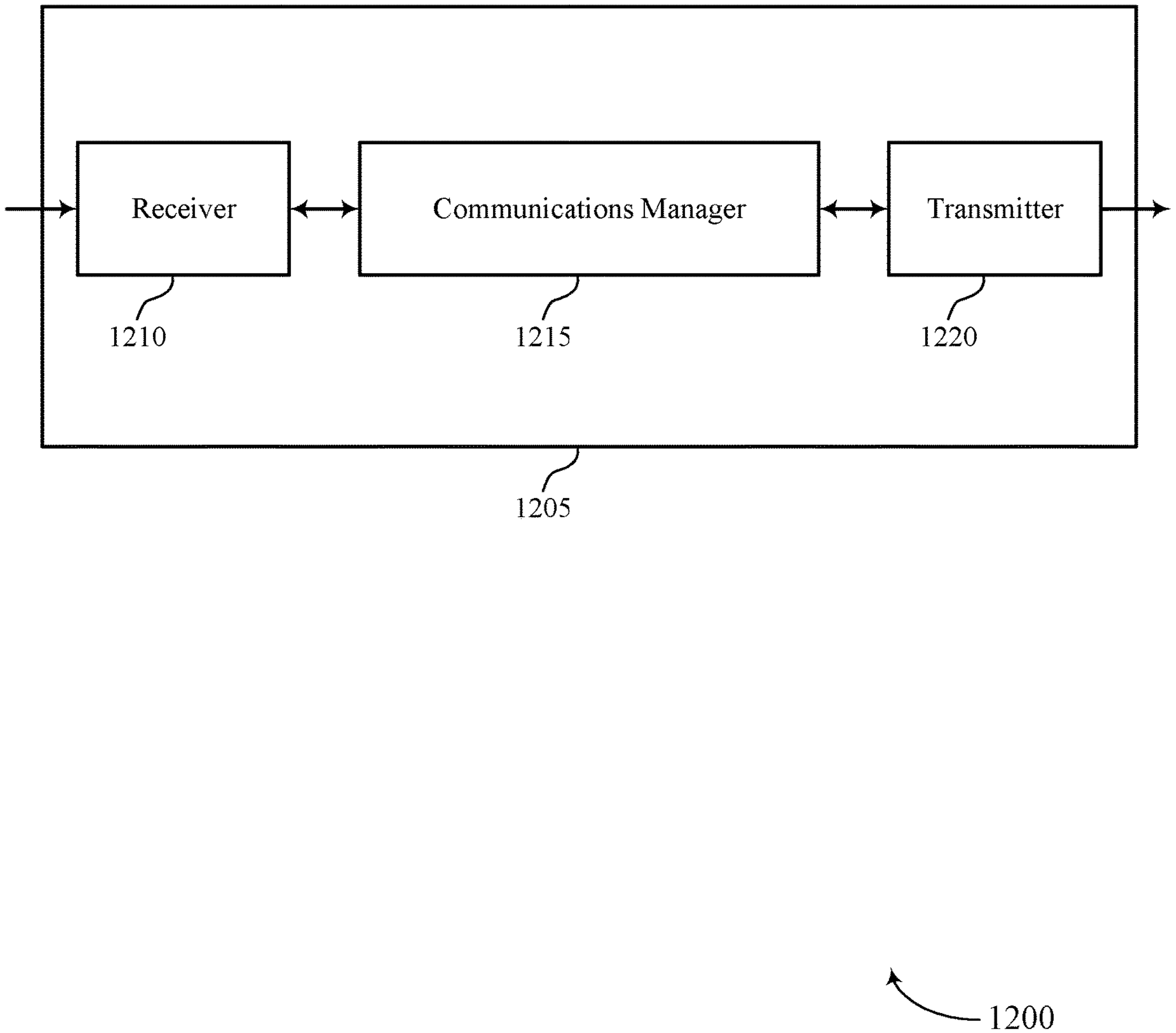
FIGS. 12 and 13 show block diagrams of devices that support relay sidelink communications for secure link establishment in accordance with aspects of the present disclosure.

FIG. 12 shows a block diagram 1200 of a device 1205 that supports relay sidelink communications for secure link establishment in accordance with aspects of the present disclosure. The device 1205 may be an example of aspects of a base station 105 or a core network function (e.g., a key management function such as a PKMF) as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to relay sidelink communications for secure link establishment, etc.). Information may be passed on to other components of the device 1205. The receiver 1210 may be an example of aspects of the transceiver 1520 described with reference to FIG. 15. The receiver 1210 may utilize a single antenna or a set of antennas.

The receiver 1210 may be an example of means for performing various aspects of relay sidelink communications as described herein. The receiver 1210, or its sub-components, may be implemented in hardware (e.g., in receiver or transceiver circuitry). The circuitry may comprise a processor, a DSP, an ASIC, an FPGA, or other programmable logic device, discrete gate or transistor logic, discrete hardware components, or any combination thereof designed to perform the functions described in the present disclosure.

In some examples or implementations, receiver 1210, or its sub-components, may be implemented in code (e.g., as receiver or transceiver management software or firmware) executed by a processor, or any combination thereof. If implemented in code executed by a processor, the functions of the receiver 1210, or its sub-components may be executed by a general-purpose processor, a DSP, an ASIC, an FPGA, or other programmable logic device.

In some cases, the communications manager 1215 may receive, at the key management function, a first control plane message from a relay UE via an access and mobility function of a core network control plane, where the first control plane message includes a relay key request for direct communications between the relay UE and a remote UE, determine, responsive to the relay key request, a relay key response that includes information related to a relay key for direct communications between the remote UE and the relay UE, and transmit the relay key response to the relay UE in a second control plane message via the access and mobility function.

In some cases, the communications manager 1215 may receive, at a first network function of a core network control plane, a first control plane message from a relay UE, where the first control plane message includes a relay key request for direct communications between the relay UE and a remote UE, transmit the relay key response to the relay UE in a second control plane message, provide the first control plane message to a key management function, and receive, from the key management function, a relay key response that includes information related to a relay key for direct communications between the remote UE and the relay UE. The communications manager 1215 may be an example of aspects of the communications manager 1510 described herein.

The communications manager 1215 may be an example of means for performing various aspects of relay sidelink communications as described herein. The communications manager 1215, or its sub-components, may be implemented in hardware (e.g., in communications management circuitry). The circuitry may comprise a processor, a DSP, an ASIC, an FPGA, or other programmable logic device, discrete gate or transistor logic, discrete hardware components, or any combination thereof designed to perform the functions described in the present disclosure.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 1215 to provide or support a means for performing various operations (e.g., receiving, determining, accessing, deriving, formatting, generating, providing, transmitting, etc.) using or otherwise in cooperation with the receiver 1210, transmitter 1220, or both.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

The transmitter 1220 may be an example of means for performing various aspects of relay sidelink communications as described herein. The transmitter 1220, or its sub-components, may be implemented in hardware (e.g., in transmitter or transceiver circuitry). The circuitry may comprise a DSP, an ASIC, an FPGA, or other programmable logic device, discrete gate or transistor logic, discrete hardware components, or any combination thereof designed to perform the functions described in the present disclosure.

In some examples or implementations, transmitter 1220, or its sub-components, may be implemented in code (e.g., as transmitter or transceiver management software or firmware) executed by a processor, or any combination thereof. If implemented in code executed by a processor, the functions of the transmitter 1220, or its sub-components may be executed by a general-purpose processor, a DSP, an ASIC, an FPGA, or other programmable logic device.

Figure 13:
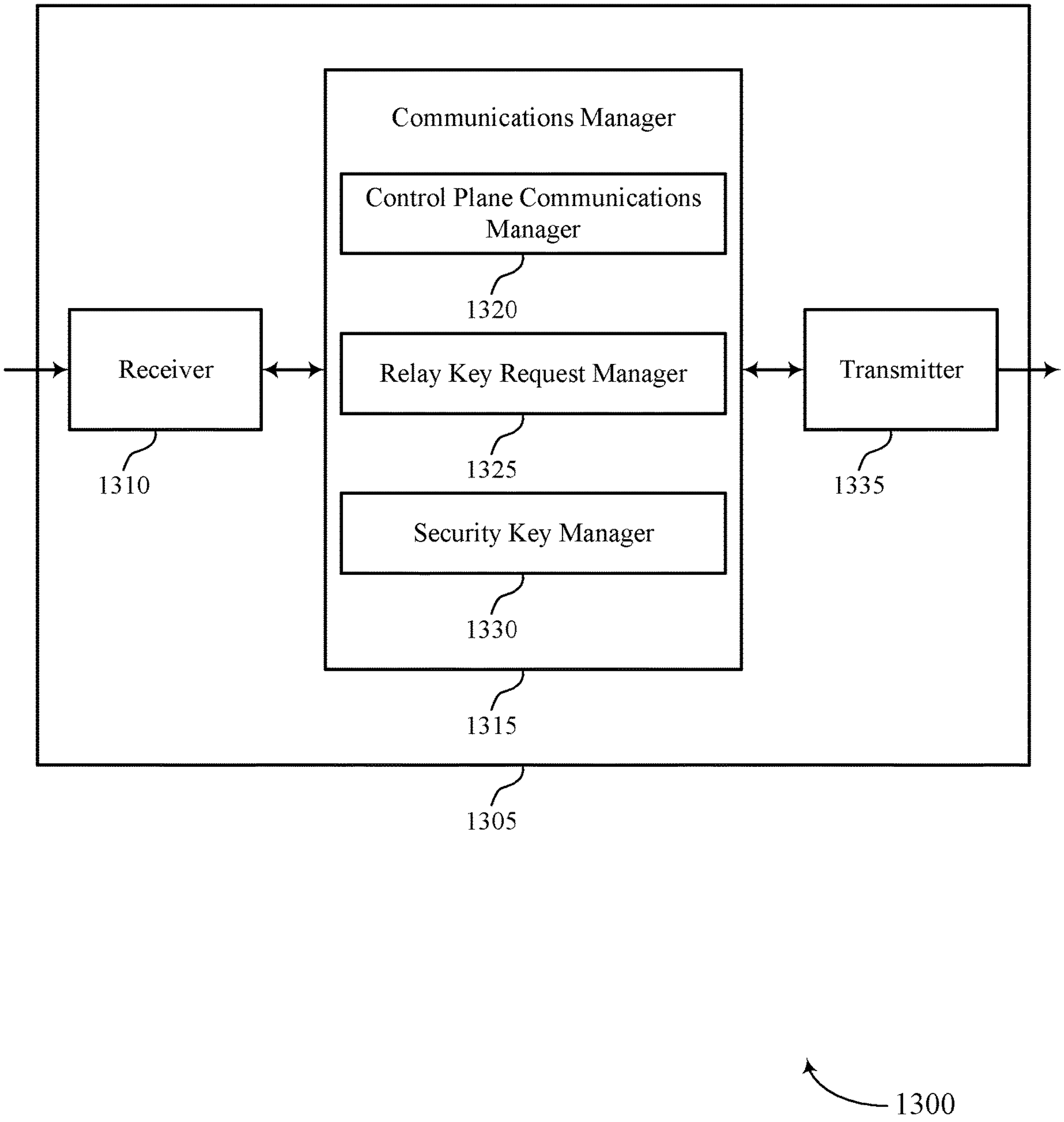

FIG. 13 shows a block diagram 1300 of a device 1305 that supports relay sidelink communications for secure link establishment in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to relay sidelink communications for secure link establishment, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a control plane communications manager 1320, a relay key request manager 1325, and a security key manager 1330. The communications manager 1315 may be an example of aspects of the communications manager 1510 described herein.

In some cases, the control plane communications manager 1320 may receive, at the key management function, a first control plane message from a relay UE via an access and mobility function of a core network control plane, where the first control plane message includes a relay key request for direct communications between the relay UE and a remote UE. The relay key request manager 1325 may determine, responsive to the relay key request, a relay key response that includes information related to a relay key for direct communications between the remote UE and the relay UE. The security key manager 1330 may transmit the relay key response to the relay UE in a second control plane message via the access and mobility function.

In some cases, the relay key request manager 1325 may receive, at a first network function of a core network control plane, a first control plane message from a relay UE, where the first control plane message includes a relay key request for direct communications between the relay UE and a remote UE and transmit the relay key response to the relay UE in a second control plane message. The control plane communications manager 1320 may provide the first control plane message to a key management function. The security key manager 1330 may receive, from the key management function, a relay key response that includes information related to a relay key for direct communications between the remote UE and the relay UE.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
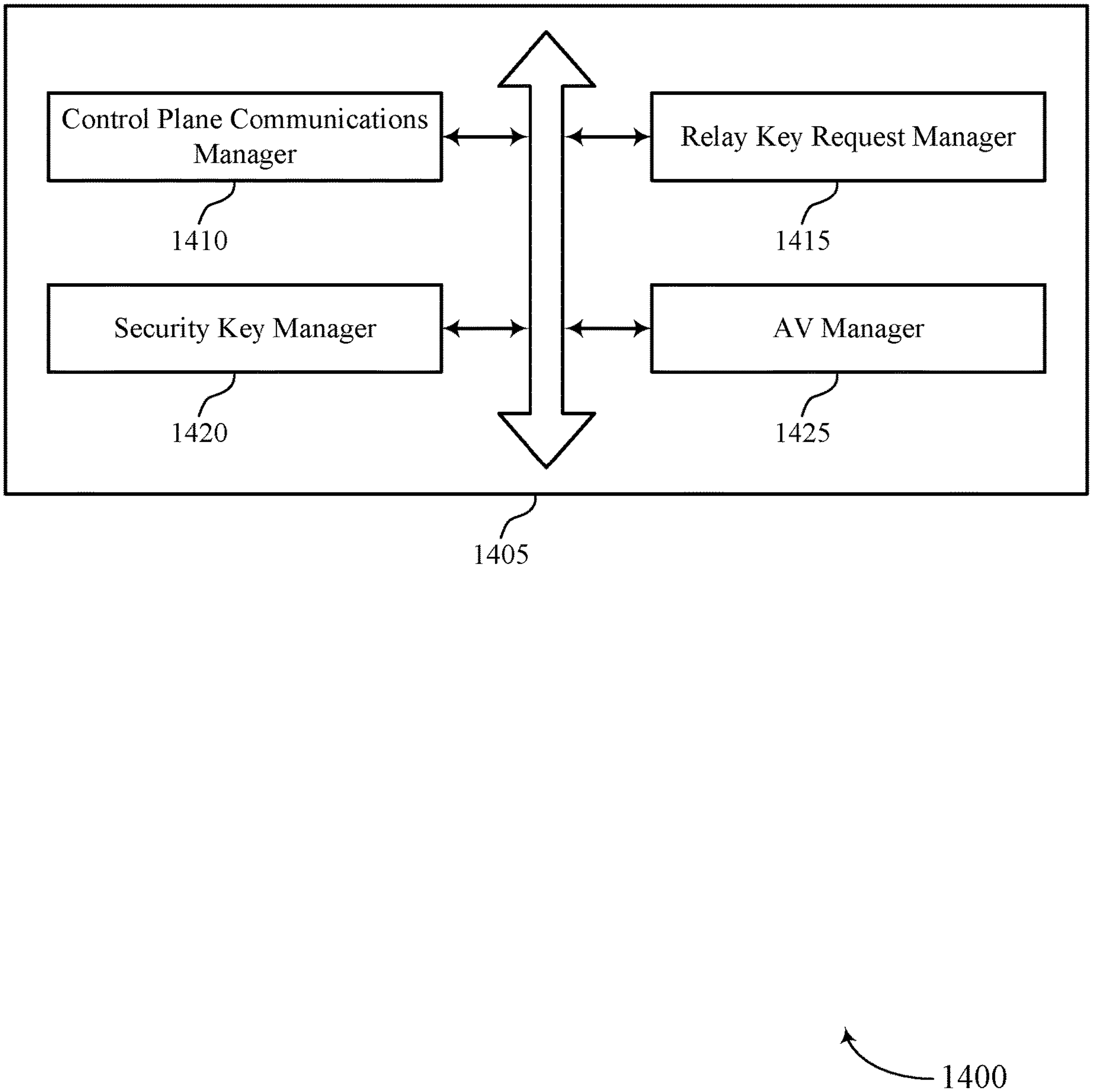
FIG. 14 shows a block diagram of a communications manager that supports relay sidelink communications for secure link establishment in accordance with aspects of the present disclosure.

FIG. 14 shows a block diagram 1400 of a communications manager 1405 that supports relay sidelink communications for secure link establishment in accordance with aspects of the present disclosure. The communications manager 1405 may be an example of aspects of a communications manager 1215, a communications manager 1315, or a communications manager 1510 described herein. The communications manager 1405 may include a control plane communications manager 1410, a relay key request manager 1415, a security key manager 1420, and an AV manager 1425. Each of these modules may communicate, directly or indirectly, with one another (e.g., via one or more buses).

The control plane communications manager 1410 may receive, at the key management function, a first control plane message from a relay UE via an access and mobility function of a core network control plane, where the first control plane message includes a relay key request for direct communications between the relay UE and a remote UE. In some examples, the control plane communications manager 1410 may provide the first control plane message to a key management function.

The relay key request manager 1415 may determine, responsive to the relay key request, a relay key response that includes information related to a relay key for direct communications between the remote UE and the relay UE.

In some examples, the relay key request manager 1415 may receive, at a first network function of a core network control plane, a first control plane message from a relay UE, where the first control plane message includes a relay key request for direct communications between the relay UE and a remote UE. In some examples, the relay key request manager 1415 may transmit the relay key response to the relay UE in a second control plane message. In some examples, the relay key request manager 1415 may access a UDM function, one or more other network functions, or combinations thereof, to determine that the relay UE is authorized to serve the remote UE.

In some examples, the relay key request manager 1415 may transmit an indication to an AUSF that the key management function has received the relay key request for direct communications between the relay UE and the remote UE. In some examples, the relay key request manager 1415 may receive a SUPI for the remote UE and an AV from the AUSF responsive to the indication.

In some cases, the relay key request includes a relay UE identification that is used to determine that the relay UE is authorized to serve the remote UE. In some cases, the relay UE identification includes an IMSI, a GPSI, or a SUCI, of the relay UE. In some cases, the relay key response does not include a SUPI for the remote UE, and where an AUSF of the core network verifies the remote UE identify subsequent to the relay key response.

The security key manager 1420 may transmit the relay key response to the relay UE in a second control plane message via the access and mobility function. In some examples, the security key manager 1420 may receive, from the key management function, a relay key response that includes information related to a relay key for direct communications between the remote UE and the relay UE. In some examples, the security key manager 1420 may derive security key information for direct communications between the relay UE and the remote UE. In some examples, the security key manager 1420 may format the security key information into the relay key response. In some examples, the security key manager 1420 may access one or more entities that are external to the core network control plane for the security key information.

In some cases, the key management function is a PKMF that is located in the core network control plane and that communicates with the relay UE via the access and mobility function. In some cases, the key management function is a PKMF that is located outside of the core network control plane and that communicates with the relay UE via the access and mobility function and an NEF.

In some cases, the security key information provides a KD, a KD freshness parameter, GBA push information GPI, and a remote UE identification. In some cases, the first network function is an AMF, and the key management function is a PKMF.

In some cases, the PKMF is located within the core network control plane. In some cases, the PKMF is located external to the core network control plane, and where an NEF of the core network control plane is couples with the AMF and provides the first control plane message to the PKMF. In some cases, the relay key request is received in a NAS message at the AMF. In some cases, the relay key response includes security key information that provides a KD, a KD freshness parameter, GBA push information GPI, and a remote UE identification.

The AV manager 1425 may receive an AV from an AUSF. In some examples, the AV manager 1425 may generate a generic bootstrapping architecture push information (GPI) communication based on the AV, and where the relay key response includes the GPI.

Figure 15:
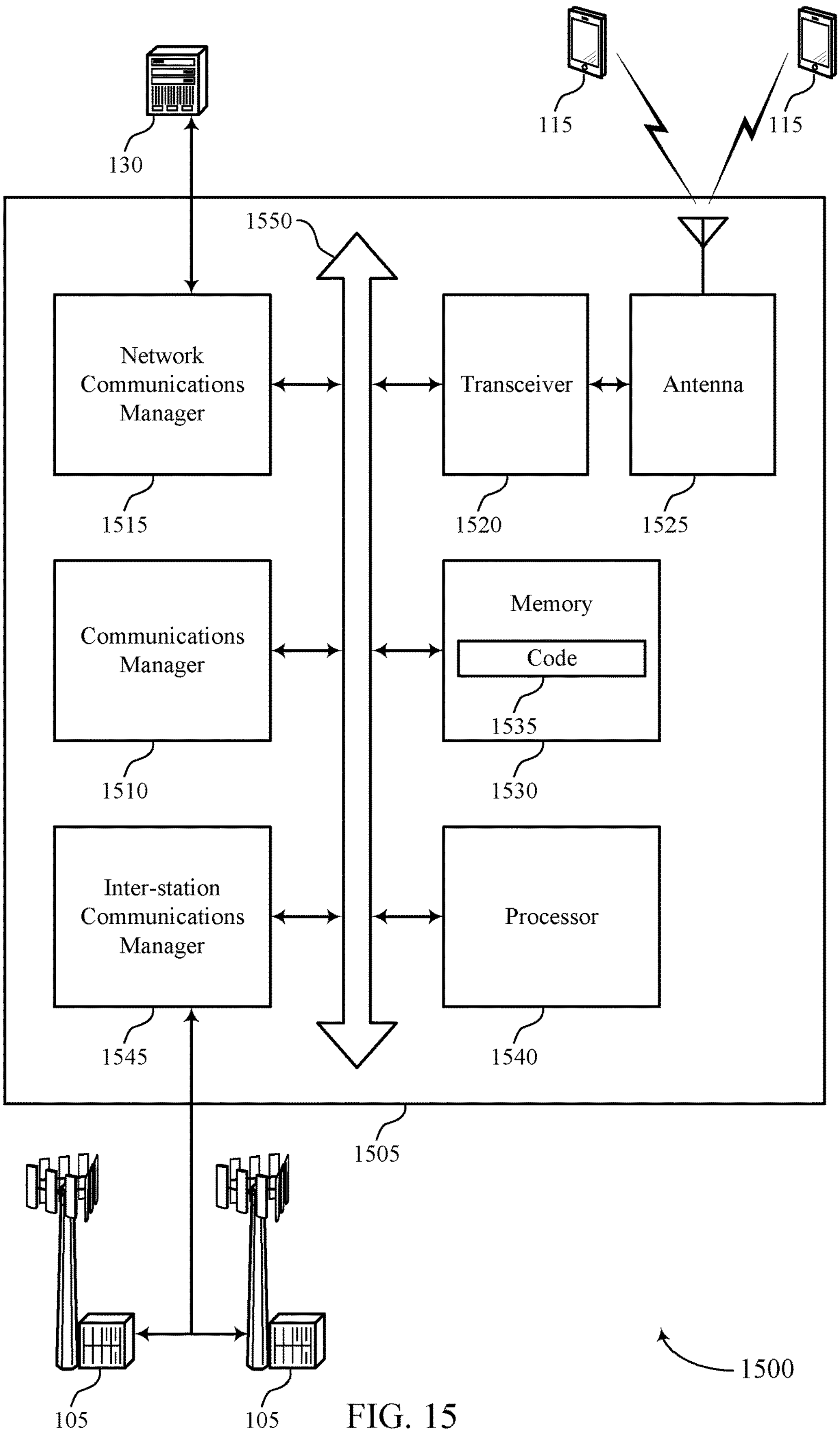
FIG. 15 shows a diagram of a system including a device that supports relay sidelink communications for secure link establishment in accordance with aspects of the present disclosure.

FIG. 15 shows a diagram of a system 1500 including a device 1505 that supports relay sidelink communications for secure link establishment in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

In some cases, the communications manager 1510 may receive, at the key management function, a first control plane message from a relay UE via an access and mobility function of a core network control plane, where the first control plane message includes a relay key request for direct communications between the relay UE and a remote UE, determine, responsive to the relay key request, a relay key response that includes information related to a relay key for direct communications between the remote UE and the relay UE, and transmit the relay key response to the relay UE in a second control plane message via the access and mobility function.

In some cases, the communications manager 1510 may also receive, at a first network function of a core network control plane, a first control plane message from a relay UE, where the first control plane message includes a relay key request for direct communications between the relay UE and a remote UE, transmit the relay key response to the relay UE in a second control plane message, provide the first control plane message to a key management function, and receive, from the key management function, a relay key response that includes information related to a relay key for direct communications between the remote UE and the relay UE.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting relay sidelink communications using direct communication requests and/or security keys for secure link establishment).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
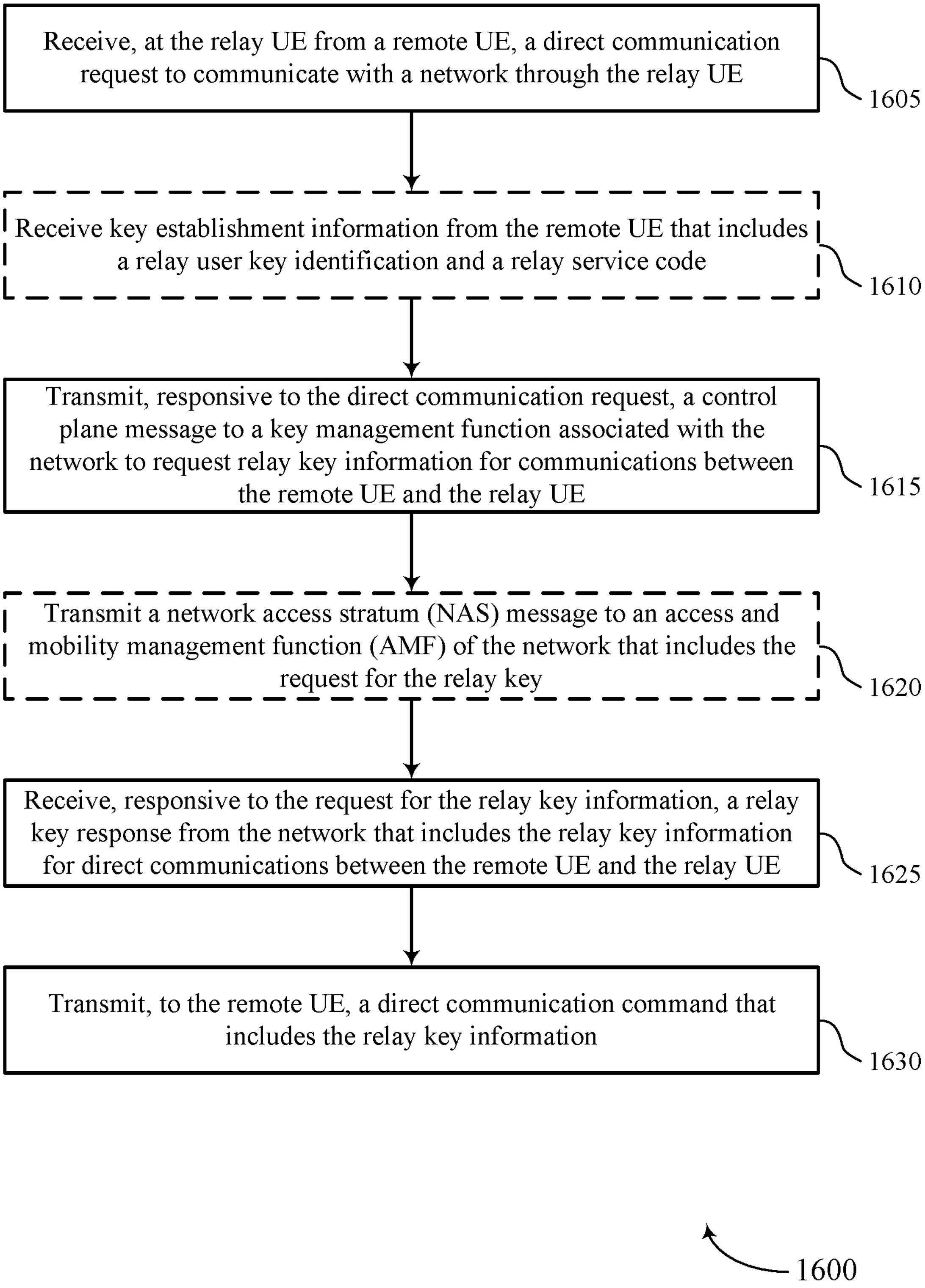
FIGS. 16 through 25 show flowcharts illustrating methods that support relay sidelink communications for secure link establishment in accordance with aspects of the present disclosure.

FIG. 16 shows a flowchart illustrating a method 1600 that supports relay sidelink communications for secure link establishment in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, at the relay UE from a remote UE, a direct communication request to communicate with a network through the relay UE. The operations of 1605 may be performed according to the methods described herein. In some examples, aspects of the operations of 1605 may be performed by a remote UE manager as described with reference to FIGS. 8 through 11.

Optionally, at 1610, the UE may receive key establishment information from the remote UE that includes a relay user key identification and an RSC. The operations of 1610 may be performed according to the methods described herein. In some examples, aspects of the operations of 1610 may be performed by a security key manager as described with reference to FIGS. 8 through 11.

At 1615, the UE may transmit, responsive to the direct communication request, a control plane message to a key management function associated with the network to request relay key information for communications between the remote UE and the relay UE. The operations of 1615 may be performed according to the methods described herein. In some examples, aspects of the operations of 1615 may be performed by a relay key request manager as described with reference to FIGS. 8 through 11.

Optionally, at 1620, the UE may transmit a NAS message to an AMF of the network that includes the request for the relay key. The operations of 1620 may be performed according to the methods described herein. In some examples, aspects of the operations of 1620 may be performed by a NAS manager as described with reference to FIGS. 8 through 11.

At 1625, the UE may receive, responsive to the request for the relay key information, a relay key response from the network that includes the relay key information for direct communications between the remote UE and the relay UE. The operations of 1625 may be performed according to the methods described herein. In some examples, aspects of the operations of 1625 may be performed by a security key manager as described with reference to FIGS. 8 through 11.

At 1630, the UE may transmit, to the remote UE, a direct communication command that includes the relay key information. The operations of 1630 may be performed according to the methods described herein. In some examples, aspects of the operations of 1630 may be performed by a remote UE manager as described with reference to FIGS. 8 through 11.

Figure 17:
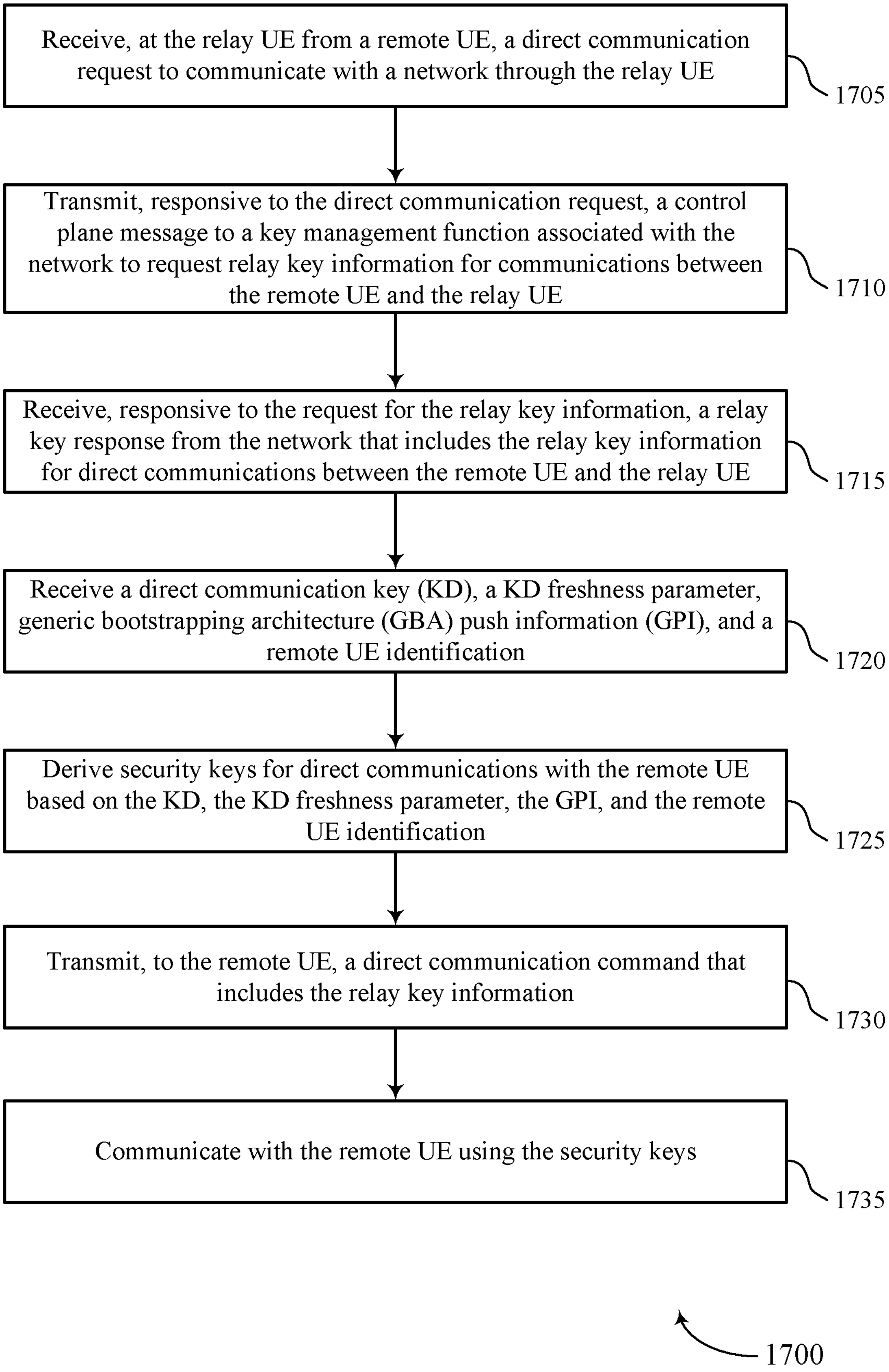

FIG. 17 shows a flowchart illustrating a method 1700 that supports relay sidelink communications for secure link establishment in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, at the relay UE from a remote UE, a direct communication request to communicate with a network through the relay UE. The operations of 1705 may be performed according to the methods described herein. In some examples, aspects of the operations of 1705 may be performed by a remote UE manager as described with reference to FIGS. 8 through 11.

At 1710, the UE may transmit, responsive to the direct communication request, a control plane message to a key management function associated with the network to request relay key information for communications between the remote UE and the relay UE. The operations of 1710 may be performed according to the methods described herein. In some examples, aspects of the operations of 1710 may be performed by a relay key request manager as described with reference to FIGS. 8 through 11.

At 1715, the UE may receive, responsive to the request for the relay key information, a relay key response from the network that includes the relay key information for direct communications between the remote UE and the relay UE. The operations of 1715 may be performed according to the methods described herein. In some examples, aspects of the operations of 1715 may be performed by a security key manager as described with reference to FIGS. 8 through 11.

At 1720, the UE may receive a KD, a KD freshness parameter, GBA push information GPI, and a remote UE identification. The operations of 1720 may be performed according to the methods described herein. In some examples, aspects of the operations of 1720 may be performed by a security key manager as described with reference to FIGS. 8 through 11.

At 1725, the UE may derive security keys for direct communications with the remote UE based on the KD, the KD freshness parameter, the GPI, and the remote UE identification. The operations of 1725 may be performed according to the methods described herein. In some examples, aspects of the operations of 1725 may be performed by a security key manager as described with reference to FIGS. 8 through 11.

At 1730, the UE may transmit, to the remote UE, a direct communication command that includes the relay key information. The operations of 1730 may be performed according to the methods described herein. In some examples, aspects of the operations of 1730 may be performed by a remote UE manager as described with reference to FIGS. 8 through 11.

At 1735, the UE may communicate with the remote UE using the security keys. The operations of 1735 may be performed according to the methods described herein. In some examples, aspects of the operations of 1735 may be performed by a security key manager as described with reference to FIGS. 8 through 11.

Figure 18:
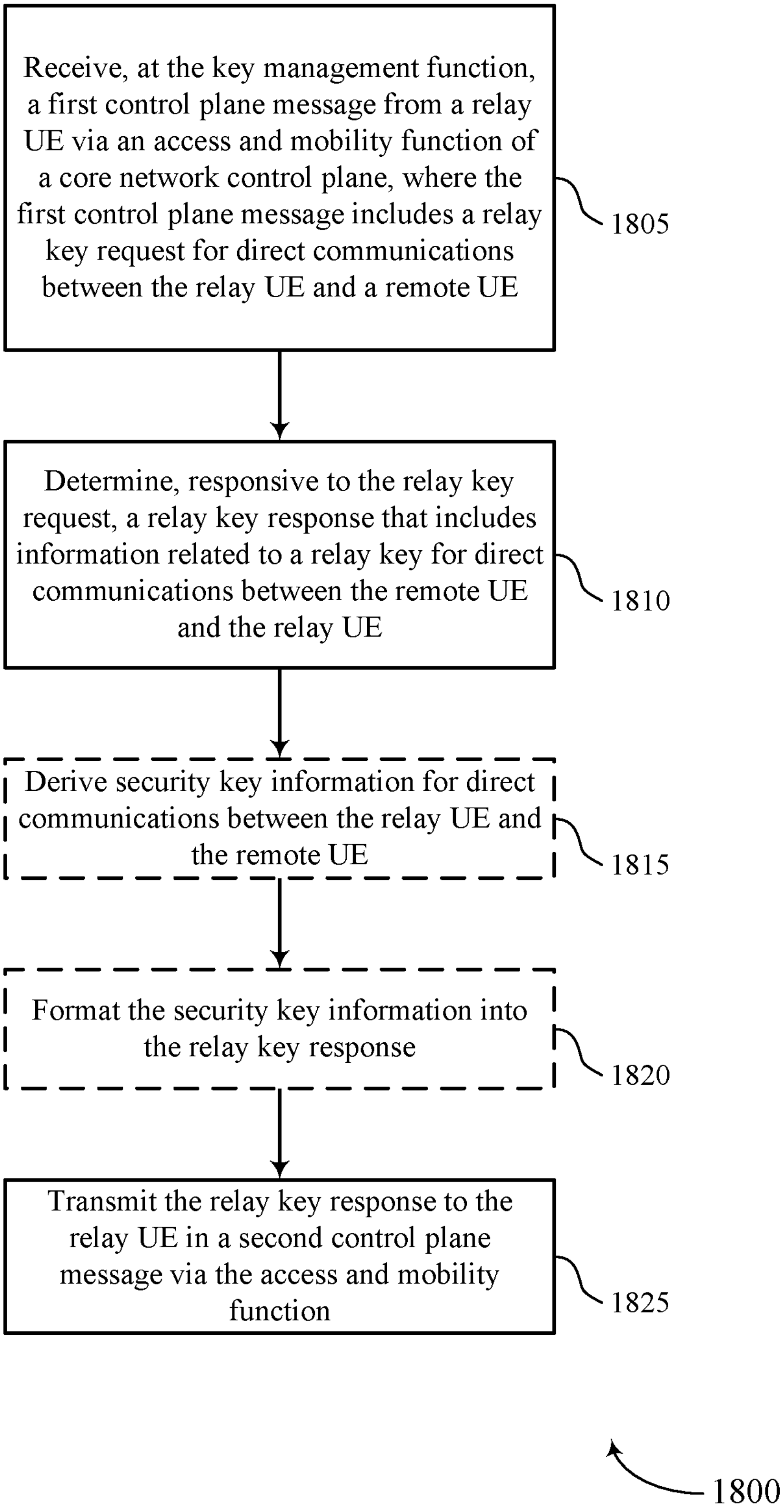

FIG. 18 shows a flowchart illustrating a method 1800 that supports relay sidelink communications for secure link establishment in accordance with aspects of the present disclosure. The operations of method 1800 may be implemented by a network device such as a base station 105 or its components as described herein. In some cases, the operations of method 1800 may be implemented by a 5GC device, which may be performed via or in conjunction with a base station 105 or its components as described herein. For example, the operations of method 1800 may be performed via or in conjunction with a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the network device may receive, at the key management function, a first control plane message from a relay UE via an access and mobility function of a core network control plane, where the first control plane message includes a relay key request for direct communications between the relay UE and a remote UE. The operations of 1805 may be performed according to the methods described herein. In some examples, aspects of the operations of 1805 may be performed by a control plane communications manager as described with reference to FIGS. 12 through 15.

At 1810, the network device may determine, responsive to the relay key request, a relay key response that includes information related to a relay key for direct communications between the remote UE and the relay UE. The operations of 1810 may be performed according to the methods described herein. In some examples, aspects of the operations of 1810 may be performed by a relay key request manager as described with reference to FIGS. 12 through 15.

Optionally, at 1815, the network device may derive security key information for direct communications between the relay UE and the remote UE. The operations of 1815 may be performed according to the methods described herein. In some examples, aspects of the operations of 1815 may be performed by a security key manager as described with reference to FIGS. 12 through 15.

Optionally, at 1820, the network device may format the security key information into the relay key response. The operations of 1820 may be performed according to the methods described herein. In some examples, aspects of the operations of 1820 may be performed by a security key manager as described with reference to FIGS. 12 through 15.

At 1825, the network device may transmit the relay key response to the relay UE in a second control plane message via the access and mobility function. The operations of 1825 may be performed according to the methods described herein. In some examples, aspects of the operations of 1825 may be performed by a security key manager as described with reference to FIGS. 12 through 15.

Figure 19:
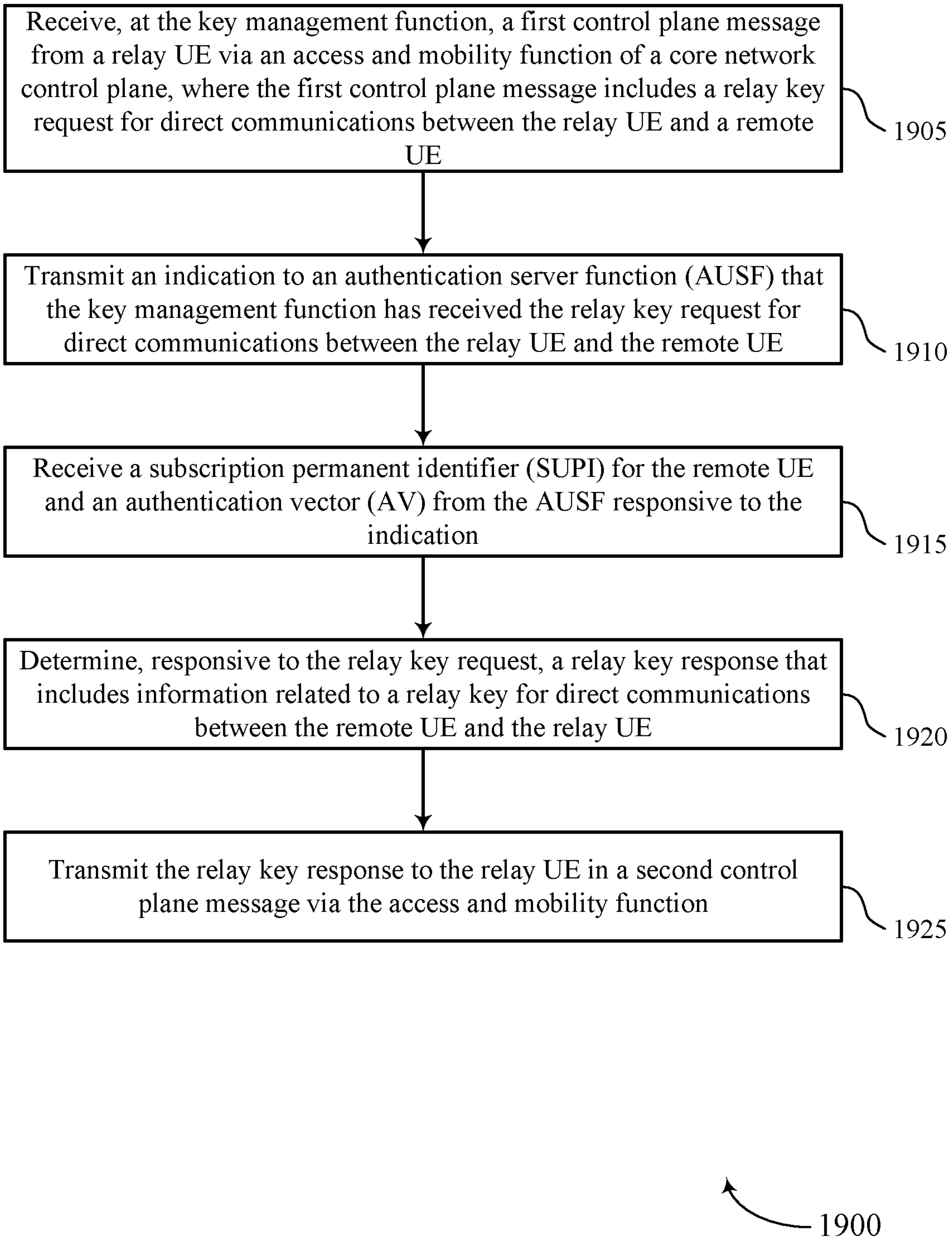

FIG. 19 shows a flowchart illustrating a method 1900 that supports relay sidelink communications for secure link establishment in accordance with aspects of the present disclosure. The operations of method 1900 may be implemented by a network device such as a base station 105 or its components as described herein. In some cases, the operations of method 1900 may be implemented by a 5GC device, which may be performed via or in conjunction with a base station 105 or its components as described herein. For example, the operations of method 1900 may be performed via or in conjunction with a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the network device may receive, at a key management function, a first control plane message from a relay UE via an access and mobility function of a core network control plane, where the first control plane message includes a relay key request for direct communications between the relay UE and a remote UE. The operations of 1905 may be performed according to the methods described herein. In some examples, aspects of the operations of 1905 may be performed by a control plane communications manager as described with reference to FIGS. 12 through 15.

At 1910, the network device may transmit an indication to an AUSF that the key management function has received the relay key request for direct communications between the relay UE and the remote UE. The operations of 1910 may be performed according to the methods described herein. In some examples, aspects of the operations of 1910 may be performed by a relay key request manager as described with reference to FIGS. 12 through 15.

At 1915, the network device may receive a SUPI for the remote UE and an AV from the AUSF responsive to the indication. The operations of 1915 may be performed according to the methods described herein. In some examples, aspects of the operations of 1915 may be performed by a relay key request manager as described with reference to FIGS. 12 through 15.

At 1920, the network device may determine, responsive to the relay key request, a relay key response that includes information related to a relay key for direct communications between the remote UE and the relay UE. The operations of 1920 may be performed according to the methods described herein. In some examples, aspects of the operations of 1920 may be performed by a relay key request manager as described with reference to FIGS. 12 through 15.

At 1925, the network device may transmit the relay key response to the relay UE in a second control plane message via the access and mobility function. The operations of 1925 may be performed according to the methods described herein. In some examples, aspects of the operations of 1925 may be performed by a security key manager as described with reference to FIGS. 12 through 15.

Figure 20:
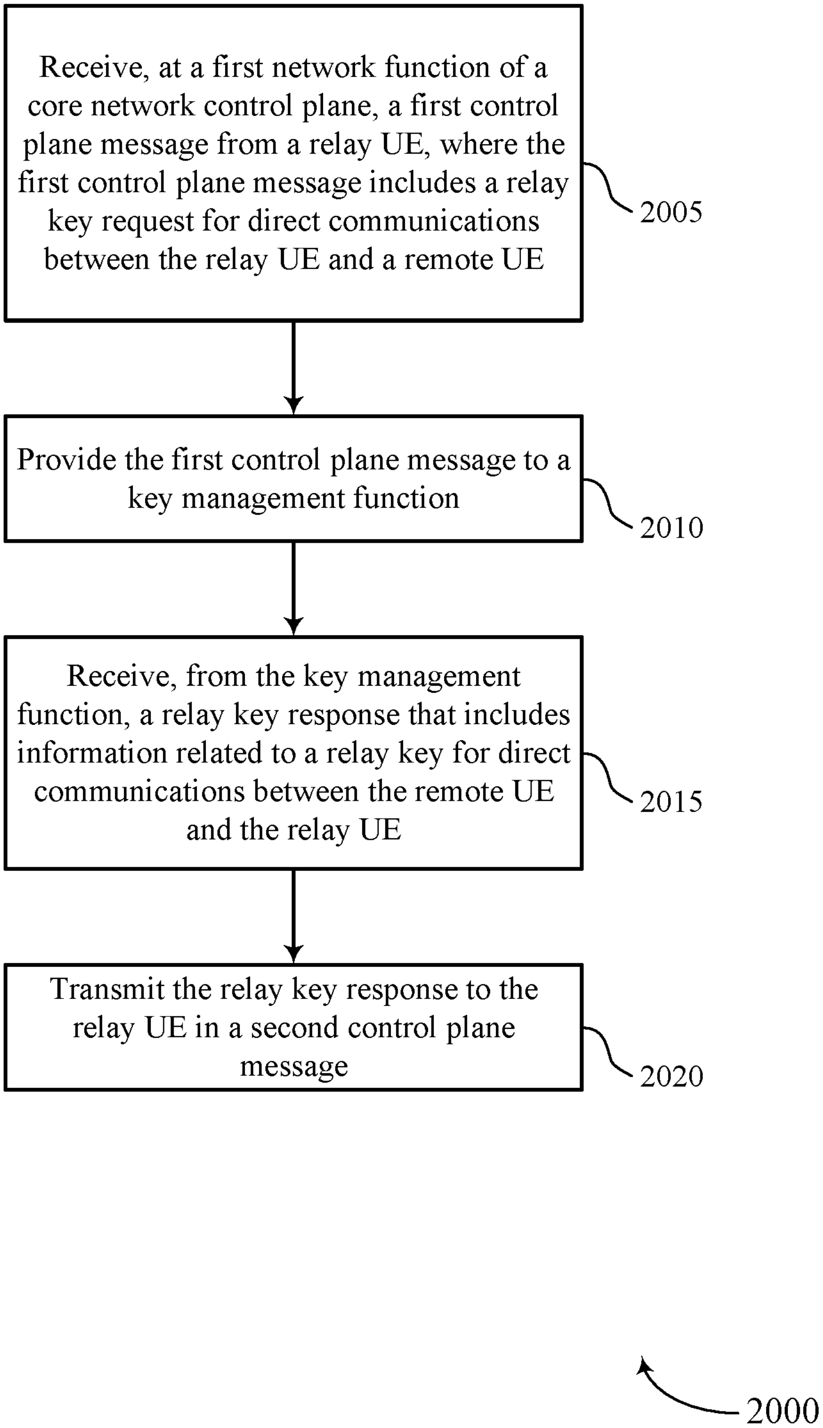

FIG. 20 shows a flowchart illustrating a method 2000 that supports relay sidelink communications for secure link establishment in accordance with aspects of the present disclosure. The operations of method 2000 may be implemented by a network device such as a base station 105 or its components as described herein. In some cases, the operations of method 2000 may be implemented by a 5GC device, which may be performed via or in conjunction with a base station 105 or its components as described herein. For example, the operations of method 2000 may be performed via or in conjunction with a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the network device may receive, at a first network function of a core network control plane, a first control plane message from a relay UE, where the first control plane message includes a relay key request for direct communications between the relay UE and a remote UE. The operations of 2005 may be performed according to the methods described herein. In some examples, aspects of the operations of 2005 may be performed by a relay key request manager as described with reference to FIGS. 12 through 15.

At 2010, the network device may provide the first control plane message to a key management function. The operations of 2010 may be performed according to the methods described herein. In some examples, aspects of the operations of 2010 may be performed by a control plane communications manager as described with reference to FIGS. 12 through 15.

At 2015, the network device may receive, from the key management function, a relay key response that includes information related to a relay key for direct communications between the remote UE and the relay UE. The operations of 2015 may be performed according to the methods described herein. In some examples, aspects of the operations of 2015 may be performed by a security key manager as described with reference to FIGS. 12 through 15.

At 2020, the network device may transmit the relay key response to the relay UE in a second control plane message. The operations of 2020 may be performed according to the methods described herein. In some examples, aspects of the operations of 2020 may be performed by a relay key request manager as described with reference to FIGS. 12 through 15.

Figure 21:
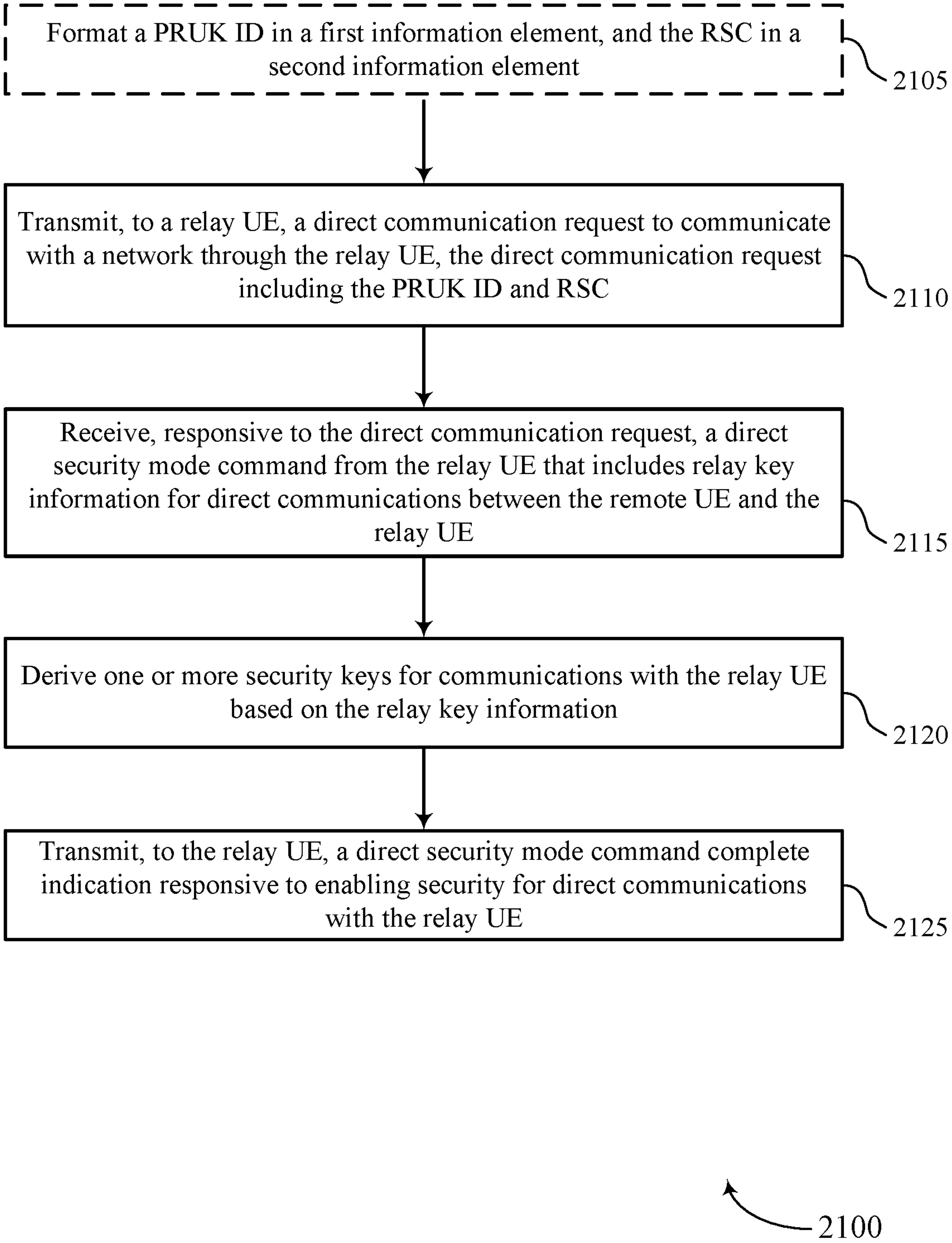

FIG. 21 shows a flowchart illustrating a method 2100 that supports relay sidelink communications for secure link establishment in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

Optionally, at 2105, the UE may format a PRUK ID in a first information element, and a RSC in a second information element. The operations of 2105 may be performed according to the methods described herein. In some examples, aspects of the operations of 2105 may be performed by a relay key request manager as described with reference to FIGS. 8 through 11.

At 2110, the UE may transmit, to a relay UE, a direct communication request to communicate with a network through the relay UE, the direct communication request including the PRUK ID and RSC. In some cases, the direct communication request may include the first information element and the second information element. The operations of 2110 may be performed according to the methods described herein. In some examples, aspects of the operations of 2110 may be performed by a relay key request manager as described with reference to FIGS. 8 through 11.

At 2115, the UE may receive, responsive to the direct communication request, a direct security mode command from the relay UE that includes relay key information for direct communications between the remote UE and the relay UE. The operations of 2115 may be performed according to the methods described herein. In some examples, aspects of the operations of 2115 may be performed by a security key manager as described with reference to FIGS. 8 through 11.

At 2120, the UE may derive one or more security keys for communications with the relay UE based on the relay key information. The operations of 2120 may be performed according to the methods described herein. In some examples, aspects of the operations of 2120 may be performed by a security key manager as described with reference to FIGS. 8 through 11.

At 2125, the UE may transmit, to the relay UE, a direct security mode command complete indication responsive to enabling security for direct communications with the relay UE. The operations of 2125 may be performed according to the methods described herein. In some examples, aspects of the operations of 2125 may be performed by a relay key request manager as described with reference to FIGS. 8 through 11.

Figure 22:
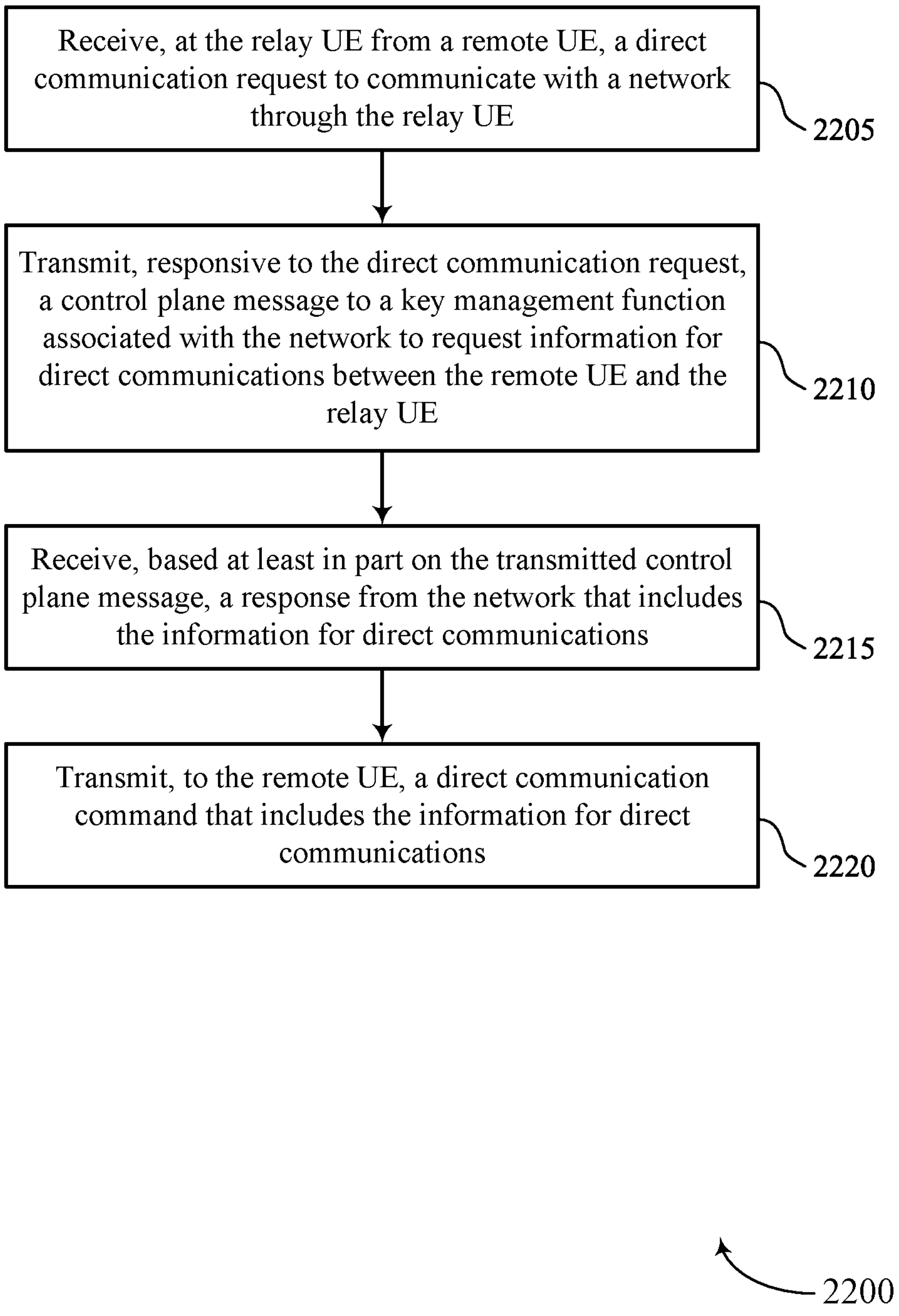

FIG. 22 shows a flowchart illustrating a method 2200 that supports relay sidelink communications for secure link establishment in accordance with aspects of the present disclosure. The operations of method 2200 may be implemented by a UE 115 or its components as described herein. In some examples, UE 115 may operate as a relay UE. For example, the operations of method 2200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2205, the UE may receive from a remote UE, a direct communication request to communicate with a network through the relay UE. The operations of 2205 may be performed according to the methods described herein. In some examples, aspects of the operations of 2205 may be performed by a remote UE manager as described with reference to FIGS. 8 through 11.

At 2210, the UE may transmit, responsive to the direct communication request, a control plane message to a key management function associated with the network to request information for direct communications between the remote UE and the relay UE. The operations of 2210 may be performed according to the methods described herein. In some examples, aspects of the operations of 2210 may be performed by a request manager such as a relay key request manager as described with reference to FIGS. 8 through 11.

At 2215, the UE may receive, based at least in part on the transmitted control plane message, a response from the network that includes the information for direct communications. The operations of 2215 may be performed according to the methods described herein. In some examples, aspects of the operations of 2215 may be performed by security manager such as a security key manager as described with reference to FIGS. 8 through 11.

At 2220, the UE may transmit, to the remote UE, a direct communication command that includes the information for direct communications. The operations of 2200 may be performed according to the methods described herein. In some examples, aspects of the operations of 2200 may be performed by a remote UE manager as described with reference to FIGS. 8 through 11.

Figure 23:
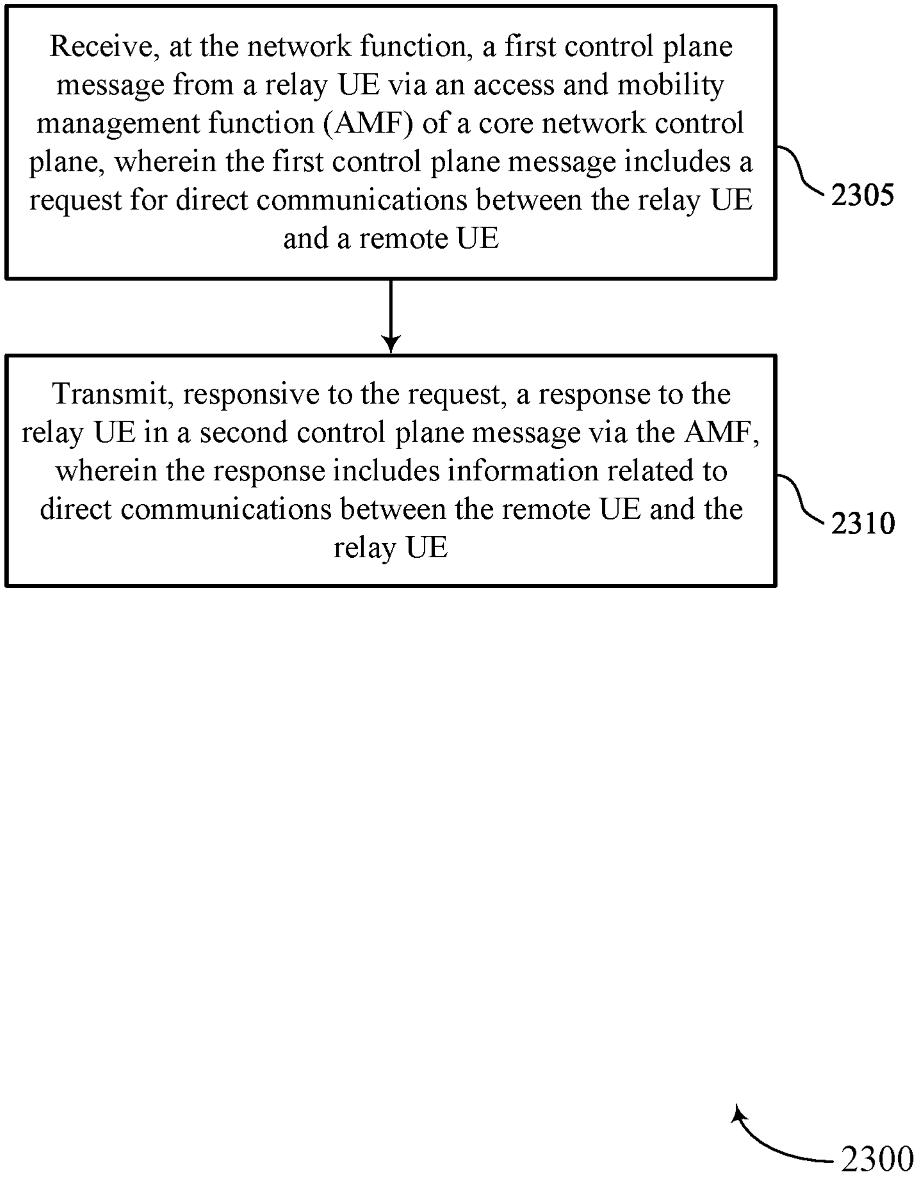

FIG. 23 shows a flowchart illustrating a method 2300 that supports relay sidelink communications for secure link establishment in accordance with aspects of the present disclosure. The operations of method 2300 may be implemented by a network function such as a network device associated with a 5GC, which may be performed via or in conjunction with a base station 105 or its components as described herein. For example, the operations of method 2300 may be performed via or in conjunction with a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2305, the network function may receive a first control plane message from a relay UE via an AMF of a core network control plane, wherein the first control plane message includes a request for direct communication between the relay UE and a remote UE. The operations of 2305 may be performed according to the methods described herein. In some examples, aspects of the operations of 2305 may be performed by a control plane communications manager as described with reference to FIGS. 12 through 15.

At 2310, the network function may transmit, responsive to the request, a response to the relay UE in a second control plane message via the AMF, where the response includes information related to direct communications between the remote UE and the relay UE. The operations of 2310 may be performed according to the methods described herein. In some examples, aspects of the operations of 2310 may be performed by a security manager such as a security key manager as described with reference to FIGS. 12 through 15.

Figure 24:
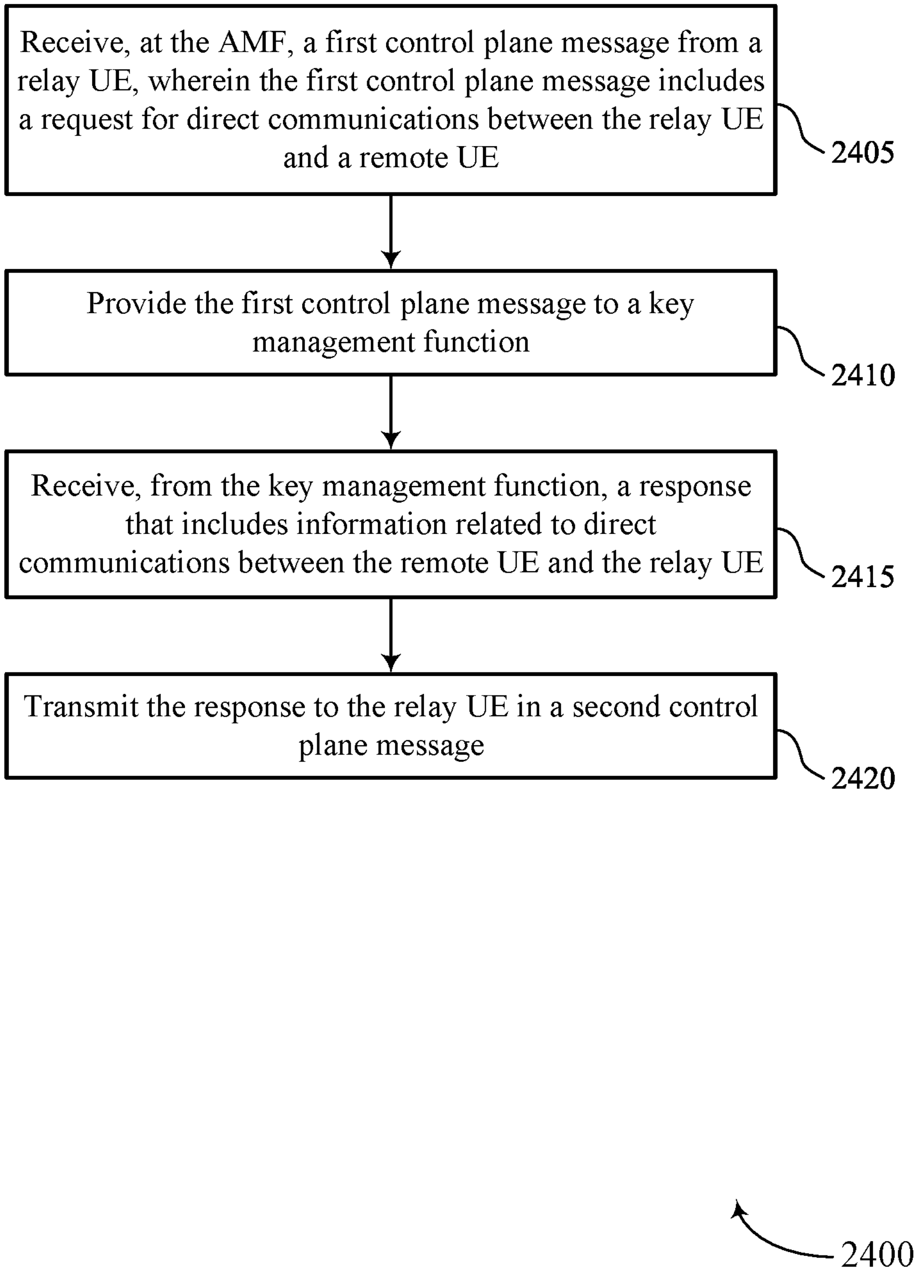

FIG. 24 shows a flowchart illustrating a method 2400 that supports relay sidelink communications for secure link establishment in accordance with aspects of the present disclosure. The operations of method 2400 may be implemented by an AMF of a 5GC, which may be performed via or in conjunction with a base station 105 or its components as described herein. For example, the operations of method 2400 may be performed via or in conjunction with a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2405, the AMF may receive a first control plane message from a relay UE, where the first control plane message includes a request for direct communication between the relay UE and a remote UE. The operations of 2405 may be performed according to the methods described herein. In some examples, aspects of the operations of 2405 may be performed by a request manager such as a relay key request manager as described with reference to FIGS. 12 through 15.

At 2410, the AMF may provide the first control plane message to a key management function. The operations of 2410 may be performed according to the methods described herein. In some examples, aspects of the operations of 2410 may be performed by a control plane communications manager as described with reference to FIGS. 12 through 15.

At 2415, the AMF may receive, from the key management function, a response that includes information related to direct communications between the remote UE and the relay UE. The operations of 2415 may be performed according to the methods described herein. In some examples, aspects of the operations of 2415 may be performed by a security manager such as a security key manager as described with reference to FIGS. 12 through 15.

At 2420, the AMF may transmit the response to the relay UE in a second control plane message. The operations of 2440 may be performed according to the methods described herein. In some examples, aspects of the operations of 2420 may be performed by a request manager such as a relay key request manager as described with reference to FIGS. 12 through 15.

Figure 25:
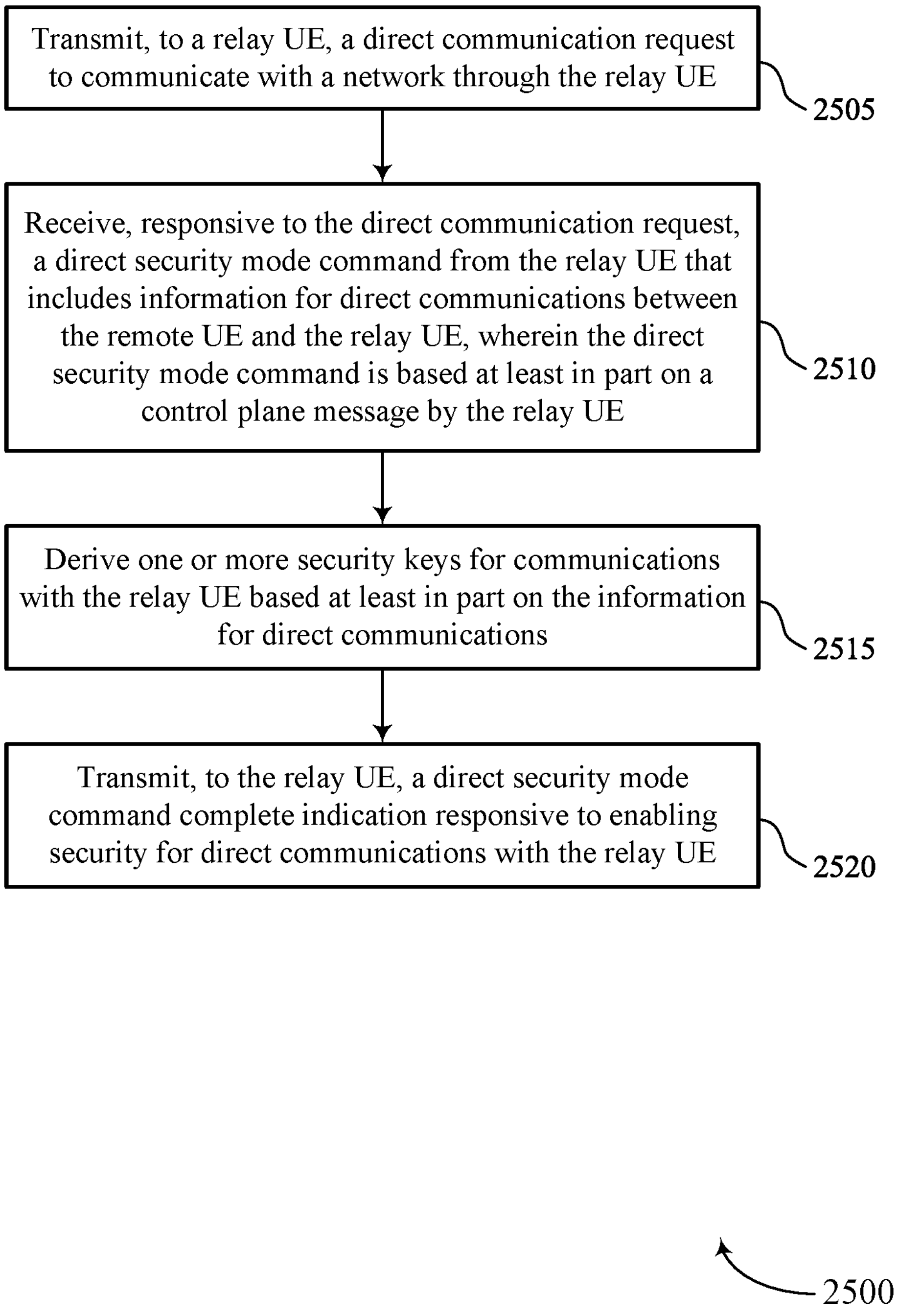

FIG. 25 shows a flowchart illustrating a method 2500 that supports relay sidelink communications for secure link establishment in accordance with aspects of the present disclosure. The operations of method 2500 may be implemented by a UE 115 or its components as described herein. In some examples, UE 115 may operate as a remote UE. For example, the operations of method 2500 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2505, the UE may transmit, to a relay UE, a direct communication request to communicate with a network through the relay UE. The operations of 2505 may be performed according to the methods described herein. In some examples, aspects of the operations of 2505 may be performed by a request manager such as a relay key request manager as described with reference to FIGS. 8 through 11.

At 2510, the UE may receive, responsive to the direct communication request, a direct security mode command from the relay UE that includes information for direct communications between the remote UE and the relay UE, where the direct security mode command is based on a control plane message by the relay UE. The operations of 2510 may be performed according to the methods described herein. In some examples, aspects of the operations of 2510 may be performed by a security manager such as a security key manager as described with reference to FIGS. 8 through 11.

At 2515, the UE may derive one or more security keys for communications with the relay UE based on the information for direct communications. The operations of 2515 may be performed according to the methods described herein. In some examples, aspects of the operations of 2515 may be performed by a security manager such as a security key manager as described with reference to FIGS. 8 through 11.

At 2520, the UE may transmit, to the relay UE, a direct security mode command complete indication responsive to enabling security for direct communications with the relay UE. The operations of 2520 may be performed according to the methods described herein. In some examples, aspects of the operations of 2520 may be performed by a request manager such as a relay key request manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a relay UE, comprising: receiving, at the relay UE from a remote UE, a direct communication request to communicate with a network through the relay UE; transmitting, responsive to the direct communication request, a control plane message to a key management function associated with the network to request information for direct communications between the remote UE and the relay UE; receiving, based at least in part on the transmitted control plane message, a response from the network that includes the information for direct communications; and transmitting, to the remote UE, a direct communication command that includes the information for direct communications.

Aspect 2: The method of aspect 1, wherein the receiving the direct communication request further comprises: receiving key establishment information from the remote UE that includes a relay user key identification and an RSC.

Aspect 3: The method of aspect 2, wherein the relay user key identification is provided as a PRUK ID in a first information element, and a RSC in a second information element.

Aspect 4: The method of aspect 3, wherein the PRUK ID is provisioned at the remote UE by the key management function, or is an IMSI, a GPSI, or a SUCI, of the remote UE.

Aspect 5: The method of any of aspects 1 through 4, wherein the transmitting the control plane message further comprises: transmitting a NAS message to an AMF of the network that includes a request corresponding to the information for direct communications.

Aspect 6: The method of aspect 5, wherein the control plane message includes information to allow the AMF to route the request corresponding to the information for direct communications to the key management function.

Aspect 7: The method of any of aspects 1 through 6, wherein the receiving the response from the network further comprises: receiving a KD, a KD freshness parameter, GPI, and a remote UE identification.

Aspect 8: The method of aspect 7, further comprising: deriving security keys for direct communications with the remote UE based at least in part on the KD, the KD freshness parameter, the GPI, and the remote UE identification; and communicating with the remote UE using the security keys.

Aspect 9: The method of any of aspects 1 through 8, wherein the relay UE provides an L3 UE-to-network relay service or an L2 UE-to-network relay service between the network and the remote UE.

Aspect 10: The method of any of aspects 1 through 9, wherein the information for direct communications between the remote UE and the relay UE comprises at least one of relay key information or authentication information.

Aspect 11: A method for wireless communication at a network function, comprising: receiving, at the network function, a first control plane message from a relay UE via an AMF of a core network control plane, wherein the first control plane message includes a request for direct communication between the relay UE and a remote UE; and transmitting, responsive to the request, a response to the relay UE in a second control plane message via the AMF, wherein the response includes information related to direct communications between the remote UE and the relay UE.

Aspect 12: The method of aspect 11, wherein the network function is a PKMF that is located in the core network control plane and that communicates with the relay UE via the AMF.

Aspect 13: The method of any of aspects 11 through 12, wherein the network function is a PKMF that is located outside of the core network control plane and that communicates with the relay UE via the AMF and a NEF.

Aspect 14: The method of any of aspects 11 through 13, wherein the network function is an AUSF that is located either in the core network control plane or outside of the core network control plane.

Aspect 15: The method of any of aspects 11 through 14, wherein the request includes a relay UE identification that is used to determine that the relay UE is authorized to serve the remote UE, and the relay UE identification comprises an IMSI, a GPSI, or a SUCI, of the relay UE.

Aspect 16: The method of aspect 15, further comprising: accessing a UDM function, one or more other network functions, or combinations thereof, to determine that the relay UE is authorized to serve the remote UE.

Aspect 17: The method of any of aspects 11 through 16, further comprising: deriving security key information for direct communications between the relay UE and the remote UE, wherein the security key information provides a KD, a KD freshness parameter, GPI, and a remote UE identification; and formatting the security key information into the response.

Aspect 18: The method of aspect 17, further comprising: accessing one or more entities that are external to the core network control plane for the security key information.

Aspect 19: The method of any of aspects 11 through 18, further comprising: generating a GPI communication based at least in part on an AV, and wherein the response includes the GPI.

Aspect 20: The method of any of aspects 11 through 19, wherein the response does not include a SUPI for the remote UE.

Aspect 21: The method of any of aspects 11 through 20, wherein the request for direct communications between the relay UE and a remote UE information comprises at least one of a relay key request or an authentication request.

Aspect 22: A method for wireless communication at an AMF of a core network control plane, comprising: receiving, at the AMF, a first control plane message from a relay UE, wherein the first control plane message includes a request for direct communication between the relay UE and a remote UE; providing the first control plane message to a key management function; receiving, from the key management function, a response that includes information related to direct communications between the remote UE and the relay UE; and transmitting the response to the relay UE in a second control plane message.

Aspect 23: The method of aspect 22, wherein the request is received in a NAS message at the AMF, and the key management function is a PKMF or an AUSF.

Aspect 24: The method of aspect 23, wherein the PKMF or the AUSF is located within the core network control plane.

Aspect 25: The method of any of aspects 23 through 24, wherein the PKMF or the AUSF is located external to the core network control plane, and a NEF of the core network control plane is coupled with the AMF and provides the first control plane message to the PKMF or the AUSF.

Aspect 26: The method of any of aspects 22 through 25, wherein the response includes security key information that provides a KD, a KD freshness parameter, GPI, and a remote UE identification.

Aspect 27: A method for wireless communication at a remote UE, comprising: transmitting, to a relay UE, a direct communication request to communicate with a network through the relay UE; receiving, responsive to the direct communication request, a direct security mode command from the relay UE that includes information for direct communications between the remote UE and the relay UE, wherein the direct security mode command is based at least in part on a control plane message by the relay UE; deriving one or more security keys for communications with the relay UE based at least in part on the information for direct communications; and transmitting, to the relay UE, a direct security mode command complete indication responsive to enabling security for direct communications with the relay UE.

Aspect 28: The method of aspect 27, further comprising: formatting a PRUK ID in a first information element and a RSC in a second information element, and wherein the direct communication request includes the first information element and the second information element.

Aspect 29: The method of aspect 28, wherein the PRUK ID comprises a key identification that is provisioned to the remote UE by a key management function, an IMSI, a GPSI, or a SUCI, of the remote UE.

Aspect 30: The method of any of aspects 27 through 29, wherein the information for direct communications includes one or more of a KD, a KD freshness parameter, GPI, or any combinations thereof.

Aspect 31: A method for wireless communication at a relay UE, comprising: receiving, at the relay UE from a remote UE, a direct communication request to communicate with a network through the relay UE; transmitting, responsive to the direct communication request, a control plane message to a key management function associated with the network to request relay key information for communications between the remote UE and the relay UE; receiving, responsive to the request for the relay key information, a relay key response from the network that includes the relay key information for direct communications between the remote UE and the relay UE; and transmitting, to the remote UE, a direct communication command that includes the relay key information.

Aspect 32: The method of aspect 31, wherein the receiving the direct communication request further comprises: receiving key establishment information from the remote UE that includes a relay user key identification and an RSC.

Aspect 33: The method of any of aspects 31 through 32, wherein the transmitting the control plane message further comprises: transmitting a NAS message to an AMF of the network that includes the request for the relay key.

Aspect 34: The method of aspect 33, wherein the control plane message includes information to allow the AMF to route the request for relay key information to the key management function.

Aspect 35: The method of any of aspects 31 through 34, wherein the receiving the relay key response further comprises: receiving a KD, a KD freshness parameter, GPI, and a remote UE identification.

Aspect 36: The method of aspect 35, further comprising: deriving security keys for direct communications with the remote UE based at least in part on the KD, the KD freshness parameter, the GPI, and the remote UE identification; and communicating with the remote UE using the security keys.

Aspect 37: The method of aspect 36, wherein the transmitting the direct communication command further comprises: transmitting the KD freshness parameter and the GPI to the remote UE for use in communications with the relay UE.

Aspect 38: The method of any of aspects 31 through 37, wherein the relay UE provides an L3 UE-to-network relay service or an L2 UE-to-network relay service between the network and the remote UE.

Aspect 39: A method for wireless communication at a key management function, comprising: receiving, at the key management function, a first control plane message from a relay UE via an access and mobility function of a core network control plane, wherein the first control plane message includes a relay key request for direct communications between the relay UE and a remote UE; determining, responsive to the relay key request, a relay key response that includes information related to a relay key for direct communications between the remote UE and the relay UE; and transmitting the relay key response to the relay UE in a second control plane message via the access and mobility function.

Aspect 40: The method of aspect 39, wherein the key management function is a PKMF that is located in the core network control plane and that communicates with the relay UE via the access and mobility function.

Aspect 41: The method of aspect 40, wherein the relay user key identification is provided as a PRUK ID in a first information element, and a RSC in a second information element.

Aspect 42: The method of aspect 41, wherein the PRUK ID is provisioned at the remote UE by the key management function, or is an IMSI, a GPSI, or a SUCI, of the remote UE.

Aspect 43: The method of any of aspects 39 through 42, wherein the key management function is a PKMF that is located outside of the core network control plane and that communicates with the relay UE via the access and mobility function and a NEF.

Aspect 44: The method of any of aspects 39 through 43, wherein the relay key request includes a relay UE identification that is used to determine that the relay UE is authorized to serve the remote UE.

Aspect 45: The method of aspect 44, wherein the relay UE identification comprises an IMSI, a GPSI, or a SUCI, of the relay UE.

Aspect 46: The method of any of aspects 44 through 45, further comprising: accessing a UDM function, one or more other network functions, or combinations thereof, to determine that the relay UE is authorized to serve the remote UE.

Aspect 47: The method of any of aspects 39 through 46, further comprising: deriving security key information for direct communications between the relay UE and the remote UE; and formatting the security key information into the relay key response.

Aspect 48: The method of aspect 47, wherein the security key information provides a KD, a KD freshness parameter, GPI, and a remote UE identification.

Aspect 49: The method of any of aspects 47 through 48, further comprising: accessing one or more entities that are external to the core network control plane for the security key information.

Aspect 50: The method of any of aspects 39 through 49, further comprising: receiving an AV from an AUSF.

Aspect 51: The method of aspect 50, further comprising: generating a GPI communication based at least in part on the AV, and wherein the relay key response includes the GPI.

Aspect 52: The method of aspect 51, wherein the relay key response does not include a SUPI for the remote UE, and an AUSF of the core network verifies the remote UE identify subsequent to the relay key response.

Aspect 53: The method of any of aspects 39 through 52, further comprising: transmitting an indication to an AUSF that the key management function has received the relay key request for direct communications between the relay UE and the remote UE; and receiving a SUPI for the remote UE and an AV from the AUSF responsive to the indication.

Aspect 54: A method for wireless communication, comprising: receiving, at a first network function of a core network control plane, a first control plane message from a relay UE, wherein the first control plane message includes a relay key request for direct communications between the relay UE and a remote UE; providing the first control plane message to a key management function; receiving, from the key management function, a relay key response that includes information related to a relay key for direct communications between the remote UE and the relay UE; and transmitting the relay key response to the relay UE in a second control plane message.

Aspect 55: The method of aspect 54, wherein the first network function is an AMF, and the key management function is a PKMF.

Aspect 56: The method of aspect 55, wherein the PKMF is located within the core network control plane.

Aspect 57: The method of any of aspects 55 through 56, wherein the PKMF is located external to the core network control plane, and a NEF of the core network control plane is couples with the AMF and provides the first control plane message to the PKMF.

Aspect 58: The method of any of aspects 55 through 57, wherein the relay key request is received in an NAS message at the AMF.

Aspect 59: The method of any of aspects 54 through 58, wherein the relay key response includes security key information that provides a KD, a KD freshness parameter, GPI, and a remote UE identification.

Aspect 60: A method for wireless communication at a remote UE, comprising: transmitting, to a relay UE, a direct communication request to communicate with a network through the relay UE, the direct communication request including a PRUK ID and a RSC; receiving, responsive to the direct communication request, a direct security mode command from the relay UE that includes relay key information for direct communications between the remote UE and the relay UE; deriving one or more security keys for communications with the relay UE based at least in part on the relay key information; and transmitting, to the relay UE, a direct security mode command complete indication responsive to enabling security for direct communications with the relay UE.

Aspect 61: The method of aspect 60, further comprising: formatting the PRUK ID in a first information element, and the RSC in a second information element, and wherein the direct communication request includes the first information element and the second information element.

Aspect 62: The method of any of aspects 60 through 61, wherein the PRUK ID comprises a key identification that is provisioned to the remote UE by a key management function, an IMSI, a GPSI, or a SUCI, of the remote UE.

Aspect 63: The method of any of aspects 60 through 62, wherein the information related to the relay key includes one or more of a KD, a KD freshness parameter, GPI, or any combinations thereof.

Aspect 64: An apparatus for wireless communication at a relay UE, comprising a processor and memory coupled with the processor. The processor and memory configured to perform a method of any of aspects 1 through 10.

Aspect 65: An apparatus for wireless communication at a relay UE, comprising at least one means for performing a method of any of aspects 1 through 10.

Aspect 66: A non-transitory computer-readable medium storing code for wireless communication at a relay UE, the code comprising instructions executable by a processor to perform a method of any of aspects 1 through 10.

Aspect 67: An apparatus for wireless communication at a network function, comprising a processor and memory coupled with the processor. The processor and memory configured to perform a method of any of aspects 11 through 21.

Aspect 68: An apparatus for wireless communication at a network function, comprising at least one means for performing a method of any of aspects 11 through 21.

Aspect 69: A non-transitory computer-readable medium storing code for wireless communication at a network function, the code comprising instructions executable by a processor to perform a method of any of aspects 11 through 21.

Aspect 70: An apparatus for wireless communication at an AMF of a core network control plane, comprising a processor and memory coupled with the processor. The processor and memory configured to perform a method of any of aspects 22 through 26.

Aspect 71: An apparatus for wireless communication at an AMF of a core network control plane, comprising at least one means for performing a method of any of aspects 22 through 26.

Aspect 72: A non-transitory computer-readable medium storing code for wireless communication at an AMF of a core network control plane, the code comprising instructions executable by a processor to perform a method of any of aspects 22 through 26.

Aspect 73: An apparatus for wireless communication at a remote UE, comprising a processor and memory coupled with the processor. The processor and memory configured to perform a method of any of aspects 27 through 30.

Aspect 74: An apparatus for wireless communication at a remote UE, comprising at least one means for performing a method of any of aspects 27 through 30.

Aspect 75: A non-transitory computer-readable medium storing code for wireless communication at a remote UE, the code comprising instructions executable by a processor to perform a method of any of aspects 27 through 30.

Aspect 76: An apparatus for wireless communication at a relay UE, comprising a processor and memory coupled with the processor. The processor and memory configured to perform a method of any of aspects 31 through 38.

Aspect 77: An apparatus for wireless communication at a relay UE, comprising at least one means for performing a method of any of aspects 31 through 38.

Aspect 78: A non-transitory computer-readable medium storing code for wireless communication at a relay UE, the code comprising instructions executable by a processor to perform a method of any of aspects 31 through 38.

Aspect 79: An apparatus for wireless communication at a key management function, comprising a processor and memory coupled with the processor. The processor and memory configured to perform a method of any of aspects 39 through 53.

Aspect 80: An apparatus for wireless communication at a key management function, comprising at least one means for performing a method of any of aspects 39 through 53.

Aspect 81: A non-transitory computer-readable medium storing code for wireless communication at a key management function, the code comprising instructions executable by a processor to perform a method of any of aspects 39 through 53.

Aspect 82: An apparatus for wireless communication, comprising a processor and memory coupled with the processor. The processor and memory configured to perform a method of any of aspects 54 through 59.

Aspect 83: An apparatus for wireless communication, comprising at least one means for performing a method of any of aspects 54 through 59.

Aspect 84: A non-transitory computer-readable medium storing code for wireless communication, the code comprising instructions executable by a processor to perform a method of any of aspects 54 through 59.

Aspect 85: An apparatus for wireless communication at a remote UE, comprising a processor and memory coupled with the processor. The processor and memory configured to perform a method of any of aspects 60 through 63.

Aspect 86: An apparatus for wireless communication at a remote UE, comprising at least one means for performing a method of any of aspects 60 through 63.

Aspect 87: A non-transitory computer-readable medium storing code for wireless communication at a remote UE, the code comprising instructions executable by a processor to perform a method of any of aspects 60 through 63.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a relay User Equipment (UE), comprising:

one or more memories; and one or more processors coupled with the one or more memories and configured to cause the relay UE to:

receive, at the relay UE from a remote UE, a direct communication request to communicate with a network through the relay UE;

transmit, responsive to the direct communication request, a non-access stratum (NAS) control plane message to an Access and Mobility Management Function (AMF) associated with the network to allow selection of an authentication server function (AUSF), wherein the transmitted NAS control plane message requests information for direct communication between the relay UE and the remote UE;

receive, based at least in part on the transmitted NAS control plane message, a response from the network that includes the information for direct communication; and transmit, to the remote UE, a direct communication command that includes the information for direct communication.

2. The apparatus of claim 1, wherein the one or more processors are configured to cause the relay UE to:

receive key establishment information from the remote UE that includes a relay user key identification and a Relay Service Code (RSC).

3. The apparatus of claim 2, wherein the relay user key identification is received as a Proximity based service (ProSe) Relay User Key (PRUK) Identifier (ID) in a first information element, and an RSC in a second information element.

4. The apparatus of claim 3, wherein the PRUK ID comprises an International Mobile Subscriber Identity (IMSI) of the remote UE, a General Public Subscription Identifier (GPSI) of the remote UE, a Subscription Concealed Identifier (SUCI) of the remote UE, or a combination thereof.

5. The apparatus of claim 1, wherein the transmitted NAS control plane message includes a request corresponding to the information for direct communication.

6. The apparatus of claim 5, wherein the transmitted NAS control plane message includes information to allow the AMF to route the request corresponding to the information for direct communication to the AUSF.

7. The apparatus of claim 1, wherein the one or more processors are configured to cause the relay UE to:

receive a Direct communication Key (KD), a KD freshness parameter, Generic Bootstrapping Architecture (GBA) Push Information (GPI), a remote UE identification, or any combination thereof.

8. The apparatus of claim 7, wherein the one or more processors are configured to cause the relay UE to:

derive one or more security keys for direct communication with the remote UE based at least in part on the KD, the KD freshness parameter, the GPI, the remote UE identification, or any combination thereof; and communicate with the remote UE based on the one or more security keys.

9. The apparatus of claim 1, wherein the relay UE provides one of a Layer Three (L3) UE-to-network relay service or a Layer Two (L2) UE-to-network relay service between the network and the remote UE.

10. The apparatus of claim 1, wherein the information for direct communication between the relay UE and the remote UE comprises at least one of relay key information or authentication information.

11. The apparatus of claim 3, wherein the PRUK ID is provisioned at the remote UE by the AUSF.

12. An apparatus for wireless communication at a Proximity-based Services (ProSe) Key Management Function (PKMF), comprising:

one or more memories; and one or more processors coupled with the one or more memories and configured to cause the PKMF to:

receive, at the PKMF, a first control plane message from a relay User Equipment (UE), via an Access and Mobility Management Function (AMF), of a core network control plane, wherein the first control plane message includes a request for direct communication between the relay UE and a remote UE; and transmit, responsive to the request, a response to the relay UE in a second control plane message via the AMF, wherein the response includes information related to direct communication between the relay UE and the remote UE.

13. The apparatus of claim 12, wherein the PKMF is located in the core network control plane and communicates with the relay UE via the AMF.

14. The apparatus of claim 12, wherein the PKMF is located outside of the core network control plane and communicates with the relay UE via the AMF and a network exposure function (NEF).

15. The apparatus of claim 11, wherein the one or more processors are configured to cause the PKMF to:

determine that the relay UE is authorized to serve the remote UE based at least in part on the request comprising a relay UE identification, the relay UE identification comprising an International Mobile Subscriber Identity (IMSI), a General Public Subscription Identifier (GPSI), a Subscription Concealed Identifier (SUCI), of the relay UE, or any combination thereof.

16. The apparatus of claim 15, wherein the one or more processors are configured to cause the PKMF to:

access a Universal Data Management (UDM) function, one or more other network functions, or combinations thereof, to determine that the relay UE is authorized to serve the remote UE.

17. The apparatus of claim 12, wherein the one or more processors are configured to cause the PKMF to:

derive security key information for direct communication between the relay UE and the remote UE, wherein the security key information provides a Direct communication Key (KD), a KD freshness parameter, Generic Bootstrapping Architecture (GBA) Push Information (GPI), a remote UE identification, or any combination thereof; and format the security key information into the response.

18. The apparatus of claim 17, wherein the one or more processors are configured to cause the PKMF to:

access one or more entities that are external to the core network control plane for the security key information.

19. The apparatus of claim 12, wherein the one or more processors are configured to cause the PKMF to:

generate a Generic Bootstrapping Architecture (GBA) Push Information (GPI) communication based at least in part on an Authentication Vector (AV), wherein the response includes the GPI.

20. The apparatus of claim 12, wherein the response includes an identifier for the remote UE different from a Subscription Permanent Identifier (SUPI) for the remote UE.

21. The apparatus of claim 12, wherein the request for direct communication between the relay UE and a remote UE information comprises at least one of a relay key request or an authentication request.

22. An apparatus for wireless communication at an Access and Mobility Management Function (AMF), comprising:

one or more memories; and one or more processors coupled with the one or more memories and configured to cause the AMF to:

receive, at the AMF, a first control plane message from a relay User Equipment (UE), wherein the first control plane message includes a request for direct communication between the relay UE and a remote UE;

provide the first control plane message to an authentication server function (AUSF);

receive, from the AUSE, a response that includes information related to direct communication between the relay UE and the remote UE; and transmit the response to the relay UE in a second control plane message.

23. The apparatus of claim 22, wherein the request is received in a Network Access Stratum (NAS) message at the AMF.

24. The apparatus of claim 23, wherein the AUSF is located within a core network control plane.

25. The apparatus of claim 23, wherein:

the AUSF is located external to a core network control plane, and a Network Exposure Function (NEF) of the core network control plane is coupled with the AMF.

26. The apparatus of claim 22, wherein the response includes security key information that provides a Direct communication Key (KD), a KD freshness parameter, Generic Bootstrapping Architecture (GBA) Push Information (GPI), a remote UE identification, or any combination thereof.

27. An apparatus for wireless communication at a remote User Equipment (UE), comprising:

one or more memories; and one or more processors coupled with the one or more memories and configured to cause the remote UE to:

transmit, to a relay UE, a direct communication request to communicate with a network entity of a network through the relay UE;

receive, responsive to the direct communication request, a direct security mode command from the relay UE that includes information for direct communications between the remote UE and the relay UE, wherein the direct security mode command is based at least in part on a control plane message received, by the relay UE, from an authentication server function (AUSF), and wherein the direct security mode command is received in accordance with a selection of the AUSF;

derive one or more security keys for communications with the relay UE based at least in part on the information for direct communication; and transmit, to the relay UE, a direct security mode command complete indication responsive to enablement of security for direct communications with the relay UE.

28. The apparatus of claim 27, wherein the one or more processors are configured to cause the remote UE to:

format a ProSe Relay User Key (PRUK) Identifier (ID) in a first information element and a Relay Service Code (RSC) in a second information element, and wherein the direct communication request includes the first information element and the second information element.

29. The apparatus of claim 28, wherein the PRUK ID comprises a key identification that is provisioned to the remote UE by the AUSF, an International Mobile Subscriber Identity (IMSI) of the remote UE, a General Public Subscription Identifier (GPSI) of the remote UE, a Subscription Concealed Identifier (SUCI) of the remote UE, or any combination thereof.

30. The apparatus of claim 27, wherein the information for direct communication includes one or more of a Direct communication Key (KD), a KD freshness parameter, Generic Bootstrapping Architecture (GBA) Push Information (GPI), or any combinations thereof.

31. A non-transitory computer-readable medium storing code for wireless communication at a relay User Equipment (UE), the code comprising instructions executable by one or more processors to cause the relay UE to:

receive, at the relay UE from a remote UE, a direct communication request to communicate with a network through the relay UE;

transmit, responsive to the direct communication request, a non-access stratum (NAS) control plane message to an Access and Mobility Management Function (AMF) associated with the network to allow selection of an authentication server function (AUSF), wherein the transmitted NAS control plane message requests information for direct communication between the relay UE and the remote UE;

receive, based at least in part on the transmitted NAS control plane message, a response from the network that includes the information for direct communication; and transmit, to the remote UE, a direct communication command that includes the information for direct communication.

32. The non-transitory computer-readable medium of claim 31, wherein the instructions are executable by the one or more processors to cause the relay UE to:

receive key establishment information from the remote UE that includes a relay user key identification and a Relay Service Code (RSC).

33. The non-transitory computer-readable medium of claim 32, wherein the relay user key identification is received as a Proximity based service (ProSe) Relay User Key (PRUK) Identifier (ID) in a first information element, and an RSC in a second information element.

34. A non-transitory computer-readable medium storing code for wireless communication at an Access and Mobility Management Function (AMF), the code comprising instructions executable by one or more processors to cause the AMF to:

receive, at the AMF, a first control plane message from a relay User Equipment (UE), wherein the first control plane message includes a request for direct communication between the relay UE and a remote UE;

provide the first control plane message to an authentication server function (AUSF);

receive, from the AUSF, a response that includes information related to direct communication between the relay UE and the remote UE; and transmit the response to the relay UE in a second control plane message.

35. The non-transitory computer-readable medium of claim 34, wherein the request is received in a Network Access Stratum (NAS) message at the AMF.

36. A non-transitory computer-readable medium storing code for wireless communication at a remote User Equipment (UE), the code comprising instructions executable by one or more processors to cause the remote UE to:

transmit, to a relay UE, a direct communication request to communicate with a network entity of a network through the relay UE;

receive, responsive to the direct communication request, a direct security mode command from the relay UE that includes information for direct communication between the remote UE and the relay UE, wherein the direct security mode command is based at least in part on a control plane message received, by the relay UE, from an authentication server function (AUSF), and wherein the direct security mode command is received in accordance with a selection of the AUSF;

derive one or more security keys for communications with the relay UE based at least in part on the information for direct communication; and transmit, to the relay UE, a direct security mode command complete indication responsive to enablement of security for direct communication with the relay UE.

37. The non-transitory computer-readable medium of claim 36, wherein the instructions are executable to cause the remote UE to:

format a ProSe Relay User Key (PRUK) Identifier (ID) in a first information element and a Relay Service Code (RSC) in a second information element, and wherein the direct communication request includes the first information element and the second information element.

38. A method for wireless communication at a relay User Equipment (UE), comprising:

receiving, at the relay UE from a remote UE, a direct communication request to communicate with a network through the relay UE;

transmitting, responsive to the direct communication request, a non-access stratum (NAS) control plane message to an Access and Mobility Management Function (AMF) associated with the network to allow selection of an authentication server function (AUSF), wherein the transmitted NAS control plane message requests information for direct communication between the relay UE and the remote UE;

receiving, based at least in part on the transmitted NAS control plane message, a response from the network that includes the information for direct communication; and transmitting, to the remote UE, a direct communication command that includes the information for direct communication.

39. The method of claim 38, further comprising:

receiving key establishment information from the remote UE that includes a relay user key identification and a Relay Service Code (RSC).

40. The method of claim 39, wherein the relay user key identification is received as a ProSe Relay User Key (PRUK) Identifier (ID) in a first information element, and an RSC in a second information element.

41. The method of claim 40, wherein the PRUK ID comprises an International Mobile Subscriber Identity (IMSI) of the remote UE, a General Public Subscription Identifier (GPSI) of the remote UE, a Subscription Concealed Identifier (SUCI) of the remote UE, or any combination thereof.

42. The method of claim 38, wherein the transmitted NAS control plane message includes a request corresponding to the information for direct communication.

43. The method of claim 42, wherein the transmitted NAS control plane message includes information to allow the AMF to route the request corresponding to the information for direct communication to the AUSF.

44. The method of claim 38, further comprising:

receiving a Direct communication Key (KD), a KD freshness parameter, Generic Bootstrapping Architecture (GBA) Push Information (GPI), a remote UE identification, or any combination thereof.

45. The method of claim 44, further comprising:

deriving one or more security keys for direct communication with the remote UE based at least in part on the KD, the KD freshness parameter, the GPI, the remote UE identification, or any combination thereof; and communicating with the remote UE based on the one or more security keys.

46. The method of claim 38, wherein the relay UE provides one of a Layer Three (L3) UE-to-network relay service or a Layer Two (L2) UE-to-network relay service between the network and the remote UE.

47. The method of claim 38, wherein the information for direct communication between the relay UE and the remote UE comprises at least one of relay key information or authentication information.

48. A method for wireless communication at a Proximity-based Services (ProSe) Key Management Function (PKMF), comprising:

receiving, at the PKMF, a first control plane message from a relay User Equipment (UE), via an Access and Mobility Management Function (AMF), of a core network control plane, wherein the first control plane message includes a request for direct communication between the relay UE and a remote UE; and transmitting, responsive to the request, a response to the relay UE in a second control plane message via the AMF, wherein the response includes information related to direct communication between the relay UE and the remote UE.

49. A method for wireless communication at an Access and Mobility Management Function (AMF), comprising:

receiving, at the AMF, a first control plane message from a relay User Equipment (UE), wherein the first control plane message includes a request for direct communication between the relay UE and a remote UE;

providing the first control plane message to a an authentication server function (AUSF);

receiving, from the AUSF, a response that includes information related to direct communication between the relay UE and the remote UE; and transmitting the response to the relay UE in a second control plane message.

50. The method of claim 49, wherein the request is received in a Network Access Stratum (NAS) message at the AMF.

51. The method of claim 50, wherein the AUSF is located within a core network control plane.

52. The method of claim 50, wherein:

the AUSF is located external to a core network control plane, and a Network Exposure Function (NEF) of the core network control plane is coupled with the AMF.

53. The method of claim 49, wherein the response includes security key information that provides a Direct communication Key (KD), a KD freshness parameter, Generic Bootstrapping Architecture (GBA) Push Information (GPI), a remote UE identification, or any combination thereof.

54. A method for wireless communication at a remote User Equipment (UE), comprising:

transmitting, to a relay UE, a direct communication request to communicate with a network entity of a network through the relay UE;

receiving, responsive to the direct communication request, a direct security mode command from the relay UE that includes information for direct communication between the remote UE and the relay UE, wherein the direct security mode command is based at least in part on a control plane message received, by the relay UE, from an authentication server function (AUSF) by the relay UE, and wherein the direct security mode command is received in accordance with a selection of the AUSF;

deriving one or more security keys for communications with the relay UE based at least in part on the information for direct communication; and transmitting, to the relay UE, a direct security mode command complete indication responsive to enablement of security for direct communication with the relay UE.

55. The method of claim 54, further comprising:

formatting a ProSe Relay User Key (PRUK) Identifier (ID) in a first information element and a Relay Service Code (RSC) in a second information element, and wherein the direct communication request includes the first information element and the second information element.

56. The method of claim 55, wherein the PRUK ID comprises a key identification that is provisioned to the remote UE by the AUSF, an International Mobile Subscriber Identity (IMSI) of the remote UE, a General Public Subscription Identifier (GPSI) of the remote UE, a Subscription Concealed Identifier (SUCI) of the remote UE, or any combination thereof.

57. The method of claim 54, wherein the information for direct communication includes one or more of a Direct communication Key (KD), a KD freshness parameter, Generic Bootstrapping Architecture (GBA) Push Information (GPI), or any combinations thereof.

58. A method for wireless communication at an authentication server function (AUSF), comprising:

receiving, at the AUSF, a first control plane message from a relay User Equipment (UE), via an Access and Mobility Management Function (AMF), of a core network control plane, wherein the first control plane message includes a request for direct communication between the relay UE and a remote UE; and transmitting, responsive to the request, a response to the relay UE in a second control plane message via the AMF, wherein the response includes information related to direct communication between the relay UE and the remote UE.

59. The method of claim 58, wherein the AUSF is located in the core network control plane and communicates with the relay UE via the AMF.

60. The method of claim 58, further comprising:

determining that the relay UE is authorized to serve the remote UE based at least in part on the request comprising a relay UE identification, the relay UE identification comprising an International Mobile Subscriber Identity (IMSI), a General Public Subscription Identifier (GPSI), a Subscription Concealed Identifier (SUCI), or any combination thereof, of the relay UE.

61. The method of claim 60, further comprising:

accessing a Universal Data Management (UDM) function, one or more other network functions, or combinations thereof, to determine that the relay UE is authorized to serve the remote UE.

62. The method of claim 58, further comprising:

deriving security key information for direct communication between the relay UE and the remote UE, wherein the security key information provides a Direct communication Key (KD), a KD freshness parameter, Generic Bootstrapping Architecture (GBA) Push Information (GPI), a remote UE identification, or any combination thereof; and formatting the security key information into the response.

63. The method of claim 58, wherein the response includes an identifier for the remote UE different from a Subscription Permanent Identifier (SUPI) for the remote UE.

64. The method of claim 58, wherein the request for direct communication between the relay UE and a remote UE information comprises at least one of a relay key request or an authentication request.

65. An authentication server function (AUSF), comprising:

one or more memories; and one or more processors coupled with the one or more memories and configured to cause AUSF to:

receive, at the AUSF, a first control plane message from a relay User Equipment (UE), via an Access and Mobility Management Function (AMF), of a core network control plane, wherein the first control plane message includes a request for direct communication between the relay UE and a remote UE; and transmit, responsive to the request, a response to the relay UE in a second control plane message via the AMF, wherein the response includes information related to direct communication between the relay UE and the remote UE.

66. The AUSF of claim 65, wherein the AUSF is located in the core network control plane and communicates with the relay UE via the AMF.

67. The AUSE of claim 65, wherein the one or more processors are configured to cause the AUSF to:

determine that the relay UE is authorized to serve the remote UE based at least in part on the request comprising a relay UE identification, the relay UE identification comprising an International Mobile Subscriber Identity (IMSI), a General Public Subscription Identifier (GPSI), a Subscription Concealed Identifier (SUCI), or any combination thereof, of the relay UE.

68. The AUSF of claim 67, wherein the one or more processors are configured to cause the AUSF to:

access a Universal Data Management (UDM) function, one or more other network functions, or combinations thereof, to determine that the relay UE is authorized to serve the remote UE.

69. The AUSF of claim 65, wherein the one or more processors are configured to cause the AUSF to:

derive security key information for direct communication between the relay UE and the remote UE, wherein the security key information provides a Direct communication Key (KD), a KD freshness parameter, Generic Bootstrapping Architecture (GBA) Push Information (GPI), a remote UE identification, or any combination thereof; and format the security key information into the response.

70. The AUSE of claim 65, wherein the response includes an identifier for the remote UE different from a Subscription Permanent Identifier (SUPI) for the remote UE.

71. AUSF of claim 65, wherein:

the request for direct communication between the relay UE and a remote UE information comprises at least one of a relay key request or an authentication request.

72. An authentication server function (AUSF) for wireless communication, comprising:

means for receiving, at the AUSF, a first control plane message from a relay User Equipment (UE), via an Access and Mobility Management Function (AMF), of a core network control plane, wherein the first control plane message includes a request for direct communication between the relay UE and a remote UE; and means for transmitting, responsive to the request, a response to the relay UE in a second control plane message via the AMF, wherein the response includes information related to direct communication between the relay UE and the remote UE.

73. The AUSF of claim 72, wherein the AUSF is located in the core network control plane and communicates with the relay UE via the AMF.

74. The AUSF of claim 72, further comprising:

means for determining that the relay UE is authorized to serve the remote UE based at least in part on the request comprising a relay UE identification, the relay UE identification comprising an International Mobile Subscriber Identity (IMSI), a General Public Subscription Identifier (GPSI), a Subscription Concealed Identifier (SUCI), or any combination thereof, of the relay UE.

75. The AUSF of claim 74, further comprising:

means for accessing a Universal Data Management (UDM) function, one or more other network functions, or combinations thereof, to determine that the relay UE is authorized to serve the remote UE.

76. The AUSF of claim 72, further comprising:

means for deriving security key information for direct communication between the relay UE and the remote UE, wherein the security key information provides a Direct communication Key (KD), a KD freshness parameter, Generic Bootstrapping Architecture (GBA) Push Information (GPI), a remote UE identification, or any combination thereof; and means for formatting the security key information into the response.

77. The AUSF of claim 72, wherein the response includes an identifier for the remote UE different from a Subscription Permanent Identifier (SUPI) for the remote UE.

78. The AUSE of claim 72, wherein:

the request for direct communication between the relay UE and a remote UE information comprises at least one of a relay key request or an authentication request.

79. A non-transitory computer-readable medium storing code for wireless communication at an authentication server function (AUSF), the code comprising instructions executable by one or more processors to:

receive, at the AUSF, a first control plane message from a relay User Equipment (UE), via an Access and Mobility Management Function (AMF), of a core network control plane, wherein the first control plane message includes a request for direct communication between the relay UE and a remote UE; and transmit, responsive to the request, a response to the relay UE in a second control plane message via the AMF, wherein the response includes information related to direct communication between the relay UE and the remote UE.

80. The non-transitory computer-readable medium of claim 79, wherein the AUSF is located in the core network control plane and communicates with the relay UE via the AMF.

81. The non-transitory computer-readable medium of claim 79, wherein the instructions are further executable by the one or more processors to:

determine that the relay UE is authorized to serve the remote UE based at least in part on the request comprising a relay UE identification, the relay UE identification comprising an International Mobile Subscriber Identity (IMSI), a General Public Subscription Identifier (GPSI), a Subscription Concealed Identifier (SUCI), or any combination thereof, of the relay UE.

82. The non-transitory computer-readable medium of claim 81, wherein the instructions are further executable by the one or more processors to:

access a Universal Data Management (UDM) function, one or more other network functions, or combinations thereof, to determine that the relay UE is authorized to serve the remote UE.

83. The non-transitory computer-readable medium of claim 79, wherein the instructions are further executable by the one or more processors to:

derive security key information for direct communication between the relay UE and the remote UE, wherein the security key information provides a Direct communication Key (KD), a KD freshness parameter, Generic Bootstrapping Architecture (GBA) Push Information (GPI), a remote UE identification, or any combination thereof; and format the security key information into the response.

84. The non-transitory computer-readable medium of claim 79, wherein the response includes an identifier for the remote UE different from a Subscription Permanent Identifier (SUPI) for the remote UE.

85. The non-transitory computer-readable medium of claim 79, wherein:

the request for direct communication between the relay UE and a remote UE information comprises at least one of a relay key request or an authentication request.

* * * * *